US012772243B2

(12) United States Patent
Huang et al.

(10) Patent No.: US 12,772,243 B2
(45) Date of Patent: Oct. 20, 2026

(54) METHOD AND APPARATUS FOR TRANSMITTING REPORT IN A WIRELESS COMMUNICATION SYSTEM

(71) Applicant: ASUS Technology Licensing Inc., Taipei City (TW)

(72) Inventors: Chun-Wei Huang, Taipei City (TW); Yu-Hsuan Guo, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/258,696

(22) Filed: Jul. 2, 2025

(65) Prior Publication Data

US 2026/0012942 A1 Jan. 8, 2026

Related U.S. Application Data

(60) Provisional application No. 63/667,534, filed on Jul. 3, 2024.

(51) Int. Cl.
*H04W 72/1268* (2023.01)
*H04B 7/06* (2006.01)

(52) U.S. Cl.
CPC ...... *H04W 72/1268* (2013.01); *H04B 7/0626* (2013.01); *H04B 7/06952* (2023.05)

(58) Field of Classification Search
CPC ............... H04W 72/126; H04B 7/0626; H04B 7/06952
See application file for complete search history.

(56) References Cited

U.S. PATENT DOCUMENTS

2024/0334471 A1 10/2024 Kaisha
2024/0373428 A1 11/2024 Kaisha
2025/0193891 A1 * 6/2025 Zhu ....................... H04W 76/38

FOREIGN PATENT DOCUMENTS

WO WO-2020226391 A1 * 11/2020 ............... H04L 1/08
WO 2023276842 A1 1/2023

* cited by examiner

*Primary Examiner* — Ayanah S George
(74) *Attorney, Agent, or Firm* — Skaar Ulbrich Macari, P.A.

(57) ABSTRACT

Methods, systems, and apparatuses are provided for transmitting reports in a wireless communication system, wherein a method for a User Equipment (UE) comprises determining an overlap among a first set of Physical Uplink Control Channel (PUCCH) resources for Scheduling Request (SR), a second set of PUCCH resources for an indication associated with UE-Initiated (UEI) beam reporting and a third PUCCH resource for a Hybrid Automatic Repeat Request (HARQ), and transmitting the HARQ and information to a network node, wherein the information indicates one code-point among the first set of PUCCH resources for SR and the second set of PUCCH resources for the indication.

20 Claims, 17 Drawing Sheets

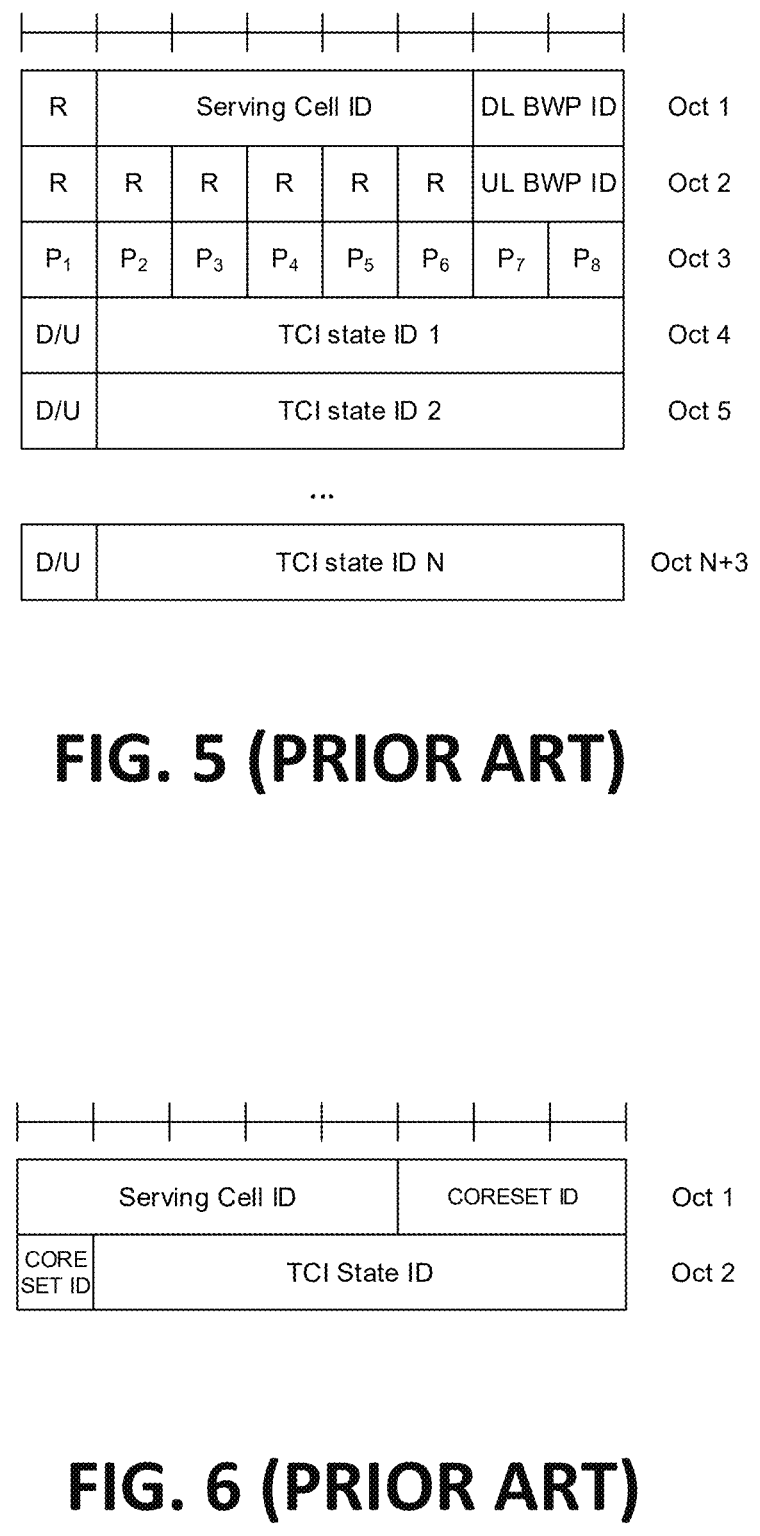

| | | | | | | | | |
|---|---|---|---|---|---|---|---|---|
| R | Serving Cell ID | | | | | DL BWP ID | | Oct 1 |
| R | R | R | R | R | R | UL BWP ID | | Oct 2 |
| $P_1$ | $P_2$ | $P_3$ | $P_4$ | $P_5$ | $P_6$ | $P_7$ | $P_8$ | Oct 3 |
| D/U | TCI state ID 1 | | | | | | | Oct 4 |
| D/U | TCI state ID 2 | | | | | | | Oct 5 |
| ... | | | | | | | | |
| D/U | TCI state ID N | | | | | | | Oct N+3 |

FIG. 5 (PRIOR ART)

| | | | | | | | | |
|---|---|---|---|---|---|---|---|---|
| Serving Cell ID | | | | | CORESET ID | | | Oct 1 |
| CORE SET ID | TCI State ID | | | | | | | Oct 2 |

FIG. 6 (PRIOR ART)

| Case | Step 1 (PUCCH) | Step 2 (PUCCH/PUSCH) | UE behavior |
|---|---|---|---|
| 1 | x | x | Transmit Step 1&2 |
| 2 | x | UCI | One or more conditions:<br>• UCI may be SP/P CSI report for the same cell or different cell.<br>• UCI may be HARQ feedback or SR<br>• PUSCH may or may not include AP CSI report<br>• Simultaneous PUSCH/PUCCH may be enabled or not<br>• Logical channel prioritization may be enabled or not<br>• Starting symbol of PUSCH, UCI, Step 2 may be considered<br>• Multiplexing with UL channel with different priority index<br>• Simultaneous HARQ and CSI may be enabled or not<br>• Carrier aggregation is implemented<br>• Priority index (e.g., 0 or 1)<br><br>**Step-1**<br>Could have indication<br>1. Due to mux (and UE transmits an UL channel with multiplexed SR (PN) )<br>2. No mux, but SR(PN) can be transmitted independently (and UE transmits an UL channel with SR (PN) )<br>No indication<br>3. Due to no mux, and SR(PN) cannot be transmitted independently<br>**Step-2**<br>Could have indication<br>1. Due to mux (and UE transmits an UL channel with multiplexed UEI report )<br>2. No mux, but UEI report can be transmitted independently (and UE transmits an UL channel with UEI report )<br>No indication<br>3. Due to no mux, and UEI report cannot be transmitted independently |
| 3 | x | PUSCH | |
| 4 | x | PUSCH & UCI | |
| 5 | UCI | x | |
| 6 | UCI | UCI | |
| 7 | UCI | PUSCH | |
| 8 | UCI | PUSCH & UCI | |
| 9 | PUSCH | x | |
| 10 | PUSCH | UCI | |
| 11 | PUSCH | PUSCH | |
| 12 | PUSCH | PUSCH & UCI | |
| 13 | PUSCH & UCI | x | |
| 14 | PUSCH & UCI | UCI | |
| 15 | PUSCH & UCI | PUSCH | |
| 16 | PUSCH & UCI | PUSCH & UCI | |

Note1: UCI correpsonds to a scheduled/configured PUCCH resoruce for transmitting the UCI
Note2: PUSCH correponds to a scheduled/configured PUSCH resource which may comprise TB/MAC PDU and/or aperiodic/semi-persistent CSI report
Note3: partially or fully overlap in time domain of any two channels/resources

FIG. 8

METHOD AND APPARATUS FOR TRANSMITTING REPORT IN A WIRELESS COMMUNICATION SYSTEM

CROSS-REFERENCE TO RELATED APPLICATIONS

The present application claims priority to and the benefit of U.S. Provisional Patent Application Ser. No. 63/667,534, filed Jul. 3, 2024, which is hereby fully incorporated herein by reference.

FIELD

This disclosure generally relates to wireless communication networks and, more particularly, to a method and apparatus for transmitting reports in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for transmitting reports in a wireless communication system.

In various embodiments, a method for a User Equipment (UE) in a wireless communication system comprises determining an overlap among a first set of Physical Uplink Control Channel (PUCCH) resources for Scheduling Request (SR), a second set of PUCCH resources for an indication associated with UE-Initiated (UEI) beam reporting and a third PUCCH resource for a Hybrid Automatic Repeat Request (HARQ), and transmitting the HARQ and information to a network node, wherein the information indicates one code-point among the first set of PUCCH resources for SR and the second set of PUCCH resources for the indication.

BRIEF DESCRIPTION OF THE DRAWINGS

FIG. 5 is a reproduction of FIG. 6.1.3.47-1: Unified TCI state activation/deactivation MAC CE, from 3GPP TS 38.321 V17.3.0.

FIG. 6 is a reproduction of FIG. 6.1.3.15-1: TCI State Indication for UE-specific PDCCH MAC CE, from 3GPP TS 38.321 V17.3.0.

FIG. 8 is an example diagram showing Step 1 and Step 2, which conditions are used and the result for a UCI multiplexing and/or overlapping handling procedure, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1]3GPP TS 38.331 V18.1.0 (March 2024) 3rd Generation Partnership Project; Technical Specification Group Radio Access Network; NR; Radio Resource Control (RRC) protocol specification (Release 18); [2]3GPP TS 38.214 V17.3.0 (September 2022) 3rd Generation Partnership Project; Technical Specification Group Radio Access Network; NR; Physical layer procedures for data (Release 17); [3]3GPP TS 38.321 V17.3.0 (December 2022) 3rd Generation Partnership Project; Technical Specification Group Radio Access Network; NR; Medium Access Control (MAC) protocol; [4] Chair notes RAN1 #116 eom0; [5]3GPP TS 38.214 V18.2.0 (March 2024) 3rd Generation Partnership Project; Technical Specification Group Radio Access Network; NR; Physical layer procedures for data (Release 18); [6]3GPP TS 38.213 V18.3.0 (June 2024) 3rd Generation Partnership Project; Technical Specification Group Radio Access Network; NR; Physical layer procedures for control (Release 18); [7] Chair's notes RAN1 #116bis eom0; [8]3GPP TS 38.321 V18.1.0 (March 2024) 3rd Generation Partnership Project; Technical Specification Group Radio Access Network; NR; Medium Access Control (MAC) protocol specification (Release 18); [9]3GPP TS 38.212 V18.2.0 (March 2024) 3rd Generation Partnership Project; Technical Specification Group Radio Access Network; NR; Multiplexing and channel coding (Release 18); [10] Chair notes RAN1 #117 eom0; and [11] RAN2 #126 meeting minute. The standards and documents listed above are hereby expressly and fully incorporated herein by reference in their entirety.

Figure 1:
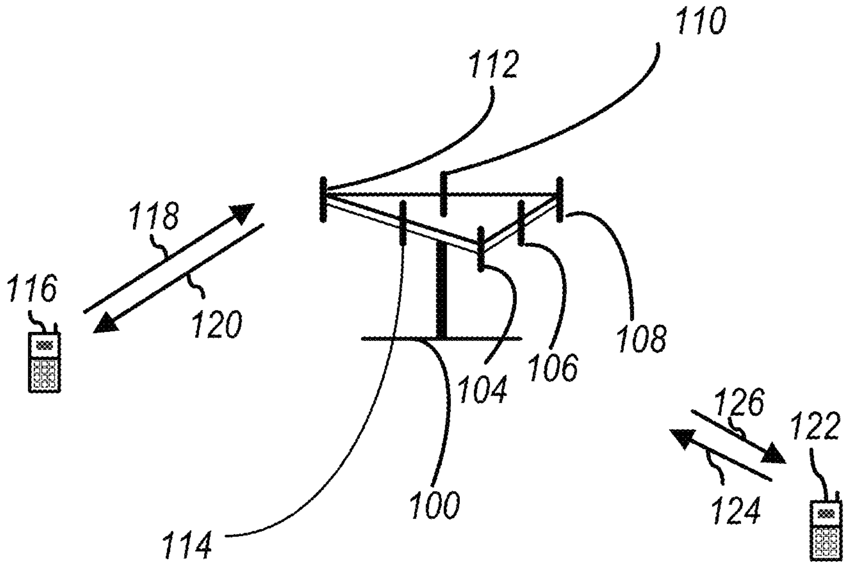
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
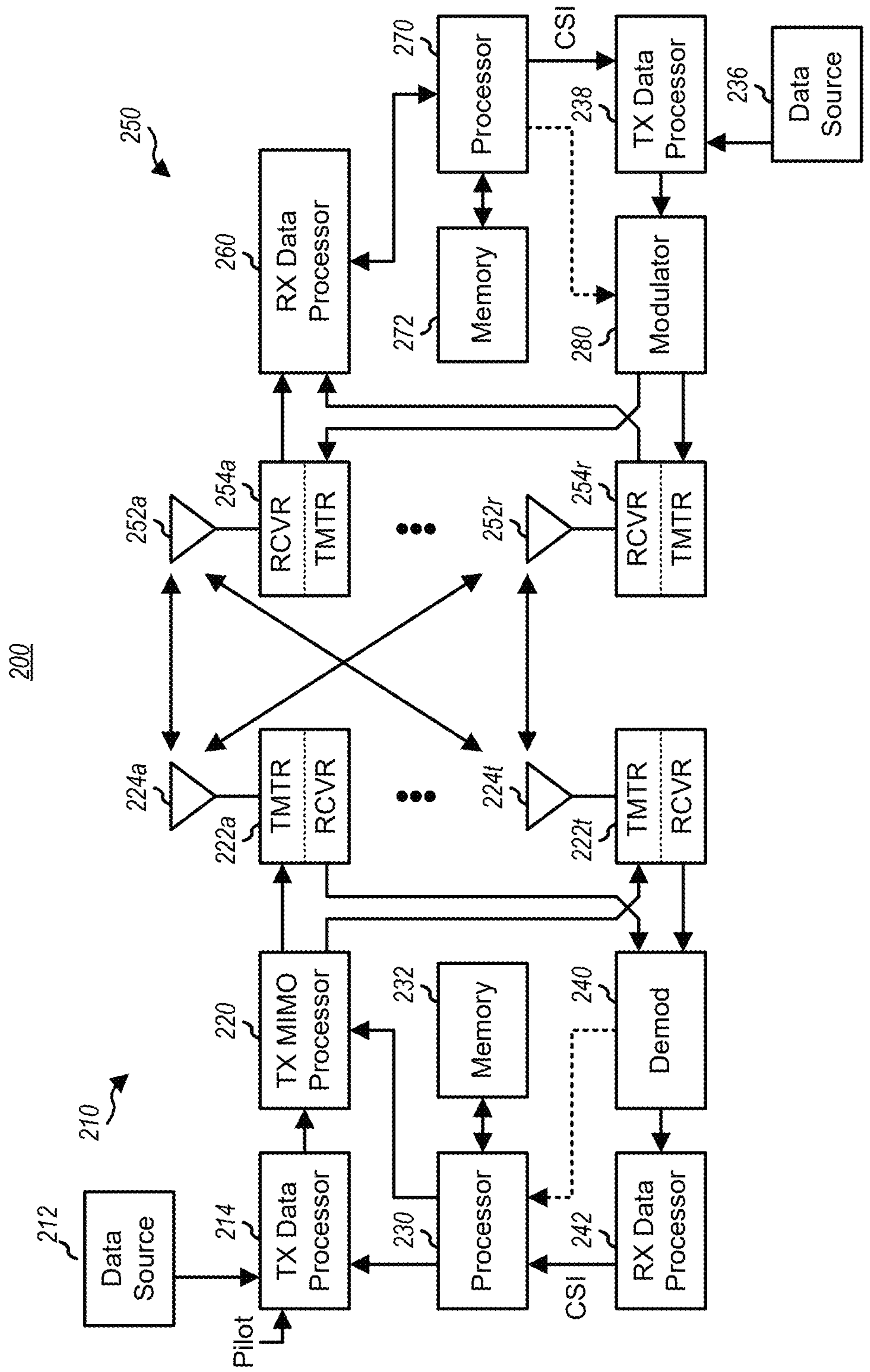
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by NR antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
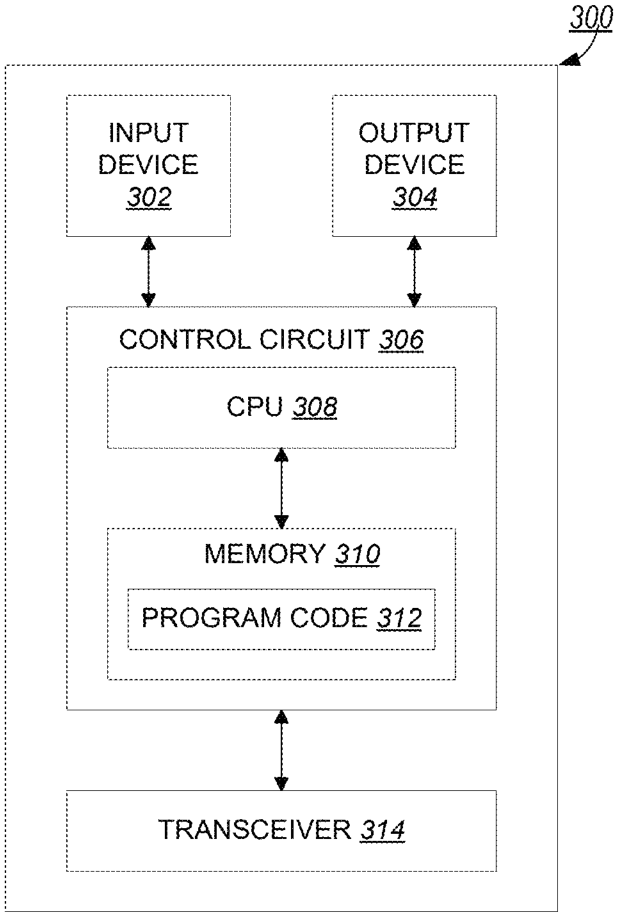
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
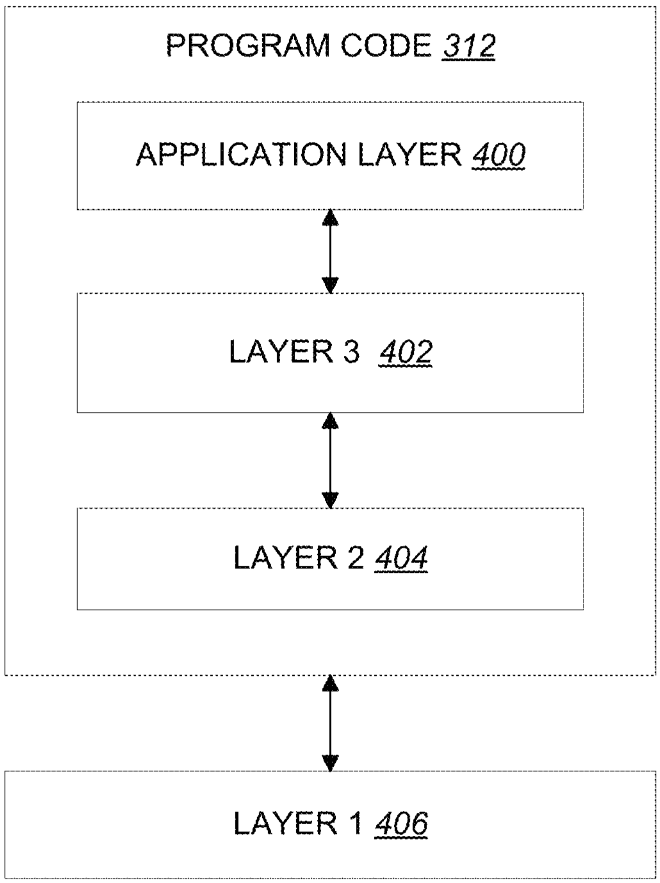
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In [1]3GPP TS 38.331 V18.1.0 (March 2024), related information elements are quoted below:

CSI-AperiodicTriggerStateList

The CSI-AperiodicTriggerStateList IE is used to configure the UE with a list of aperiodic trigger states. Each codepoint of the DCI field "CSI request" is associated with one trigger state (see TS 38.321 [3], clause 6.1.3.13). Upon reception of the value associated with a trigger state, the UE will perform measurement of CSI-RS, CSI-IM and/or SSB (reference signals) and aperiodic reporting on L1 according to all entries in the associatedReportConfigInfoList for that trigger state.

CSI-MeasConfig

The IE CSI-MeasConfig is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included. See also TS 38.214 [19], clause 5.2.

CSI-AperiodicTriggerStateList information element

```
CSI-AperiodicTriggerStateList ::=          SEQUENCE (SIZE (1..maxNrOfCSI-AperiodicTriggers)) OF CSI-
AperiodicTriggerState
CSI-AperiodicTriggerState ::=              SEQUENCE {
    associatedReportConfigInfoList           SEQUENCE (SIZE(1..maxNrofReportConfigPerAperiodicTrigger)) OF
CSI-AssociatedReportConfigInfo,
    ...,
    [[
    ap-CSI-MultiplexingMode-r17              ENUMERATED {enabled}
OPTIONAL   -- Need R
    ]],
    [[
    ltm-AssociatedReportConfigInfo-r18       LTM-CSI-ReportConfigId-r18
OPTIONAL   -- Need R
    ]]
}
CSI-AssociatedReportConfigInfo ::=         SEQUENCE {
    reportConfigId                           CSI-ReportConfigId,
    resourcesForChannel                      CHOICE {
      nzp-CSI-RS                               SEQUENCE {
        resourceSet                              INTEGER (1..maxNrofNZP-CSI-RS-ResourceSetsPerConfig),
        qcl-info                                 SEQUENCE (SIZE(1..maxNrofAP-CSI-RS-ResourcesPerSet))
OF TCI-StateId
OPTIONAL   -- Cond Aperiodic
      },
      csi-SSB-ResourceSet                      INTEGER (1..maxNrofCSI-SSB-ResourceSetsPerConfig)
    },
   ...
    ]]
}
```

| CSI-AperiodicTriggerState field descriptions |
| --- |
| ltm-AssociatedReportConfigInfo |
| This field configures the aperiodic CSI reports of LTM candidate cells. If ltm-associatedReportConfigInfo is configured the UE shall ignore the field associatedReportConfigInfoList. |

| CSI-AssociatedReportConfigInfo field descriptions |
| --- |
| csi-ReportSubConfigTriggerList |
| A list of sub-configuration ID(s) of N sub-configurations out of L configured sub-configurations within a CSI-ReportConfig associated with a triggering state for aperiodic CSI reporting on PUSCH.<br>reportConfigId |
| The reportConfigId of one of the CSI-ReportConfigToAddMod configured in CSI-MeasConfig<br>resourceSet |
| NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (value 1 corresponds to the first entry, value 2 to the second entry, and so on). |

CSI-MeasConfig information element

```
CSI-MeasConfig ::=                          SEQUENCE {
   nzp-CSI-RS-ResourceToAddModList              SEQUENCE (SIZE (1..maxNrofNZP-CSI-RS-Resources)) OF NZP-CSI-
RS-Resource    OPTIONAL,    -- Need N
   nzp-CSI-RS-ResourceToReleaseList             SEQUENCE (SIZE (1..maxNrofNZP-CSI-RS-Resources)) OF NZP-CSI-
RS-ResourceId OPTIONAL,    -- Need N
   nzp-CSI-RS-ResourceSetToAddModList           SEQUENCE (SIZE (1..maxNrofNZP-CSI-RS-ResourceSets)) OF NZP-
CSI-RS-ResourceSet
OPTIONAL,    -- Need N
   nzp-CSI-RS-ResourceSetToAddModList           SEQUENCE (SIZE (1..maxNrofNZP-CSI-RS-ResourceSets)) OF NZP-
CSI-RS-ResourceSet
OPTIONAL,    -- Need N
...
   csi-SSB-ResourceSetToAddModList              SEQUENCE (SIZE (1..maxNrofCSI-SSB-ResourceSets)) OF CSI-SSB-
ResourceSet    OPTIONAL,    -- Need N
   csi-SSB-ResourceSetToReleaseList             SEQUENCE (SIZE (1..maxNrofCSI-SSB-ResourceSets)) OF CSI-SSB-
ResourceSetId OPTIONAL,    -- Need N
   csi-ResourceConfigToAddModList               SEQUENCE (SIZE (1..maxNrofCSI-ResourceConfigurations)) OF
CSI-ResourceConfig
OPTIONAL,    -- Need N
   csi-ResourceConfigToReleaseList              SEQUENCE (SIZE (1..maxNrofCSI-ResourceConfigurations)) OF
CSI-ResourceConfigId
OPTIONAL,    -- Need N
   csi-ReportConfigToAddModList                 SEQUENCE (SIZE (1..maxNrofCSI-ReportConfigurations)) OF CSI-
ReportConfig OPTIONAL,    -- Need N
   csi-ReportConfigToReleaseList                SEQUENCE (SIZE (1..maxNrofCSI-ReportConfigurations)) OF CSI-
ReportConfigId
OPTIONAL,    -- Need N
   reportTriggerSize                            INTEGER (0..6)
OPTIONAL, -- Need M
   aperiodicTriggerStateList                    SetupRelease { CSI-AperiodicTriggerStateList }
OPTIONAL, -- Need M
   semiPersistentOnPUSCH-TriggerStateList           SetupRelease { CSI-SemiPersistentOnPUSCH-
TriggerStateList }                        OPTIONAL,    -- Need M
   ...,
   [[
   reportTriggerSizeDCI-0-2-r16                 INTEGER (0..6)
OPTIONAL -- Need R
   ]],
   [[
...
ltm-CSI-ReportConfigToAddModList-r18          SEQUENCE (SIZE (1..maxNrofLTM-CSI-ReportConfigurations-r18))
OF LTM-CSI-ReportConfig-r18
OPTIONAL,    -- Need N
   ltm-CSI-ReportConfigToReleaseList-r18            SEQUENCE (SIZE (1..maxNrofLTM-CSI-ReportConfigurations-
r18)) OF LTM-CSI-ReportConfigId-r18
OPTIONAL -- Need N
   ]]
}
```

CSI-MeasConfig field descriptions aperiodic TriggerStateList
Contains trigger states for dynamically selecting one or more aperiodic and semi-persistent reporting configurations and/or triggering one or more aperiodic CSI-RS resource sets for channel and/or interference measurement (see TS 38.214 [19], clause 5.2.1).
csi-ReportConfigToAddModList
Configured CSI report settings as specified in TS 38.214 [19] clause 5.2.1.1.
csi-ResourceConfigToAddModList
Configured CSI resource settings as specified in TS 38.214 [19] clause 5.2.1.2.
csi-SSB-ResourceSetToAddModList
Pool of CSI-SSB-ResourceSet which can be referred to from CSI-ResourceConfig.
nzp-CSI-RS-ResourceSetToAddModList
Pool of NZP-CSI-RS-ResourceSet which can be referred to from CSI-ResourceConfig or from MAC CEs.
nzp-CSI-RS-ResourceToAddModList
Pool of NZP-CSI-RS-Resource which can be referred to from NZP-CSI-RS-ResourceSet.
reportTriggerSize, reportTriggerSizeDCI-0-2
Size of CSI request field in DCI (bits) (see TS 38.214 [19], clause 5.2.1.5.1). The field reportTriggerSize applies to DCI format 0_1 and the field reportTriggerSizeDCI-0-2 applies to DCI format 0_2 (see TS 38.214 [19], clause 5.2.1.5.1).
ltm-CSI-ReportConfigToAddModList
Configured CSI report settings for LTM as specified in TS 38.214 [19].

CSI-ResourceConfig

The IE CSI-ResourceConfig defines a group of one or more NZP-CSI-RS-ResourceSet, CSI-IM-ResourceSet and/or CSI-SSB-ResourceSet.

CSI-ResourceConfig information element

```
CSI-ResourceConfig ::=                SEQUENCE {
   csi-ResourceConfigId                  CSI-ResourceConfigId,
   csi-RS-ResourceSetList                CHOICE {
      nzp-CSI-RS-SSB                        SEQUENCE {
         nzp-CSI-RS-ResourceSetList            SEQUENCE (SIZE (1..maxNrofNZP-CSI-RS-ResourceSetsPerConfig))
OF NZP-CSI-RS-ResourceSetId
OPTIONAL,   -- Need R
         csi-SSB-ResourceSetList               SEQUENCE (SIZE (1..maxNrofCSI-SSB-ResourceSetsPerConfig)) OF
CSI-SSB-ResourceSetId              OPTIONAL   -- Need R
      },
      csi-IM-ResourceSetList                SEQUENCE (SIZE (1..maxNrofCSI-IM-ResourceSetsPerConfig)) OF CSI-
IM-ResourceSetId
   },
   bwp-Id                                BWP-Id,
   resourceType                          ENUMERATED { aperiodic, semiPersistent, periodic },
   ...,
   [[
   csi-SSB-ResourceSetListExt-r17            CSI-SSB-ResourceSetId
OPTIONAL   -- Need R
   ]]
}
```

CSI-ResourceConfig field descriptions bwp-Id
The DL BWP which the CSI-RS associated with this CSI-ResourceConfig are located in (see TS 38.214 [19], clause 5.2.1.2.
csi-ResourceConfigId
Used in CSI-ReportConfig to refer to an instance of CSI-ResourceConfig.
csi-SSB-ResourceSetList, csi-SSB-ResourceSetListExt
List of references to SSB resources used for CSI measurement and reporting in a CSI-RS resource set (see TS 38.214 [19], clause 5.2.1.2). The csi-SSB-ResourceSetListExt provides additional references and can only be configured if csi-SSB-ResourceSetList is configured and groupBasedBeamReporting-v1710 is configured in the CSI-ReportConfig that indicates this CSI-ResourceConfig as resourcesForChannelMeasurement. . .
nzp-CSI-RS-ResourceSetList
List of references to NZP CSI-RS resources used for beam measurement and reporting in a CSI-RS resource set.
If resourceType is set to ‘aperiodic’, the network configures up to maxNrofNZP-CSI-RS-ResourceSetsPerConfig resource sets. If resource Type is is set to ‘periodic’ or ‘semiPersistent’ and groupBasedBeamReporting-v1710 is not configured in IE CSI-ReportConfig, the network configures 1 resource set. . .

CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

CSI-ReportConfig information element

```
CSI-ReportConfig ::=                  SEQUENCE {
      reportConfigId                        CSI-ReportConfigId,
      carrier                               ServCellIndex          OPTIONAL,   -- Need S
      resourcesForChannelMeasurement        CSI-ReportConfigId,
      csi-IM-ResourcesForInterference       CSI-ReportConfigId     OPTIONAL,   -- Need R
      nzp-CSI-RS-ResourcesForInterference   CSI-ReportConfigId     OPTIONAL,   -- Need R
      reportConfigType                      CHOICE {
         periodic                              SEQUENCE {
            reportSlotConfig                      CSI-ReportPeriodicityAndOffset,
            pucch-CSI-ResourceList                SEQUENCE (SIZE (1..maxNrofBWPs)) OF PUCCH-CSI-
Resource
         },
         semiPersistentOnPUCCH                 SEQUENCE {
            reportSlotConfig                      CSI-ReportPeriodicityAndOffset,
            pucch-CSI-ResourceList                SEQUENCE (SIZE (1..maxNrofBWPs)) OF PUCCH-CSI-
```

-continued

CSI-ReportConfig information element

```
Resource
        },
        semiPersistentOnPUSCH                  SEQUENCE {
           reportSlotConfig                       ENUMERATED {sl5, sl10, sl20, sl40, sl80, sl160,
sl320},
           reportSlotOffsetList            SEQUENCE (SIZE (1.. maxNrofUL-Allocations)) OF
INTEGER(0..32),
           p0alpha                                P0-PUSCH-AlphaSetId
        },
        aperiodic                              SEQUENCE {
           reportSlotOffsetList                SEQUENCE (SIZE (1..maxNrofUL-Allocations)) OF
INTEGER(0..32),
        }
     },
     reportQuantity                         CHOICE {
        none                                   NULL,
        cri-RI-PMI-CQI                         NULL,
        cri-RI-i1                              NULL,
        cri-RI-i1-CQI                          SEQUENCE {
           pdsch-BundleSizeForCSI                 ENUMERATED {n2, n4}
OPTIONAL    -- Need S
        },
        cri-RI-CQI                             NULL,
        cri-RSRP                               NULL,
        ssb-Index-RSRP                         NULL,
        cri-RI-LI-PMI-CQI                      NULL
     },
     }
OPTIONAL,    -- Need R
...
   ...
     ]]
}
CSI-ReportPeriodicityAndOffset ::=   CHOICE {
     slots4                                INTEGER(0..3),
     slots5                                INTEGER(0..4),
     slots8                                INTEGER(0..7),
     slots10                               INTEGER(0..9),
     slots16                               INTEGER(0..15),
     slots20                               INTEGER(0..19),
     slots40                               INTEGER(0..39),
     slots80                               INTEGER(0..79),
     slots160                              INTEGER(0..159),
     slots320                              INTEGER(0..319)
}
...
}
```

CSI-ReportConfig field descriptions carrier
Indicates in which serving cell the CSI-ResourceConfig indicated below are to be found. If the field is absent, the resources are on the same serving cell as this report configuration.
nrofReportedRS
The number (N) of measured RS resources to be reported per report setting in a non-group-based report. N <= N_max, where N_max is either 2 or 4 depending on UE capability.
(see TS 38.214 [19], clause 5.2.1.4) When the field is absent the UE applies the value 1.
pucch-CSI-ResourceList
Indicates which PUCCH resource to use for reporting on PUCCH.
reportConfigType
Time domain behavior of reporting configuration.
reportFreqConfiguration
Reporting configuration in the frequency domain. (see TS 38.214 [19], clause 5.2.1.4).
reportQuantity
The CSI related quantities to report. see TS 38.214 [19], clause 5.2.1. If the field reportQuantity-r16 or reportQuantity-r17 is present, UE shall ignore reportQuantity (without suffix). Network does not configure reportQuantity-r17 together with reportQuantity-r16.
reportSlotConfig
Periodicity and slot offset (see TS 38.214 [19], clause 5.2.1.4). If the field reportSlotConfig-v1530 is present, the UE shall ignore the value provided in reportSlotConfig (without suffix).
reportSlotOffsetList, reportSlotOffsetListDCI-0-1, reportSlotOffsetListDCI-0-2
. . .

-continued

| CSI-ReportConfig field descriptions |
|---|
| Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see TS 38.214 [19], clause 6.1.2.1).<br>The field reportSlotOffsetListDCI-0-1 applies to DCI format 0_1 and the field reportSlotOffsetListDCI-0-2 applies to DCI format 0_2 (see TS 38.214 [19], clause 6.1.2.1).<br>. . .<br>resourcesForChannelMeasurement<br>Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig. |

ConfiguredGrantConfig

The IE ConfiguredGrantConfig is used to configure uplink transmission without dynamic grant according to two possible schemes. The actual uplink grant may either be configured via RRC (type1) or provided via the PDCCH (addressed to CS-RNTI) (type2). Multiple Configured Grant configurations may be configured in one BWP of a serving cell.

ConfiguredGrantConfig information element

```
ConfiguredGrantConfig ::=            SEQUENCE {
   frequencyHopping                     ENUMERATED {intraSlot, interSlot}
OPTIONAL,   -- Need S
   ...
   uci-OnPUSCH                          SetupRelease { CG-UCI-OnPUSCH }
OPTIONAL,   -- Need M
   resourceAllocation                   ENUMERATED { resourceAllocationType0,
resourceAllocationType1, dynamicSwitch },
   ...
   periodicity                          ENUMERATED {
                                              sym2, sym7, sym1x14, sym2x14, sym4x14, sym5x14,
sym8x14, sym10x14, sym16x14, sym20x14,
                                              sym32x14, sym40x14, sym64x14, sym80x14, sym128x14,
sym160x14, sym256x14, sym320x14, sym512x14,
                                              sym640x14, sym1024x14, sym1280x14, sym2560x14,
sym5120x14,
                                              sym6, sym1x12, sym2x12, sym4x12, sym5x12, sym8x12,
sym10x12, sym16x12, sym20x12, sym32x12,
                                              sym40x12, sym64x12, sym80x12, sym128x12, sym160x12,
sym256x12, sym320x12, sym512x12, sym640x12,
                                              sym1280x12, sym2560x12
   },
   configuredGrantTimer                 INTEGER (1..64)
OPTIONAL,   -- Need R
   rrc-ConfiguredUplinkGrant            SEQUENCE {
         timeDomainOffset                  INTEGER (0..5119),
         timeDomainAllocation              INTEGER (0..15),
         frequencyDomainAllocation         BIT STRING (SIZE(18)),
      ...
         ]]
   }
OPTIONAL,   -- Need R
   ...,
   [[
   ...
}
```

| ConfiguredGrantConfig field descriptions |
|---|
| configuredGrantConfigIndex<br>Indicates the index of the Configured Grant configurations within the BWP.<br>configuredGrantConfigIndexMAC<br>Indicates the index of the Configured Grant configurations within the MAC entity.<br>periodicityExt<br>This field is used to calculate the periodicity for UL transmission without UL grant for type 1 and type 2 (see TS 38.321 [3], clause 5.8.2). If this field is present, the UE shall ignore field periodicity (without suffix). Network does not configure periodicityExt-r17 together with periodicityExt-r16. |

-continued

| ConfiguredGrantConfig field descriptions | |
|---|---|
| The following periodicites are supported depending on the configured subcarrier spacing [symbols]: | |
| 15 kHz: | periodicityExt*14, where periodicityExt has a value between 1 and 640. |
| 30 KHz: | periodicityExt*14, where periodicityExt has a value between 1 and 1280. |
| 60 KHz with normal CP: | periodicityExt*14, where periodicityExt has a value between 1 and 2560. |
| 60 KHz with ECP: | periodicityExt*12, where periodicityExt has a value between 1 and 2560. |
| 120 KHz: | periodicityExt*14, where periodicityExt has a value between 1 and 5120. |
| 480 KHz: | periodicityExt*14, where periodicityExt has a value between 1 and 20480. |
| 960 KHz: | periodicityExt*14, where periodicityExt has a value between 1 and 40960. |
| phy-PriorityIndex | |
| Indicates the PHY priority of CG PUSCH at least for PHY-layer collision handling. Value p0 indicates low priority and value p1 indicates high priority. The network does not configure this for CG-SDT. | |
| resourceAllocation | |
| Configuration of resource allocation type 0 and resource allocation type 1. For Type 1 UL data transmission without grant, resourceAllocation should be resourceAllocationType0 or resourceAllocation Type1. | |
| rrc-ConfiguredUplinkGrant | |
| Configuration for "configured grant" transmission with fully RRC-configured UL grant (Type1). If this field is absent the UE uses UL grant configured by DCI addressed to CS-RNTI (Type2). | |

NZP-CSI-RS-Resource

The IE NZP-CSI-RS-Resource is used to configure Non-Zero-Power (NZP) CSI-RS transmitted in the cell where the IE is included, which the UE may be configured to measure on (see IS 38.214 [19], clause 5.2.2.3.1). A change of configuration between periodic, semi-persistent or aperiodic for an NZP-CSI-RS-Resource is not supported without a release and add.

NZP-CSI-RS-Resource information element

```
NZP-CSI-RS-Resource ::=   SEQUENCE {
   nzp-CSI-RS-ResourceId      NZP-CSI-RS-ResourceId,
   resourceMapping            CSI-RS-ResourceMapping,
   powerControlOffset         INTEGER (-8..15),
   powerControlOffsetSS       ENUMERATED{db-3, db0, db3, db6}   OPTIONAL,  -
- Need R
   scramblingID               ScramblingId,
   periodicityAndOffset       CSI-ResourcePeriodicityAndOffset   OPTIONAL,  -
- Cond PeriodicOrSemiPersistent
   qcl-InfoPeriodicCSI-RS     TCI-StateId                        OPTIONAL,  -
- Cond Periodic
   ...
}
```

| NZP-CSI-RS-Resource field descriptions |
|---|
| periodicityAndOffset |
| Periodicity and slot offset sl1 corresponds to a periodicity of 1 slot, sl2 to a periodicity of two slots, and so on. The corresponding offset is also given in number of slots (see TS 38.214 [19], clause 5.2.2.3.1). Network always configures the UE with a value for this field for periodic and semi-persistent NZP-CSI-RS-Resource (as indicated in CSI-ResourceConfig). |
| powerControlOffset |
| Power offset of PDSCH RE to NZP CSI-RS RE. Value in dB (see TS 38.214 [19], clauses 5.2.2.3.1 and 4.1). |
| powerControlOffsetSS |
| Power offset of NZP CSI-RS RE to SSS RE. Value in dB (see TS 38.214 [19], clause 5.2.2.3.1). |
| qcl-InfoPeriodicCSI-RS |
| For a target periodic CSI-RS, contains a reference to one TCI-State in TCI-States for providing the QCL source and QCL type. For periodic CSI-RS, the source can be SSB or another periodic-CSI-RS. Refers to the TCI-State or dl-OrJoint-TCI-State which has this value for tci-StateId and is defined in tci-States ToAddModList or in dl-OrJointTCI-StateToAddModList in the PDSCH-Config included in the BWP-Downlink corresponding to the serving cell and to the DL BWP to which the resource belongs to (see TS 38.214 [19], clause 5.2.2.3.1). |
| resourceMapping |
| OFDM symbol location(s) in a slot and subcarrier occupancy in a PRB of the CSI-RS resource. |

NZP-CSI-RS-ResourceSet

The IE NZP-CSI-RS-ResourceSet is a set of Non-Zero-Power (NZP) CSI-RS resources (their IDs) and set-specific parameters.

NZP-CSI-RS-ResourceSet information element

```
NZP-CSI-RS-ResourceSet ::=      SEQUENCE {
   nzp-CSI-ResourceSetId            NZP-CSI-RS-ResourceSetId,
   nzp-CSI-RS-Resources             SEQUENCE (SIZE (1..maxNrofNZP-CSI-RS-ResourcesPerSet)) OF
NZP-CSI-RS-ResourceId,
   repetition                       ENUMERATED { on, off }
OPTIONAL,   -- Need S
   aperiodicTriggeringOffset        INTEGER(0..6)
OPTIONAL,   -- Need S
   trs-Info                         ENUMERATED {true}
OPTIONAL,   -- Need R
   ...,
   [[
   aperiodicTriggeringOffset-r16    INTEGER(0..31)
OPTIONAL,   -- Need S
   ]],
   [[
   ...
   ]]
}
...
NZP-CSI-RS-Pairing-r17 ::=        SEQUENCE {
   nzp-CSI-RS-ResourceId1-r17         INTEGER (1..7),
   nzp-CSI-RS-ResourceId2-r17         INTEGER (1..7)
}
```

| NZP-CSI-RS-ResourceSet field descriptions |
|---|
| nzp-CSI-RS-Resources<br>NZP-CSI-RS-Resources associated with this NZP-CSI-RS resource set (see TS 38.214 [19], clause 5.2). For CSI, there are at most 8 NZP CSI RS resources per resource set. |

```
...
PUCCH-Resource ::=               SEQUENCE {
   pucch-ResourceId                 PUCCH-ResourceId,
   startingPRB                      PRB-Id,
   intraSlotFrequencyHopping        ENUMERATED { enabled }
OPTIONAL,   -- Need R
   secondHopPRB                     PRB-Id
OPTIONAL,   -- Need R
   format                           CHOICE {
      format0                          PUCCH-format0,
      format1                          PUCCH-format1,
      format2                          PUCCH-format2,
      format3                          PUCCH-format3,
      format4                          PUCCH-format4
   }
}
PUCCH-ResourceId ::=             INTEGER (0..maxNrofPUCCH-Resources-1)
PUCCH-format0 ::=                   SEQUENCE {
   initialCyclicShift                  INTEGER(0..11),
   nrofSymbols                         INTEGER (1..2),
   startingSymbolIndex                 INTEGER(0..13)
}
PUCCH-format1 ::=                   SEQUENCE {
   initialCyclicShift                  INTEGER(0..11),
   nrofSymbols                         INTEGER (4..14),
   startingSymbolIndex                 INTEGER(0..10),
   timeDomainOCC                       INTEGER(0..6)
}
PUCCH-format2 ::=                   SEQUENCE {
   nrofPRBs                            INTEGER (1..16),
   nrofSymbols                         INTEGER (1..2),
   startingSymbolIndex                 INTEGER(0..13)
}
PUCCH-format3 ::=                   SEQUENCE {
   nrofPRBs                            INTEGER (1..16),
   nrofSymbols                         INTEGER (4..14),
   startingSymbolIndex                 INTEGER(0..10)
}
PUCCH-format4 ::=                   SEQUENCE {
   nrofSymbols                         INTEGER (4..14),
```

-continued

```
  occ-Length                          ENUMERATED {n2,n4},
  occ-Index                           ENUMERATED {n0,n1,n2,n3},
  startingSymbolIndex                 INTEGER(0..10)
}
```

ServingCellConfig

The IE ServingCellConfig is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.

ServingCellConfig information element

```
ServingCellConfig ::=     SEQUENCE {
...
  csi-MeasConfig            SetupRelease { CSI-MeasConfig }
OPTIONAL,   -- Need M
...
```

SchedulingRequestConfig

The IE SchedulingRequestConfig is used to configure the parameters, for the dedicated scheduling request (SR) resources.

SchedulingRequestConfig information element

```
SchedulingRequestConfig ::=                SEQUENCE {
  schedulingRequestToAddModList              SEQUENCE (SIZE (1..maxNrofSR-ConfigPerCellGroup)) OF
SchedulingRequestToAddMod
OPTIONAL,   -- Need N
  schedulingRequestToReleaseList             SEQUENCE (SIZE (1..maxNrofSR-ConfigPerCellGroup)) OF
SchedulingRequest Id
OPTIONAL -- Need N
}
SchedulingRequestToAddMod ::=              SEQUENCE {
  schedulingRequestId                        SchedulingRequestId,
  sr-ProhibitTimer                           ENUMERATED {ms1, ms2, ms4, ms8, ms16, ms32, ms64, ms128}
OPTIONAL, -- Need S
  sr-TransMax                                ENUMERATED { n4, n8, n16, n32, n64, spare3, spare2, spare1}
}
SchedulingRequestConfig-v1700 ::=            SEQUENCE {
  schedulingRequestToAddModListExt-v1700       SEQUENCE (SIZE (1..maxNrofSR-ConfigPerCellGroup)) OF
SchedulingRequestToAddModExt-v1700
OPTIONAL    -- Need N
}
SchedulingRequestToAddModExt-v1700 ::=       SEQUENCE {
  sr-ProhibitTimer-v1700                       ENUMERATED { ms192, ms256, ms320, ms384, ms448, ms512,
ms576, ms640, ms1082, spare7, spare6, spare5, spare4, spare3, spare2, spare1}
OPTIONAL    -- Need R
}
```

| Scheduling RequestConfig field descriptions |
|---|
| schedulingRequestToAddModList, schedulingRequestToAddModListExt<br>List of Scheduling Request configurations to add or modify. If scheduling RequestToAddModListExt is configured, it contains the same number of entries, and in the same order, as schedulingRequestToAddModList. |
| schedulingRequestToReleaseList<br>List of Scheduling Request configurations to release. |

| Scheduling RequestToAddMod field descriptions |
|---|
| schedulingRequestId<br>Used to modify a SR configuration and to indicate, in LogicalChannelConfig, the SR configuration to which a logical channel is mapped and to indicate, in SchedulingRequestresourceConfig, the SR configuration for which a scheduling request resource is used. |

SchedulingRequestId

The IE SchedulingRequestId is used to identify a Scheduling Request instance in the MAC layer.

SchedulingRequestResourceConfig

The IE SchedulingRequestResourceConfig determines physical layer resources on PUCCH where the UE may send the dedicated scheduling request (D-SR) (see TS 38.213 [13], clause 9.2.4).

SchedulingRequestResourceConfig information element

```
SchedulingRequestResourceConfig ::=          SEQUENCE {
   schedulingRequestResourceId                 SchedulingRequestResourceId,
   schedulingRequestId                         schedulingRequestId,
   periodicityAndOffset                        CHOICE {
      sym2                                         NULL,
      sym6or7                                      NULL,
      sl1                                          NULL,    -- Recurs in every slot
      sl2                                          INTEGER (0..1),
      sl4                                          INTEGER (0..3),
      sl5                                          INTEGER (0..4),
      sl8                                          INTEGER (0..7),
      sl10                                         INTEGER (0..9),
      sl16                                         INTEGER (0..15),
      sl20                                         INTEGER (0..19),
      sl40                                         INTEGER (0..39),
      sl80                                         INTEGER (0..79),
      sl160                                        INTEGER (0..159),
      sl320                                        INTEGER (0..319),
      sl640                                        INTEGER (0..639)
   }
OPTIONAL   -- Need M
   resource                                    PUCCH-ResourceId
OPTIONAL   -- Need M
   }
SchedulingRequestResourceConfigExt-v1610 ::=      SEQUENCE {
   phy-PriorityIndex-r16                           ENUMERATED {p0, p1}
OPTIONAL,   -- Need M
   ...
}
...
}
```

SchedulingRequestResourceConfig field descriptions periodicityAndOffset
SR periodicity and offset in number of symbols or slots (see TS 38.213 [13], clause 9.2.4) The following periodicities may be configured depending on the chosen subcarrier spacing:
SCS = 15 kHz: 2sym, 7sym, 1sl, 2sl, 4sl, 5sl, 8sl, 10sl, 16sl, 20sl, 40sl, 80sl
SCS = 30 kHz: 2sym, 7sym, 1sl, 2sl, 4sl, 5sl, 8sl, 10sl, 16sl, 20sl, 40sl, 80sl, 160sl
SCS = 60 KHz: 2sym, 7sym/6sym, 1sl, 2sl, 4sl, 8sl, 16sl, 20sl, 40sl, 80sl, 160sl, 320sl
SCS = 120 kHz: 2sym, 7sym, 1sl, 2sl, 4sl, 5sl, 8sl, 10sl, 16sl, 40sl, 80sl, 160sl, 320sl, 640sl
SCS = 480 kHz: 1sl, 2sl, 4sl, 8sl, 16sl, 40sl, 80sl, 160sl, 320sl, 640sl, 1280sl, 2560sl
SCS = 960 kHz: 1sl, 2sl, 4sl, 8sl, 16sl, 40sl, 80sl, 160sl, 320sl, 640sl, 1280sl, 2560sl, 5120sl
sym6or7 corresponds to 6 symbols if extended cyclic prefix and a SCS of 60 KHz are configured, otherwise it corresponds to 7 symbols.
For periodicities 2sym, 7sym and sl1 the UE assumes an offset of 0 slots.
. . .
phy-PriorityIndex
Indicates whether this scheduling request resource is high or low priority in PHY prioritization/multiplexing handling (see
TS 38.213 [13], clause 9.2.4). Value p0 indicates low priority and value p1 indicates high priority.
resource
ID of the PUCCH resource in which the UE shall send the scheduling request. The actual PUCCH-Resource is configured in PUCCH-Config of the same UL BWP and serving cell as this Scheduling RequestResourceConfig. The network configures a PUCCH-Resource of PUCCH-format0 or PUCCH-format1 (other formats not supported) (see TS 38.213 [13], clause 9.2.4)
schedulingRequestID
The ID of the SchedulingRequestConfig that uses this scheduling request resource.

In [2]3GPP TS 38.214 V17.3.0 (September 2022), TCI state related paragraphs are quoted below:

5.1.5 Antenna Ports Quasi Co-Location

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'typeA': {Doppler shift, Doppler spread, average delay, delay spread}

'typeB': {Doppler shift, Doppler spread}

'typeC': {Doppler shift, average delay}

'typeD': {Spatial Rx parameter}

The UE can be configured with a list of up to 128 TCIState configurations, within the higher layer parameter dl-OrJoint-TCIStateList in PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS.

If the TCIState or UL-TCIState configurations are absent in a BWP of the CC, the UE can apply the TCIState or UL-TCIState configurations from a reference BWP of a reference CC. The UE is not expected to be configured with TCI-State, SpatialRelationInfo or PUCCH-SpatialRelationInfo, except SpatialRelationInfoPos in a CC in a band, if the UE is configured with dl-OrJoint-TCIStateList or UL-TCIState in any CC in the same band. The UE can assume that when the UE is configured with TCI-State in any CC in the CC list configured by simultaneousTCI-UpdateList1-r16, simultaneousTCI-UpdateList2-r16, simultaneousSpatial-UpdatedList1-r16, or simultaneousSpatial-UpdatedList2-r16, the UE is not configured with dl-OrJoint-TCIStateList or UL-TCIState in any CC within the same band in the CC list.

The UE receives an activation command, as described in clause 6.1.3.14 of [10, TS 38.321] or 6.1.3.47 of [10, TS 38.321], used to map up to 8 TCI states and/or pairs of TCI states, with one TCI state for DL channels/signals and/or one TCI state for UL channels/signals to the codepoints of the DCI field 'Transmission Configuration Indication' for one or for a set of CCs/DL BWPs, and if applicable, for one or for a set of CCs/UL BWPs. When a set of TCI state IDs are activated for a set of CCs/DL BWPs and if applicable, for a set of CCs/UL BWPs, where the applicable list of CCs is determined by the indicated CC in the activation command, the same set of T state IDs are applied for all DL and/or UL BWPs in the indicated CCs. If the activation command maps TCIState and/or UL-TCIState to only one TCI codepoint, the UE shall apply the indicated TCIState and/or UL-TCIState to one or to a set of CCs/DL BWPs, and if applicable, to one or to a set of CCs/UL BWPs once the indicated mapping for the one single TCI codepoint is applied as described in [11, TS 38.133].

When the bwp-id or cell for QCL-TypeA/D source RS in a QCL-Info of the TCI state is not configured, the UE assumes that QCL-TypeA/D source RS is configured in the CC/DL BWP where TCI state applies.

. . .

If a UE receives a higher layer configuration of dl-OrJoint-TCIStateList with a single TCIState, that can be used as an indicated TCI state, the UE obtains the QCL assumptions from the configured TCI state for DM-RS of PDSCH and DM-RS of PDCCH, and the CSI-RS applying the indicated TCI state.

If a UE receives a higher layer configuration of dl-OrJoint-TCIStateList with a single TCIState or a single UL-TCIState, that can be used as an indicated TCI state, the UE determines an UL TX spatial filter, if applicable, from the configured TCI state for dynamic-grant and configured-grant based PUSCH and PUCCH, and SRS applying the indicated TCI state.

When the UE would transmit a PUCCH with HARQ-ACK information or a PUSCH with HARQ-ACK information corresponding to the DCI carrying the TCI State indication and without DL assignment, or corresponding to the PDSCH scheduled by the DCI carrying the TCI State indication, and if the indicated TCI State is different from the previously indicated one, the indicated DLorJointTCIState or UL-TCIstate should be applied starting from the first slot that is at least beamAppTime symbols after the last symbol of the PUCCH or the PUSCH. The first slot and the beamAppTime symbols are both determined on the active BWP with the smallest SCS among the active BWP(s) of the carrier(s) applying the beam indication.

. . .

When a UE supports two TCI states in a codepoint of the DCI field 'Transmission Configuration Indication' the UE may receive an activation command, as described in clause 6.1.3.24 of [10, TS 38.321], the activation command is used to map up to 8 combinations of one or two TCI states to the codepoints of the DCI field 'Transmission Configuration Indication'. The UE is not expected to receive more than 8 TCI states in the activation command.

. . .

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $$n + 3N_{slot}^{subframe,\mu} + \frac{2^{\mu}}{2^{\mu_{K_{mac}}}} \cdot k_{mac}$$

where μ is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}=0$ if K-Mac is not provided. If tci-PresentInDCI is set to 'enabled' or tci-PresentDCI-1-2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

If a UE is configured with the higher layer parameter tci-PresentInDCI that is set as 'enabled' for the CORESET scheduling a PDSCH, the UE assumes that the TCI field is present in the DCI format 1_1 of the PDCCH transmitted on the CORESET. If a UE is configured with the higher layer parameter tci-PresentDCI-1-2 for the CORESET scheduling the PDSCH, the UE assumes that the TCI field with a DCI field size indicated by tci-PresentDCI-1-2 is present in the DCI format 1_2 of the PDCCH transmitted on the CORESET. If a UE is configured with the higher layer parameter tci-PresentInDCI that is set as 'enabled' for the CORESET scheduling the multicast PDSCH, the UE assumes that the T field is present in the DCI format 4_2 of the PDCCH transmitted on the CORESET. If the PDSCH is scheduled by a DCI format not having the TCI field present, and the time offset between the reception of the DL DCI and the corresponding PDSCH of a serving cell is equal to or greater than a threshold timeDurationForQCL if applicable, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

5.1.6.1.2 CSI-RS for L1-RSRP and L1-SINR Computation

If a UE is configured with a NZP-CSI-RS-ResourceSet configured with the higher layer parameter repetition set to 'on', the UE may assume that the CSI-RS resources, described in Clause 5.2.2.3.1, within the NZP-CSI-RS-ResourceSet are transmitted with the same downlink spatial domain transmission filter, where the CSI-RS resources in the NZP-CSI-RS-ResourceSet are transmitted in different OFDM symbols. If repetition is set to 'off', the UE shall not assume that the CSI-RS resources within the NZP-CSI-RS-ResourceSet are transmitted with the same downlink spatial domain transmission filter.

If the UE is configured with a CSI-ReportConfig with reportQuantity set to 'cri-RSRP', 'cri-SINR' or 'none' and if the CSI-ResourceConfig for channel measurement (higher layer parameter resourcesForChannelMeasurement) contains a NZP-CSI-RS-ResourceSet that is configured with the higher layer parameter repetition and without the higher layer parameter trs-Info, the UE can only be configured with the same number (1 or 2) of ports with the higher layer parameter nrofPorts for all CSI-RS resources within the set. If the UE is configured with the CSI-RS resource in the same OFDM symbol(s) as an SS/PBCH block, the UE may assume that the CSI-RS and the SS/PBCH block are quasi co-located with 'typeD' if 'typeD' is applicable. Furthermore, the UE shall not expect to be configured with the CSI-RS in PRBs that overlap with those of the SS/PBCH block, and the UE shall expect that the same subcarrier spacing is used for both the CSI-RS and the SS/PBCH block.

5.2.1.4.3 L1-RSRP Reporting

For L1-RSRP computation the UE may be configured with CSI-RS resources, SS/PBCH Block resources or both CSI-RS and SS/PBCH block resources, when resource-wise quasi co-located with 'type C' and 'typeD' when applicable.

the UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', or if the higher layer parameter groupBasedBeamReporting-r17 is configured, the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

In [3]3GPP TS 38.321 V17.3.0 (December 2022), the following is provided:

6.1.3.47 Unified TCI States Activation/Deactivation MAC CE

The Unified TCI States Activation/Deactivation MAC CE is identified by a MAC subheader with eLCID as specified in Table 6.2.1-1b. It has a variable size consisting of following fields:

Serving Cell ID: This field indicates the identity of the Serving Cell for which the MAC CE applies. The length of the field is 5 bits. If the indicated Serving Cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331 [5], this MAC CE applies to all theServing Cells in the set simultaneousU-TCI-UpdateList1, simultaneousU-TCI-UpdateList2, simultaneousU-TCI-UpdateList3 or simultaneousU-TCI-UpdateList4, respectively;

DL BWP ID: This field indicates a DL BWP for which the MAC CE applies as the codepoint of the DCI bandwidth part indicator field as specified in TS 38.212 [9]. The length of the BWP ID field is 2 bits;

UL BWP ID: This field indicates a UL BWP for which the MAC CE applies as the codepoint of the DCI bandwidth part indicator field as specified in TS 38.212 [9]. If value of unifiedTCI-StateType in the Serving Cell indicated by Serving Cell ID is joint, this field is considered as the reserved bits. The length of the BWP ID field is 2 bits;

$P_i$: This field indicates whether each TCI codepoint has multiple TCI states or single TCI state. If $P_i$ field is set to 1, it indicates that $i^{th}$ TCI codepoint includes the DL TCI state and the UL TCI state. If $P_i$ field is set to 0, it indicates that $i^{th}$ TCI codepoint includes only the DL/joint TCI state or the UL TCI state. The codepoint to which a TCI state is mapped is determined by its ordinal position among all the TCI state ID fields;

D/U: This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink;

TCI state ID: This field indicates the TCI state identified by TCI-StateId as specified in TS 38.331 [5]. If D/U is set to 1, 7-bits length TCI state ID i.e. TCI-StateId as specified in TS 38.331 [5] is used. If D/U is set to 0, the most significant bit of TCI state ID is considered as the reserved bit and remainder 6 bits indicate the UL-TCIState-Id as specified in TS 38.331 [5]. The maximum number of activated TCI states is 16;

R: Reserved bit, set to 0.

FIG. 5 is a reproduction of FIG. 6.1.3.47-1: Unified TCI state activation/deactivation MAC CE, from 3GPP TS 38.321 V17.3.0.

6.1.3.15 TCI State Indication for UE-Specific PDCCH MAC CE

The TCI State Indication for UE-specific PDCCH MAC CE is identified by a MAC subheader with LCID as specified in Table 6.2.1-1. It has a fixed size of 16 bits with following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all theServing Cells in the set simultaneousTCI-UpdateList1 or simultaneousTCI-UpdateList2, respectively;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-StatesToAddModList and tci-StatesToReleaseList in the PDSCH-Config in the active BWP or by dl-OrJoint-TCI-State-ToAddModList and dl-OrJoint-TCI-State-ToReleaseList in the PDSCH-Config in the active BWP or the reference BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

FIG. 6 is a reproduction of FIG. 6.1.3.15-1: TCI State Indication for UE-specific PDCCH MAC CE, from 3GPP TS 38.321 V17.3.0.

In [4] Chair notes RAN1 #116 eom0, the following is provided:

On UE-initiated/event-driven beam report, at least of following aspects should be included:

- Trigger-event detection for beam reporting by UE
  - UE monitors RS to assess if a beam-reporting trigger condition has been met
  - FFS: Trigger condition for declaring beam-reporting event
- Beam-report transmission by UE
  - Signaling contents in the beam report
  - Down-selection one or more options (strive for one) between the following options as signaling medium/container for beam report transmission
    - MAC-CE
    - UCI
    - Others are not precluded.

On UE-initiated/event-driven beam report, the following aspects may be included:

- UE requesting UL resource(s) for the beam report
- UE notifying transmission of beam report
- gNB preconfigured resources On UE-initiated/event-driven beam reporting, regarding trigger-event detection for beam reporting, RAN1 further study at least the following aspects: quality metrics, event-definition and threshold.

- Further study trigger events, including the following example as a starting point
  - Event-1: Quality of the current beam is worse than a certain threshold.
  - Event-2: Quality of at least one new beam, such as L1-RSRP, becomes a threshold value better than the current beam.
  - Event-3: Quality of a new beam is better than a certain threshold.
  - Event-4: Quality of the current beam is worse than a threshold 1, and quality of at least one new beam is better than a threshold 2.

On UE-initiated/event-driven beam reporting, at least support L1-RSRP as a measurement quantity on SSB for intra-cell and inter-cell, and periodic CSI-RS for beam management

- Notes: measurement results may be contained in the beam report and/or used as quality metric(s) to initiate/trigger the reporting.

On UE-initiated/event-driven beam reporting, regarding signaling content(s), at least support DL RS resource indicator and L1-RSRP In [5]3GPP TS 38.214 V18.2.0 (March 2024), the following is provided:

5.2 UE Procedure for Reporting Channel State Information (CSI)

5.2.1 Channel State Information Framework

The procedures on aperiodic CSI reporting described in this clause assume that the CSI reporting is triggered by DCI format 0_1, but they equally apply to CSI reporting triggered by DCI format 0_2, by applying the higher layer parameter reportTriggerSizeDCI-0-2 instead of reportTriggerSize. The procedures on aperiodic CSI reporting described in this clause assume that the CSI reporting is triggered by DCI format 0_1, but they equally apply to CSI reporting triggered by DCI format 0_3.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP, L1-SINR, CapabilityIndex or time-domain channel properties (TDCP).

For CQI, PMI, CRI, SSBRI, L1, RI, L1-RSRP, L1-SINR, CapabilityIndex, TDCP a UE is configured by higher layers with N≥1 CSI-ReportConfig Reporting Settings and/or [X≥1 LTM-CSI-ReportConfig Reporting Settings], M≥1 CSI-ResourceConfig Resource Settings and/or [Y≥1 LTM-CSI-ResourceConfig Resource Settings], and one or two list(s) of trigger states (given by the higher layer parameters CSI-AperiodicTriggerStateList and CSI-SemiPersistentOnPUSCH-TriggerStateList). Each trigger state in CSI-AperiodicTriggerStateList contains a list of associated CSI-ReportConfigs or LTM-CSI-ReportConfigs indicating the Resource Set IDs for channel and optionally for interference where a Resource Set for interference can only be present for a Report Setting given by a CSI-ReportConfig and a trigger state additionally contains one or more [csi-ReportSubConfigID] if the associated CSI-ReportConfig configured with a list of sub-configurations, as described in Clause 5.2.1.1. Each trigger state in CSI-SemiPersistentOnPUSCH-TriggerStateList contains one associated CSI-ReportConfig [or LTM-CSI-ReportConfig], and a trigger state additionally contain one or more [csi-ReportSubConfigID] if the associated CSI-ReportConfig is configured with a list of sub-configurations, as described in Clause 5.2.1.1.

5.2.1.1 Reporting Settings

Each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the layer indicator (LI), L1-RSRP, L1-SINR, CRI, SSBRI (SSB Resource Indicator), CapabilityIndex and TDCP.

. . .

The time domain behavior of the CSI-ReportConfig is indicated by the higher layer parameter reportConfig Type and can be set to 'aperiodic', 'semiPersistentOnPUCCH', 'semiPersistentOnPUSCH', or 'periodic'. For 'periodic' and 'semiPersistentOnPUCCH'/'semiPersistentOnPUSCH' CSI reporting, the configured periodicity and slot offset applies in the numerology of the UL BWP in which the CSI report is configured to be transmitted on. The higher layer parameter reportQuantity indicates the CSI-related, L1-RSRP-related, L1-SINR-related, CapabilityIndex-related or TDCP-related quantities to report. The reportFreqConfiguration indicates the reporting granularity in the frequency domain, including the CSI reporting band and if PMI/CQI reporting is wideband or sub-band. The timeRestrictionForChannelMeasurements parameter in CSI-ReportConfig can be configured to enable time domain restriction for channel measurements and timeRestrictionForInterferenceMeasurements can be configured to enable time domain restriction for interference measurements . . . . A UE is not expected to be configured with a CSI-ReportConfig that contains a mix of sub-configuration(s) each corresponding to a list of one or more CSI-RS resources and some other sub-configuration(s) each corresponding to CSI-RS antenna port subset.

. . .

5.2.1.2 Resource Settings

Each CSI Resource Setting CSI-ResourceConfig contains a configuration of a list of S≥1 CSI Resource Sets (given by higher layer parameter csi-RS-ResourceSetList), where the list is comprised of references to either or both of NZP CSI-RS resource set(s) and SS/PBCH block set(s) or the list is comprised of references to CSI-IM resource set(s). Each CSI Resource Setting is located in the DL BWP identified by the higher layer parameter BWP-id, and all CSI Resource Settings linked to a CSI Report Setting have the same DL BWP.

The time domain behavior of the CSI-RS resources within a CSI Resource Setting are indicated by the higher layer parameter resourceType and can be set to aperiodic, periodic, or semi-persistent . . . . For periodic and semi-persistent CSI Resource Settings, the configured periodicity and slot offset is given in the numerology of its associated DL BWP, as given by BWP-id. When a UE is configured with multiple CSI-ResourceConfigs consisting the same NZP CSI-RS resource ID, the same time domain behavior shall be configured for the CSI-ResourceConfigs . . . . All CSI Resource Settings linked to a CSI Report Setting shall have the same time domain behavior.

5.2.3 CSI reporting Using PUSCH

A UE shall perform aperiodic CSI reporting using PUSCH on serving cell c upon successful decoding of a DCI format 0_1 or DCI format 0_2 which triggers an aperiodic CSI trigger state. A UE shall perform aperiodic CSI reporting using PUSCH on the serving cell with the smallest serving cell index scheduled by DCI format 0_3 which triggers an aperiodic CSI trigger state.

When a DCI format 0_1 schedules two PUSCH allocations, the aperiodic CSI report is carried on the second scheduled PUSCH. When a DCI format 0_1 schedules more than two PUSCH allocations, the aperiodic CSI report is carried on the penultimate scheduled PUSCH.

An aperiodic CSI report carried on the PUSCH supports wideband, and sub-band frequency granularities.

. . .

CSI reporting on PUSCH can be multiplexed with uplink data on PUSCH except that semi-persistent CSI reporting on PUSCH activated by a DCI format is not expected to be multiplexed with uplink data on the PUSCH. CSI reporting on PUSCH can also be performed without any multiplexing with uplink data from the UE.

. . .

When the higher layer parameter reportQuantity is configured with one of the values 'cri-RSRP', 'ssb-Index-RSRP', 'cri-SINR' or 'ssb-Index-SINR', or 'cri-RSRP-Index', 'ssb-Index-RSRP-Index', 'cri-SINR-Index', 'ssb-Index-SINR-Index', 'tdcp', the CSI feedback consists of a single part.

When CSI reporting on PUSCH comprises two parts, the UE may omit a portion of the Part 2 CSI. Omission of Part 2 CSI is according to the priority order shown in Table 5.2.3-1, where $N_{Rep}$ is the number of CSI reports configured to be carried on the PUSCH. Priority 0 is the highest priority and priority $2N_{Rep}$ is the lowest priority and the CSI report n corresponds to the CSI report with the nth smallest $Pri_{i,CSI}(y,k,c,s)$ value among the $N_{Rep}$ CSI reports as defined in Clause 5.2.5. The subbands for a given CSI report n indicated by the higher layer parameter csi-ReportingBand with value '1' are numbered continuously in increasing order with the lowest subband of csi-ReportingBand with value set to '1' as subband 0. When omitting Part 2 CSI information for a particular priority level, the UE shall omit all of the information at that priority level, except for Part 2 subband CSI when the corresponding CSI report contains one or more CSI sub-reports with Part 2 each corresponding to a sub-configuration from a list of sub-configurations provided by csi-ReportSubConfigList contained in the CSI-ReportConfig as described in Clause 5.2.1.1.

In [6]3GPP TS 38.213 V18.3.0 (June 2024), the following is provided:

9 UE Procedure for Reporting Control Information

. . .

When a UE determines overlapping for PUCCH and/or PUSCH transmissions of the same priority index other than PUCCH transmissions with SL HARQ-ACK reports before considering limitations for UE transmission due to cell DRX operation [11, TS 38.321] or as described in clauses 11.1, 11.1.1, 11.2A, 15 and 17.2 including repetitions if any, first, the UE resolves the overlapping for PUCCHs with repetitions as described in clause 9.2.6, if any second, the UE resolves the overlapping for PUCCHs without repetitions as described in clauses 9.2.5 third, the UE resolves the overlapping for PUSCHs and PUCCHs with repetitions as described in clause 9.2.6 fourth, the UE resolves the overlapping for PUSCHs and PUCCHs without repetitions as is subsequently described in this clause.

. . .

If a UE is provided simultaneousPUCCH-PUSCH and would transmit a PUCCH with a first priority index and PUSCHs with a second priority index that is different than the first priority index, where the PUCCH and the PUSCHs overlap in time on different respective cells can simultaneously transmit the PUCCH and the PUSCHs with different priority indexes [18, TS 38.306], the UE excludes the PUSCHs for resolving the time overlapping between the PUCCH and PUSCHs with different priority indexes, where the timeline conditions for resolving the overlapping PUCCH and PUSCHs are not required for the excluded PUSCHs.

If a UE is provided simultaneousPUCCH-PUSCH-SamePriority and would transmit a PUCCH and PUSCHs with same priority index, where the PUCCH and the PUSCHs overlap in time on different respective cells, can simultaneously transmit the PUCCH and the PUSCHs with same priority index [18, TS 38.306], the UE excludes the PUSCHs for resolving the time overlapping between the PUCCH and PUSCHs with same priority index, where the timeline conditions for resolving the overlapping PUCCH and PUSCHs are not required for the excluded PUSCHs.

. . .

If a UE would transmit on a serving cell a PUSCH without UL-SCH that overlaps with a PUCCH transmission on a serving cell that includes positive SR information, the UE does not transmit the PUSCH.

If a UE would transmit CSI reports on overlapping physical channels, the UE applies the priority rules described in [6, TS 38.214] for the multiplexing of CSI reports.

If a UE would multiplex UCI in a PUCCH transmission that overlaps with a PUSCH transmission, and the PUSCH and PUCCH transmissions fulfil the conditions in clause 9.2.5 for UCI multiplexing, the UE multiplexes only HARQ-ACK information, if any, from the UCI in the PUSCH transmission and does not transmit the PUCCH if the UE multiplexes aperiodic or semi-persistent CSI reports in the PUSCH;

multiplexes only HARQ-ACK information and CSI reports, if any, from the UCI in the PUSCH transmission and does not transmit the PUCCH if the UE does not multiplex aperiodic or semi-persistent CSI reports in the PUSCH.

. . .

If a UE multiplexes aperiodic CSI in a PUSCH and the UE would multiplex UCI that includes HARQ-ACK information in a PUCCH that overlaps with the PUSCH and the timing conditions for overlapping PUCCHs and PUSCHs in clause 9.2.5 are fulfilled, the UE multiplexes only the HARQ-ACK information in the PUSCH and does not transmit the PUCCH.

. . .

If a UE transmits a PUSCH over one or more slots or multiple PUSCHs over one or more slots that are scheduled by a DCI format, and the UE would transmit a PUCCH with HARQ-ACK and/or CSI information over a single slot that overlaps with the PUSCH transmission in the one or more slots, and the PUSCH transmission in the one or more slots fulfills the conditions in clause 9.2.5 for multiplexing the HARQ-ACK and/or CSI information, the UE multiplexes the HARQ-ACK and/or CSI information in the PUSCH transmission in the one or more slots. The UE does not multiplex HARQ-ACK and/or CSI information in the PUSCH transmission in a slot from the one or more slots if the UE would not transmit a single-slot PUCCH with HARQ-ACK and/or CSI information in the slot in case the PUSCH transmission was absent.

. . .

When a UE would multiplex HARQ-ACK information in a PUSCH transmission that is configured by a ConfiguredGrantConfig, and includes CG-UCI [5, TS 38.212], the UE multiplexes the HARQ-ACK information in the PUSCH transmission if the UE is provided cg-UCI-Multiplexing; otherwise, if the HARQ-ACK information and the PUSCH have same priority index, the UE does not transmit the PUSCH and multiplexes the HARQ-ACK information in a PUCCH transmission or in another PUSCH transmission; if the HARQ-ACK information and the PUSCH have different priority indexes, the UE does not transmit the channel with the smaller priority index.

In the following, DCI formats with CRC scrambled by C-RNTI or CS-RNTI or MCS-C-RNTI are also referred to as unicast DCI formats and DCI formats with CRC scrambled by multicast-MCCH-RNTI, G-RNTI for multicast or G-CS-RNTI are also referred to as multicast DCI formats. Corresponding unicast DCI formats are DCI formats 0_0/0_1/0_2/1_0/1_1/1_2 and multicast DCI formats are DCI formats 4_0/4_1/4_2 [4, TS 38.212]. PDSCH receptions scheduled by unicast or multicast DCI formats are referred as unicast or multicast PDSCH receptions. HARQ-ACK information associated with unicast or multicast DCI formats for PDCCH receptions in RRC_CONNECTED state are also respectively referred as unicast or multicast HARQ-ACK information.

9.2.2 PUCCH Formats for UCI Transmission

If a UE is not transmitting PUSCH, and the UE is transmitting UCI, the UE transmits UCI in a PUCCH using PUCCH format 0 if
- the transmission is over 1 symbol or 2 symbols,
- the number of HARQ-ACK information bits with positive or negative SR (HARQ-ACK/SR bits) is 1 or 2

PUCCH format 1 if
- the transmission is over 4 or more symbols,
- the number of HARQ-ACK/SR bits is 1 or 2

PUCCH format 2 if
- the transmission is over 1 symbol or 2 symbols,
- the number of UCI bits is more than 2

PUCCH format 3 if
- the transmission is over 4 or more symbols,
- the number of UCI bits is more than 2,
- the PUCCH resource does not include an orthogonal cover code, or the UE is provided useInterlace-PUCCH-PUSCH in BWP-UplinkDedicated PUCCH format 4 if
- the transmission is over 4 or more symbols,
- the number of UCI bits is more than 2,
- the PUCCH resource includes an orthogonal cover code and the UE is not provided useInterlace-PUCCH-PUSCH in BWP-UplinkDedicated

. . .

9.2.3 UE Procedure for Reporting HARQ-ACK

. . .

If a UE transmits a PUCCH with HARQ-ACK information using PUCCH format 0, the UE determines values $m_0$ and $m_{CS}$ for computing a value of cyclic shift $\alpha$ [4, TS 38.211] where $m_0$ is provided by initialCyclicShift of PUCCH-format0 or, if initialCyclicShift is not provided, by the initial cyclic shift index as described in clause 9.2.1 and $m_{CS}$ is determined from the value of one HARQ-ACK information bit or from the values of two HARQ-ACK information bits as in Table 9.2.3-3 and Table 9.2.3-4, respectively.

TABLE 9.2.3-3

Mapping of values for one HARQ-ACK information bit to sequences for PUCCH format 0

| HARQ-ACK Value | 0 | 1 |
|---|---|---|
| Sequence cyclic shift | $m_{CS} = 0$ | $m_{CS} = 6$ |

TABLE 9.2.3-4

| Mapping of values for two HARQ-ACK information bits to sequences for PUCCH format 0 | | | | |
|---|---|---|---|---|
| HARQ-ACK Value | {0, 0} | {0, 1} | {1, 1} | {1, 0} |
| Sequence cyclic shift | $m_{CS} = 0$ | $m_{CS} = 3$ | $m_{CS} = 6$ | $m_{CS} = 9$ |

If a UE transmits a PUCCH with HARQ-ACK information using PUCCH format 1, the UE is provided a value for m, by initialCyclicShift of PUCCH-format1 or, if initialCyclicShift is not provided, by the initial cyclic shift index as described in clause 9.2.1.

. . .

9.2.4 UE Procedure for Reporting SR

A UE can be provided by SchedulingRequestResourceConfig a set of configurations for SR in a PUCCH transmission using either PUCCH format 0 or PUCCH format 1.

A UE can be provided by schedulingRequestID-BFR-SCell a configuration for LRR in a PUCCH transmission using either PUCCH format 0 or PUCCH format 1.

A UE can be provided by schedulingRequestID-BFR a first configuration for LRR and, if the UE provides twoLRR-capability, the UE can be provided by schedulingRequestID-BFR2 a second configuration for LRR in a PUCCH transmission using either PUCCH format 0 or PUCCH format 1.

A UE can be provided by schedulingRequestID-LBT-SCell a configuration for consistent LBT failure recovery, as described in [11, TS 38.321], in a PUCCH transmission using either PUCCH format 0 or PUCCH format 1. The UE can be provided, by phy-PriorityIndex in SchedulingRequestResourceConfig, a priority index 0 or a priority index 1 for the SR. If the UE is not provided a priority index for SR, the priority index is 0.

The UE is also provided a periodicity $SR_{PERIODICITY}$ in symbols or slots and an offset $SR_{OFFSET}$ in slots by periodicityAndOffset for a PUCCH transmission conveying SR. If $SR_{PERIODICITY}$ is larger than one slot, the UE determines a SR transmission occasion in a PUCCH to be in a slot with number $$n^{\mu}_{s,f}$$

[4, TS 38.211] in a frame with number $n_f$ if $$\left(n_f \cdot N_{slot}^{frame,\mu} + n^{\mu}_{s,f} - SR_{OFFSET}\right) \bmod SR_{PERIODICITY} = 0.$$

If $SR_{PERIODICITY}$ is one slot, the UE expects that $SR_{OFFSET}=0$ and every slot is a SR transmission occasion in a PUCCH.

If $SR_{PERIODICITY}$ is smaller than one slot, the UE determines a SR transmission occasion in a PUCCH to start in a symbol with index l [4, TS 38.211] if $(l-l_0 \bmod SR_{PERIODICITY}) \bmod SR_{PERIODICITY}=0$ where $l_0$ is the value of startingSymbolIndex.

If the UE determines that, for a SR transmission occasion in a PUCCH, the number of symbols available for the PUCCH transmission in a slot is smaller than the value provided by nrofSymbols, the UE does not transmit the PUCCH in the slot.

SR transmission occasions in a PUCCH are subject to the limitations for UE transmissions described in clause 11.1, clause 11.1.1 and clause 17.2.

The UE transmits a PUCCH in the PUCCH resource for the corresponding SR configuration only when the UE transmits a positive SR. For a positive SR transmission using PUCCH format 0, the UE transmits the PUCCH as described in [4, TS 38.211] by obtaining $m_0$ as described for HARQ-ACK information in clause 9.2.3 and by setting $m_{cs}=0$. For a positive SR transmission using PUCCH format 1, the UE transmits the PUCCH as described in [4, TS 38.211] by setting b(0)=0.

. . .

9.2.5.1 UE Procedure for Multiplexing HARQ-ACK or CSI and SR in a PUCCH

In the following, a UE is configured to transmit K PUCCHs for respective K SRs in a slot, as determined by a set of schedulingRequestResourceId, a schedulingRequestResourceId associated with schedulingRequestID-BFR-SCell, a schedulingRequestResourceId associated with schedulingRequestID-BFR, a schedulingRequestResourceId associated with schedulingRequestID-BFR2 if the UE provides twoLRRcapability, and a schedulingRequestResourceId associated with schedulingRequestID-LBT-SCell, with SR transmission occasions that would overlap with a transmission of a PUCCH with HARQ-ACK information from the UE in the slot or with a transmission of a PUCCH with CSI report(s) from the UE in the slot.

If a UE would transmit a PUCCH with positive SR and at most two HARQ-ACK information bits in a resource using PUCCH format 0, the UE transmits the PUCCH in the resource using PUCCH format 0 in PRB(s) for HARQ-ACK information as described in clause 9.2.3. The UE determines a value of $m_0$ and $m_{CS}$ for computing a value of cyclic shift α [4, TS 38.211] where $m_0$ is provided by initialCyclicShift of PUCCH-format0, and $m_{CS}$ is determined from the value of one HARQ-ACK information bit or from the values of two HARQ-ACK information bits as in Table 9.2.5-1 and Table 9.2.5-2, respectively.

If the UE would transmit negative SR and a PUCCH with at most two HARQ-ACK information bits in a resource using PUCCH format 0, the UE transmits the PUCCH in the resource using PUCCH format 0 for HARQ-ACK information as described in clause 9.2.3.

TABLE 9.2.5-1

| Mapping of values for one HARQ-ACK information bit and positive SR to sequences for PUCCH format 0 | | |
|---|---|---|
| HARQ-ACK Value | 0 | 1 |
| Sequence cyclic shift | $m_{CS} = 3$ | $m_{CS} = 9$ |

TABLE 9.2.5-2

| Mapping of values for two HARQ-ACK information bits and positive SR to sequences for PUCCH format 0 | | | | |
|---|---|---|---|---|
| HARQ-ACK Value | {0, 0} | {0, 1} | {1, 1} | {1, 0} |
| Sequence cyclic shift | $m_{CS} = 1$ | $m_{CS} = 4$ | $m_{CS} = 7$ | $m_{CS} = 10$ |

If a UE would transmit SR in a resource using PUCCH format 0 and HARQ-ACK information bits in a resource using PUCCH format 1 in a slot, the UE transmits only a PUCCH with the HARQ-ACK information bits in the resource using PUCCH format 1.

If the UE would transmit positive SR in a first resource using PUCCH format 1 and at most two HARQ-ACK information bits in a second resource using PUCCH format 1 in a slot, the UE transmits a PUCCH with HARQ-ACK information bits in the first resource using PUCCH format 1 as described in clause 9.2.3. If a UE would not transmit a positive SR in a resource using PUCCH format 1 and would transmit at most two HARQ-ACK information bits in a resource using PUCCH format 1 in a slot, the UE transmits a PUCCH in the resource using PUCCH format 1 for HARQ-ACK information as described in clause 9.2.3.

If a UE would transmit a PUCCH with $O_{ACK}$ HARQ-ACK information bits in a resource using PUCCH format 2 or PUCCH format 3 or PUCCH format 4 in a slot, as described in clauses 9.2.1 and 9.2.3, $\lceil \log_2(K+1) \rceil$ bits representing a negative or positive SR, in ascending order of the values of schedulingRequestResourceId, a schedulingRequestResourceId associated with schedulingRequestID-BFR-SCell, a schedulingRequestResourceId associated with schedulingRequestID-BFR, a schedulingRequestResourceId associated with schedulingRequestID-BFR2 if the UE provides twoLRRcapability, and a schedulingRequestResourceId associated with schedulingRequestID-LBT-SCell, are appended to the HARQ-ACK information bits and the UE transmits the combined $O_{UCI}=O_{ACK}+\lceil \log_2(K+1) \rceil$ UCI bits in a PUCCH using a resource with PUCCH format 2 or PUCCH format 3 or PUCCH format 4 that the UE determines as described in clauses 9.2.1 and 9.2.3. If one of the SRs is a positive LRR, the value of the $\lceil \log_2(K+1) \rceil$ bits indicates the positive LRR. An all-zero value for the $\lceil \log_2(K+1) \rceil$ bits represents a negative SR value across all K SRs.

If a UE would transmit a PUCCH with $O_{CSI}$ CSI report bits in a resource using PUCCH format 2 or PUCCH format 3 or PUCCH format 4 in a slot, $\lceil \log_2(K+1) \rceil$ bits representing corresponding negative or positive SR, in ascending order of the values of schedulingRequestResourceId, a schedulingRequestResourceId associated with schedulingRequestID-BFR-SCell, a schedulingRequestResourceId associated with schedulingRequestID-BFR, a schedulingRequestResourceId associated with schedulingRequestID-BFR2 if the UE provides twoLRRcapability, and a schedulingRequestResourceId associated with schedulingRequestID-LBT-SCell, are prepended to the CSI information bits as described in clause 9.2.5.2 and the UE transmits a PUCCH with the combined $O_{UCI}=\lceil \log_2(K+1) \rceil+O_{CSI}$ UCI bits in a resource using the PUCCH format 2 or PUCCH format 3 or PUCCH format 4 for CSI reporting. If one of the SRs is a positive LRR, the value of the $\lceil \log_2(K+1) \rceil$ bits indicates the positive LRR. An all-zero value for the $\lceil \log_2(K+1) \rceil$ bits represents a negative SR value across all K SRs.

If a UE transmits a PUCCH with $O_{ACK}$ HARQ-ACK information bits, $O_{SR}=\lceil \log_2(K+1) \rceil$ SR bits, and $O_{CRC}$ CRC bits using PUCCH format 2 or PUCCH format 3 in a PUCCH resource that includes $$M_{RB}^{PUCCH}$$

PRBs the UE determines a number of PRBs $$M_{RB,min}^{PUCCH}$$

for the PUCCH transmission to be the minimum number of PRBs, that is smaller than or equal to a number of PRBs provided by nrofPRBs in PUCCH-format2 or nrofPRBs in PUCCH-format3 and starts from the first PRB from the number of PRBs, that results to $$(O_{ACK}+O_{SR}+O_{CRC}) \le M_{RB,min}^{PUCCH} \cdot N_{sc,ctrl}^{RB} \cdot N_{symb-UCI}^{PUCCH} \cdot Q_m \cdot r$$

and, if $$M_{RB}^{PUCCH} > 1,$$

$$(O_{ACK}+O_{SR}+O_{CRC}) > (M_{RB,min}^{PUCCH}-1) \cdot N_{sc,ctrl}^{RB} \cdot N_{symb-UCI}^{PUCCH} \cdot Q_m \cdot r,$$

where $$N_{sc,ctrl}^{RB},\ N_{symb-UCI}^{PUCCH},$$

$Q_m$, and r are defined in clause 9.2.5.2. For PUCCH format 3, if $$M_{RB,min}^{PUCCH}$$

is not equal $2^{\alpha_2} \cdot 3^{\alpha_3} \cdot 5^{\alpha_5}$ according to [4, TS 38.211], $$M_{RB,min}^{PUCCH}$$

is increased to the nearest allowed value of nrofPRBs [12, TS 38.331]. If $$(O_{ACK}+O_{SR}+O_{CRC}) > (M_{RB}^{PUCCH}-1) \cdot N_{sc,ctrl}^{RB} \cdot N_{symb-UCI}^{PUCCH} \cdot Q_m \cdot r,$$

the UE transmits the PUCCH over the $$M_{RB}^{PUCCH}$$

PRBs.

If a UE is provided a first interlace of $$M_{Interlace,0}^{PUCCH}$$

PRBs by interlace0 in InterlaceAllocation and transmits a PUCCH with $O_{ACK}$ HARQ-ACK information bits, $O_{SR}=\lceil \log_2(K+1) \rceil$ SR bits, and $O_{CRC}$ CRC bits using PUCCH format 2 or PUCCH format 3, the UE transmits the PUCCH over the first interlace if $$(O_{ACK}+O_{SR}+O_{CRC}) \le M_{Interlace,0}^{PUCCH} \cdot N_{sc,ctrl}^{RB} \cdot N_{symb-UCI}^{PUCCH} \cdot Q_m \cdot r;$$

otherwise, if the UE is provided a second interlace by interlace1 in PUCCH-format2 or PUCCH-format3, the UE transmits the PUCCH over the first and second interlaces.

In [7] Chair's notes RAN1 #116bis eom0, the following is provided:

On beam report transmission procedure for UE-initiated/event-driven beam reporting, following modes are supported:

- Mode A (dynamically scheduling UCI by gNB):
  - Step 1: UE transmits a first PUCCH (one-bit/multi-bit) to request a resource for a second UL channel to carry beam report
    - FFS: Request format, e.g., SR or a new UCI type.
  - Step 2: UE detects the DCI format to indicate a resource for a second UL channel to carry beam report.
  - Step 3: Beam report is transmitted in second UL channel.
    - FFS: Details on the second UL channel, e.g., whether the second UL channel is PUCCH, PUSCH or both
  - This mode is basic UE capability (i.e. all UE supporting UE-initiated/event-driven beam reporting should support this feature).
- No new DCI format is introduced.
- Mode B (UCI in pre-configured resource(s) for second UL channel):
  - Step 1: UE transmits a first PUCCH (one-bit/multi-bit) notifying a second UL channel to carry beam report
    - FFS: Notification format, e.g., SR or a new UCI type.
  - Step 2: UE transmits the beam report in the second UL channel.
    - FFS: Details on the second UL channel, e.g., whether the second UL channel is PUCCH, PUSCH or both
  - The notification in Step1 is in a separate reporting instance from the beam report in Step 2.

On UE-initiated/event-driven beam reporting, regarding trigger-event detection for beam reporting, at least support Event-2: Quality of at least one new beam, such as L1-RSRP, becomes a threshold value better than the current beam.

- At least L1-RSRP is supported as quality metrics used for Event-2
  - FFS: How the L1-RSRP is used to determine the triggering event (e.g. timer, counter, filter coefficient)
  - FFS: Whether the network controls how the L1-RSRP is used to determine the triggering event
- Regarding RS measurement for the new beam for Event-2, down-select one or more of the following:
  - Option-3a (explicit manner): The RS(s) for new beam (s) are explicitly configured by RRC (e.g., reusing legacy configuration of RS measurement or in TCI-State) or MAC-CE
  - Option-3b (implicit manner): The RS(s) for new beam (s) are implicitly derived from QCL RS(s) of activated TCI state(s).
  - Option-3c (implicit manner): The RS(s) for new beam (s) are implicitly derived from QCL RS(s) of configured TCI state(s).
- Note-1: 'New/current beam' is for discussion purpose.
- Note-2: Other trigger events/quality metrics (e.g., L1-SINR) are not precluded.
- Note-3: For above implicit manner(s), if there are two QCL RSs in a TCI state, the measurement RS is derived from RS w.r.t. QCL-TypeD, if applicable.

On UE-initiated/event-driven beam reporting, regarding Event-2, the threshold value is RRC configured On UE-initiated/event-driven beam reporting, regarding Event-2, 'current beam' is a beam corresponding to the indicated TCI state.

- Regarding RS measurement for the current beam for Event-2, Option-2a is supported:
  - Option-2a (implicit manner): The RS for current beam is implicitly derived from a QCL RS of indicated TCI state.
    - FFS: The RS for current beam can be either the QCL RS in the indicated TCI state or the SSB which is QCLed with the QCL RS in the indicated TCI state.

On UE-initiated/event-driven beam reporting, further study the following trigger events:

- Event-1: Quality of the current beam is worse than a certain threshold.
- Event-3: Quality of a new beam is better than a certain threshold.
- Event-4: Quality of the current beam is worse than a threshold 1, and quality of at least one new beam is better than a threshold 2.
- Event-5: Absolute value of the difference between the quality of the current beam and the quality of at least one new beam is lower than a threshold.
- Event-6: When the current beam is not in the best K>1 beams (out of configured beams for measurement and reporting).
- Event-7a: Quality of at least one new beam, such as L1-RSRP, becomes a threshold value better than the RS derived from the activated TCI state with the worst quality.
- Event-7b: Quality of at least one new beam, such as L1-RSRP, becomes a threshold value better than the RS derived from the activated TCI state with the best quality.
- Event-8: Quality of M>1 new beams, such as L1-RSRP, become a threshold value better than the current beam.
- Event-9: Quality of at least one new beam, such as L1-RSRP, becomes a threshold value better than the configured reference RS (can be SSB or CSI-RS).

In [9]3GPP TS 38.212 V18.2.0 (March 2024), the following is provided:

7.3.1 DCI Formats

The DCI formats defined in table 7.3.1-1 are supported.

. . .

TABLE 7.3.1-1

DCI formats

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of one or multiple PDSCH in one cell, and/or triggering one shot HARQ-ACK codebook feedback |
| 1_2 | Scheduling of PDSCH in one cell |

. . .

7.3.1.1.2 Format 0_1

DCI format 0_1 is used for the scheduling of one or multiple PUSCH in one cell, or indicating CG downlink feedback information (CG-DFI) to a UE.

The following information is transmitted by means of the DCI format 0_1 with CRC scrambled by C-RNTI or CS-RNTI or SP-CSI-RNTI or MCS-C-RNTI:

Identifier for DCI formats—1 bit

The value of this bit field is always set to 0, indicating an UL DCI format

Carrier indicator—0 or 3 bits, as defined in Clause 10.1 of [5, TS38.213]. This field is reserved when this format is carried by PDCCH on the primary cell and the UE is configured for scheduling on the primary cell from an SCell, with the same number of bits as that in this format carried by PDCCH on the SCell for scheduling on the primary cell.

. . .

Bandwidth part indicator—0, 1 or 2 bits as determined by the number of UL BWPs $n_{BWP,RRC}$ configured by higher layers, excluding the initial UL bandwidth part. The bitwidth for this field is determined as $\lceil \log_2 (n_{BWP}) \rceil$ bits, where

. . .

Frequency domain resource assignment—number of bits determined by the following, where $$N_{RB}^{UL,BWP}$$

is the size of the active UL bandwidth part:

. . .

CSI request—0, 1, 2, 3, 4, 5, or 6 bits determined by higher layer parameter reportTriggerSize.

. . .

7.3.1.2.2 Format 1_1

DCI format 1_1 is used for the scheduling of one or multiple PDSCH in one cell.

The following information is transmitted by means of the DCI format 1_1 with CRC scrambled by C-RNTI or CS-RNTI or MCS-C-RNTI:

Identifier for DCI formats—1 bits

The value of this bit field is always set to 1, indicating a DL DCI format

Carrier indicator—0 or 3 bits as defined in Clause 10.1 of [5, TS 38.213]. This field is reserved when this format is carried by PDCCH on the primary cell and the UE is configured for scheduling on the primary cell from an SCell, with the same number of bits as that in this format carried by PDCCH on the SCell for scheduling on the primary cell.

Bandwidth part indicator—0, 1 or 2 bits as determined by the number of DL BWPs $n_{BWP,RRC}$ configured by higher layers, excluding the initial DL bandwidth part. The bitwidth for this field is determined as $\lceil \log_2 (n_{BWP}) \rceil$ bits, where

. . .

Frequency domain resource assignment—number of bits determined by the following, where $$N_{RB}^{DL,BWP}$$

is the size of the active DL bandwidth part:

. . .

Time domain resource assignment—0, 1, 2, 3, 4, 5 or 6 bits

. . .

Transmission configuration indication—0 bit if higher layer parameter tci-PresentInDCI is not enabled; otherwise 3 bits as defined in Clause 5.1.5 of [6, TS38.214].

. . .

In [10] Chair notes RAN1 #117 eom0, 3GPP progress related to UEI beam reports are quoted below:

On UE-initiated/event-driven beam reporting, regarding UL signaling content(s) of L1-RSRP report depending on Event-2, in a report instance, at least Option-3 is supported Option-3: N≥1 beam(s) are reported in the report instance, At least one of N reported beam(s) should satisfy the condition of Event-2

N is configured by gNB

FS: candidate value of 'N'.

FFS: RRC can enable or disable whether current beam is always reported in addition to the N beams FFS: Option-1/1a/1b/2.

Above applies at least for the single CC case

On beam report transmission procedure for UE-initiated/event-driven beam reporting For mode-A, at least support one-bit indication in the first PUCCH channel to request a resource for a second UL channel to carry beam report.

In such case, a periodic PUCCH resource (with PUCCH format 0/1) is configured by dedicated RRC signaling.

For mode-B, at least support one-bit indication in the first PUCCH channel to notify a second UL channel to carry beam report.

In such case, a periodic PUCCH resource (with PUCCH format 0/1) is configured by dedicated RRC signaling.

FFS: Whether/how to support multi-bit indication in the first PUCCH for mode-A and mode-B, e.g., when multi-event(s) are approved.

Above applies at least for the single CC case.

Regarding RS measurement for the current beam for Event 2, for Option-2a, support the both schemes as follows.

Scheme-1: RS for current beam is the QCL RS in the indicated TCI state

FFS: Whether/How to handle the case if only one TRS is configured in the indicated TCI state.

Scheme-2: the RS for current beam is the SSB which is QCLed with the QCL RS in the indicated TCI state.

Enabling one of either Scheme-1 or Scheme-2 is selected by NW.

FFS: The above selection is via an explicit RRC parameter or an implicit manner, e.g., if the RS(s) for new beam are CSI-RS, Scheme-1 is enabled; otherwise, Scheme-2 is enabled.

(Working Assumption) Enabling of either Scheme-1 or Scheme-2 should ensure the same RS type for RS measurement for current beam and new beam.

The above QCL RS is the RS w.r.t. QCL-TypeD, if there are two QCL RSs in the indicated TCI state.

Regarding RS measurement for the new beam for Event 2, at least Option-3a is supported Option-3a (explicit manner): The RS(s) for new beam(s) are explicitly configured FFS: Option-3b/3c Option-3b: The RS(s) for new beam(s) are implicitly derived from QCL RS(s) of activated TCI state(s).

Option-3c: The RS(s) for new beam(s) are implicitly derived from QCL RS(s) of TCI state(s) in a configured subset of the legacy RRC-configured TCI state list On UE-initiated/event-driven beam reporting, regarding L1-RSRP report format Option-3 depending on Event-2, for a report instance where N≥1 beam(s) are reported, the following is supported.

RRC can enable or disable whether current beam is always reported

When enabled by RRC, the current beam+N beams from the measurement RSs for new beam(s) are reported Note: The reported current beam is NOT counted in the N reported beams.

When disabled by RRC, N beams are reported.

On beam report transmission procedure for UE-initiated/event-driven beam reporting, regarding Mode-A, the DCI format in Step-2 comprises UL-grant DCI format, and the second channel in Step-3 is at least PUSCH.

The UL-grant DCI format at least comprises DCI format 0_1/0_2.

Regarding the triggering event determination for Event 2:

If within a time window (which is configurable), the number of Event-2 instance(s) for at least one same new beam is greater than or equal to a configurable number M, UE initiated beam report occurs.

Note: Event-2 instance for a new beam is determined if the L1-RSRP of the new beam becomes a threshold value better than the current beam FFS: If a list size is small, MAC-CE activation is not needed Option-3: A list of RS resource-(s) for new beam measurement can be configured by RRC, and a subset of RS resource(s) in the list can be provided for new beam measurement by indicated TCI state.

Others are not precluded.

FFS: Each RS for new beam measurement should be associated with a configured joint/DL TCI state which can be used as the indicated TCI state Regarding RS measurement for the current beam for Event 2, for Option-2a, besides for scheme-1 and scheme-2, further study the following for handling the case that only one TRS is configured in the indicated TCI state.

Option-1: Introducing additional scheme: the RS for current beam can be a CSI-RS for beam management derived from the QCL RS in the indicated TCI state;

Option-2: Further support TRS as measurement RS of current beam for determining L1-RSRP Option-3: Introducing additional scheme: The RS for current beam is explicitly configured by RRC or MAC-CE (Option-2C in RAN1 116b agreement).

Option-4: No further enhancement (i.e., in such case, Scheme-2 is used)

In [11] RAN2 #126 meeting minute, the following is provided:

Proposal 6 (modified): Support the following LTM events based on beam specific quality of serving cell and candidate cells as the L1 LTM measurement events.
Event LTM2: Beam of serving cell becomes worse than absolute threshold;
- Event LTM3: Beam of candidate cell becomes amount of offset better than beam of serving cell;
- Event LTM4: Beam of candidate cell becomes better than absolute threshold;
- Event LTM5: Beam of serving cell becomes worse than absolute threshold1 AND Beam of candidate cell becomes better than another absolute threshold2.

FFS on what beam(s) of the serving cell and neighboring cell is used for event evaluation. FFS on the need of Event LTM1.
⇨ Agreed.

Above feature is subject to UE capability.

Basic feature: Once the L1-RSRP of the new beam becomes a threshold value better than the current beam, UE initiated beam report occurs On UE-initiated/event-driven beam reporting, regarding trigger events, the following Event-1 and 7a/7b, are provided for down-selection or combination in RAN1 #118 (possible outcome is that no new event is supported)

Event-1: Quality of the current beam is worse than a certain threshold.

Event-7a: Quality of at least one new beam, such as L1-RSRP, becomes a threshold value better than the RS derived from the activated TCI state with the worst quality.

Event-7b: Quality of at least one new beam, such as L1-RSRP, becomes a threshold value better than the RS derived from the activated TCI state with the best quality.

Regarding explicit RS configuration for new beam measurement for Event 2, down-select the following options in the RAN1 #118:

Option-1: The RS(s) for new beam(s) are explicitly configured in one RS resource set associated with an CSI reporting configuration;

FFS: The RS in the RS resource set can be updated by MAC-CE.

Option-2: A list of RS(s) for new beam measurement can be configured by RRC, and a subset can be activated for new beam measurement by MAC-CE.

In New Radio (NR) Rel-19, phase 5 Multi-Input Multi-Output (MIMO) enhancement aims at User Equipment (UE)-initiated (UEI) reports for beam management. According to current Radio Layer1 (RAN1) progress, at least event-1, event-2, event-3, and event-4 could be considered. A network node could configure a UE with one or more events. One serving cell or neighboring cell could be configured with one or more events. That is, in response to condition of the event-i is satisfied, the UE will trigger to transmit a UE-initiated report and/or the UE will transmit a UE-initiated report. Based on the UE-initiated report received by a network node, the network node will indicate the UE to change an indicated/activated/configured beam (e.g., Transmission Configuration Indicator (TCI) state). Typically, content of the UE-initiated report comprises a resource indicator associated with a resource (for indicating a beam or TCI state), and/or matrix/quality associated with the indicated resource, and/or a current beam's quality is worse than a threshold. Depending on the different event-i, same or different content will be designed.

Regarding the container carrying the UE-initiated report, basically Medium Access Control (MAC) Control Element (CE) or UCI could be considered. MAC CE may have latency due to the need of UL grant for transmitting the MAC CE. On the other hands, Uplink Control Information (UCI) may require the network node to configure a plurality of periodic Uplink (UL) resources for transmission, however, only part of them will be used by the UE for transmitting the UE-initiated report (i.e., when condition of event is met). In order to solve this issue, PreNotification (or Pre-Notification) (PN) could be used to indicate at least usage of future one or more periodic UL resources associated with the UE-initiated report. This depends on whether to transmit the UE-initiated report on a periodic UL resource or whether to trigger the UE-initiated report or whether there is a pending UE-initiated report, the UE determines whether to transmit the PN and/or sets of PNs to indicate usage of a periodic UL resource. In one example, when the UE-initiated report is not triggered or the UE will not transmit the UE-initiated report using a periodic UL resource or there is not pending a UE-initiated report, the UE could skip transmitting the PN and/or the UE does not use the periodic UL resource. Typically, one PN could be a sequence-based signal to indicate usage of future one or more periodic UL resources. In one example, the sequence-based signal could be Sounding Reference Signal (SRS) or Scheduling Request (SR) or Physical Uplink Control Channel (PUCCH) format 0 with different cyclic shift mapping to "used" or "not used" in an example. If there is a need to carry more information in addition to the used/not used, PUCCH format 0 with more cyclic shift or another/other PUCCH format (e.g., PUCCH format 1, 2, 3, or 4) could be considered. Although the PN could be transmitted along with the UL resource for the UE-initiated report similar to Configured Grant (CG)-UCI on Physical Uplink Shared Channel (PUSCH) which the CG-UCI indicates usage of future CG PUSCH resources, it may not be useful due to the triggering is more dynamic rather than in a periodic manner. The PN could be considered to be transmitted along with same Transmission Time Interval (TTI) as the UL resource. The PN could be transmitted in different Orthogonal Frequency-Division Multiplexing (OFDM) symbols as the UL resource. Typically, in order to have better resource efficiency in a network node, a time gap or limitation between the PN and the corresponding UL resource needs to be adopted. The time gap or limitation is used to guarantee the network node has enough time for switching and/or for other usage.

With introduction of the UEI report, there are two modes for resource allocation for the UEI report. Mode A (or mode-A) corresponds to dynamic scheduling while mode B (or mode-B) corresponds to a (pre-)configured resource for transmitting the UEI report.

Figure 7:
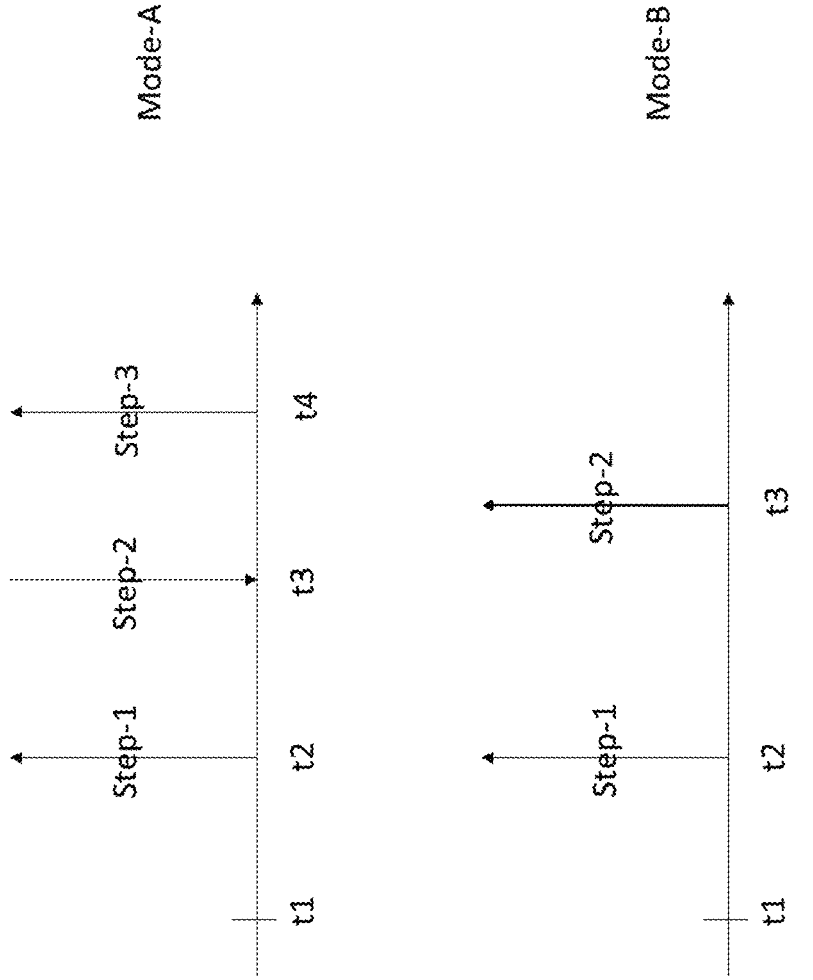
FIG. 7 is an example diagram showing Mode-A and Mode-B timing, wherein t1 corresponds to a timing that the UE determines that a condition of an event is satisfied or reached, and t2 corresponds to a timing that the UE transmits a request to the network node for requesting the UL resource, in accordance with embodiments of the present invention.

For mode A (or mode-A), the UE will transmit a request to a network node. After the transmission of the request, the UE monitors Downlink Control Information (DCI) with scheduling information (and/or with request for a pending UEI report). The UE transmits the UEI report on the resource scheduled by the DCI. In one example, in FIG. 7, t1 corresponds to a timing that the UE determines that a condition of an event is satisfied or reached. t2 corresponds to a timing that the UE transmits a request to the network node for requesting the UL resource. Typically, a UL channel for the request corresponds to or is PUCCH. Preferably in certain embodiments, the UL channel (in timing t2) may correspond to PUCCH format 0 or PUCCH format 1 or an SR. t3 corresponds to a timing that the UE receives a DCI scheduling a UL resource (or a plurality of UL resources). The UL resource corresponds to at least timing t4. The UL resource could be PUCCH or PUSCH. The UEI report could be considered as UCI associated with a Channel State Information (CSI) report. Preferably in certain embodiments, the DCI received in t3 may request the UE to transmit one or a plurality of CSI reports to be transmitted in timing t4. Thus, the UEI report may have the UL resource and the UE could transmit the UEI report.

For mode B (or mode-B), one PN would be used to notify usage of a (pre-)configured resource which could enhance resource efficiency when deploying more (pre-)configured resources for latency reduction. Typically, the PN resource and (pre-)configured resource are configured in different instances/timings/TTIs. Alternatively, the PN resource and the (pre-)configured resource are configured in the same instance/timing/TTI. Once a condition of an event is fulfilled, the UE triggers the event and/or the UE triggers to transmit a UEI report. In one example, in FIG. 7, t1 corresponds to a timing that the UE determines that condition of an event is satisfied or reached. t2 corresponds to a timing that the UE transmits a notification to the network node for notifying usage of the UL resource (i.e., UL resource in t3). Typically, the UL channel for the request corresponds to or is PUCCH. Preferably in certain embodiments, the UL channel (in timing t2) may correspond to PUCCH format 0 or PUCCH format 1 or an SR. The UL resource in timing t3 is (pre-)configured. The UE uses the UL resource if the UE has a pending UEI report or triggered (and not cancelled) event.

Before the UE transmits the UEI report, the UEI report is pending. Before the UE cancels the triggering of the event, the UEI report is pending. Before the UE receives a response from the network node, the UEI report is pending. Before the end of a latency bound of the event, the UEI report is pending.

For a pending UEI report, for mode A, the UE will determine or select a valid resource. The UE will transmit a request on the determined/selected resource. The UE will monitor DCI with scheduling information (and/or with request for the pending UEI report). The DCI could indicate the request is used for requesting the UEI report or the network node triggered report. One code-point in a bit field could be used to indicate whether the request is used for requesting the UEI report or the network node triggered report. The bit field could be a CSI request. Based on the code-point of the bit field, the UE could determine whether the DCI requests for the network node triggered report or the UEI report. If the UE has pending more than one UEI reports, once the UE receives the DCI, the UE determines one UEI report among the more than one UEI reports. Alternatively, the UE could multiplex the more than one UEI reports (if the resource scheduled by the DCI with an accommodate code rate could accommodate the more than one UEI reports).

For a pending UEI report, for mode B, the UE will determine or select a valid PN resource and/or a valid (pre-)configured resource for transmitting the UEI report. The UE will transmit the PN on the determined/selected PN resource and transmit the pending UEI report on the determined/selected (pre-)configured resource. Typically, the PN resource corresponds to a PUCCH resource similar to PUCCH for SR. One bit or multi-bit (e.g., 2 or more than 2 bits) as content of the PN could be provided (explicitly or implicitly) by a PUCCH resource for PN. Besides, insofar, which UL channel (e.g., PUSCH or PUCCH) for step-2 for transmitting the UEI report is still pending. However, no matter which channel is designed, content of the UEI report is one kind of UCI. Due to coexistence with UCI and/or PUSCH which is not associated with the UEI report, once resource for step-1 and/or resource for step-2 overlapped with the UCI and/or PUSCH, how the UE and/or a network node handles this situation and the respective UE's behavior. In one example, due to the 2 steps introduced for mode-B, the network node may miss detecting step-1 even if the UE considers it is a valid bundle of resources for step-1 and resources for step-2. Thus, when UCI and/or PUSCH (and/or another/other UL channel/signal not associated with the UEI report) is configured or scheduled on resource overlapping with resource for step-2, it may be hard for the network node to decode the content due to payload size misalignment between the network node and UE.

Currently, event triggered reports (or said UE initiated report) are introduced by both Rel-19 MIMO and mobility (e.g., Layer 1 (L1)/Layer 2 (L2) Triggered Mobility (LTM)) items. Insofar, Rel-19 MIMO has agreed to support one event (i.e., event-2 in [7] Chair's notes RAN1 #116bis eom0) and Rel-19 mobility has agreed to support more than one event (i.e., Event LTM2, Event LTM3, Event LTM4, and Event LTM5).

Figure 9:
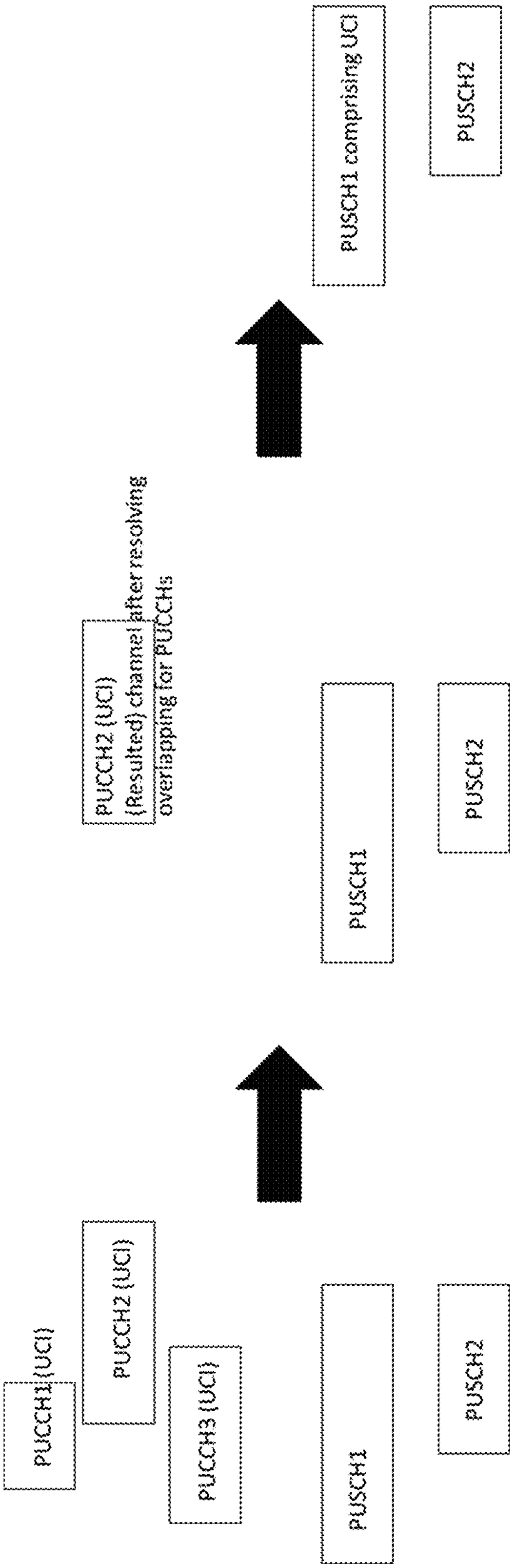
FIG. 9 is an example diagram showing a UCI multiplexing procedure may comprise at least resolving overlapping for PUCCH(s) and/or resolving overlapping for PUCCH and PUSCH, in accordance with embodiments of the present invention.

Preferably in certain embodiments, as shown in FIG. 9, a UCI multiplexing procedure may comprise at least resolving overlapping for PUCCH(s) and/or resolving overlapping for PUCCH and PUSCH. The UE may determine a (resulted) PUCCH among PUCCH1-PUCCH3 which may have a last starting symbol overlapping with other PUCCHs. Then, based on whether the UE supports simultaneous PUCCH and PUSCH on a separate serving cell and/or PUSCH1, PUSCH2, PUCCH2 (or said resulted channel) on the same serving cell or not, the UE determines whether to multiplex UCI (which may comprise UCI from PUCCH1, PUCCH2, and/or PUCCH3) on PUSCH1 or PUSCH2. Preferably in certain embodiments, detailed determination of a resulted PUSCH (e.g., PUSCH1) may depend on dynamic scheduling/indicating PUSCH prioritizing a configured (grant) PUSCH. Preferably in certain embodiments, detailed determination of a resulted PUSCH (e.g., PUSCH1) may depend on a lower serving cell index of PUSCH. Preferably in certain embodiments, detailed determination of a resulted PUSCH (e.g., PUSCH1) may depend on an earlier starting symbol of PUSCH. In this example, PUSCH1 is on the same serving cell and PUCCH2, the UE cannot simultaneous us both UL channels on a serving cell. The UE needs to determine a resulted PUSCH for multiplexing UCI (other than allowing transmit of both PUCCH and PUSCH on the same serving cell).

Concept

One or more of the following conditions may be considered:

- UCI may be Semi-Persistent (SP)/Periodic (P) CSI report for the same cell or a different cell,
- UCI may be Hybrid Automatic Repeat Request (HARQ) feedback or SR,
- PUSCH may or may not include an Aperiodic (AP) CSI report,
- Simultaneous PUSCH/PUCCH may be enabled or not,
- Logical channel prioritization may be enabled or not,
- Starting symbol of PUSCH, UCI, Step 2 may be considered,
- Multiplexing with UL channel with different priority index,
- Simultaneous HARQ and CSI may be enabled or not,
- Carrier aggregation is implemented, and/or
- Priority index (e.g., 0 or 1).

Based on the case in FIG. 8, and which condition is used, the result for a UCI multiplexing and/or overlapping handling procedure may correspond to any one of following (headings):

Step-1

Step-1 could have the following indication:

1. Due to mux (and a UE transmits a UL channel with multiplexed SR (PN)),
2. No mux, but SR(PN) can be transmitted independently (and the UE transmits an a UL channel with

SR (PN)),

No indication

3. Due to no mux, and SR(PN) cannot be transmitted independently.

Step-2

Step-2 could have the following indication:

1. Due to mux (and a UE transmits a UL channel with multiplexed UEI report)
2. No mux, but the UEI report can be transmitted independently (and UE transmits a UL channel with UEI report)

No indication

3. Due to no mux, and the UEI report cannot be transmitted independently

In response to (or after) UCI multiplexing and/or a overlapping handling procedure, the UE could determine at least one UL channel for transmission, which the at least one UL channel for transmission could be any one or any combination of the following:

- (Pre-)configured UL resource for step-2 (associated with a triggered event or UEI report, or associated with an event),
- (Pre-)configured UL resource for additional UCI multiplexing, and/or
- UL resource of PUSCH/UCI (not associated with event) (which the UL resource of PUSCH/UCI overlap with UL resource for step-2 in time domain).

In response to (or after) UCI multiplexing and/or the overlapping handling procedure, for a UL channel which is not determined for transmission, the UE will perform any one or more of the following:

- Drop or cancel the UL channel, and/or
- Does not perform transmission on the UL channel.

In response to at least one triggered event (not cancelled), before transmitting the PN on step-1, the UE will determine a bundle of resources for step-1 and resources for step-2 is valid/available or not based on an indication of step-1 being transmitted and an indication of step-2 being transmitted. If at least one of the indication of step-1 and step-2 will not be transmitted before transmitting the PN on step-1, the UE does not determine the bundle of resources for step-1 and resources for step-2 as valid (or eligible). Indication of step-x will be not transmitted due to de-prioritization. De-prioritization may be based on any one of the above mentioned conditions. In one example, when a UL resource for step-1 is overlapping with PUSCH in time domain (especially in the same serving cell), due to logical channel prioritization being enabled, PUSCH comprising a logical channel with higher priority may cause the UL resource for step-1 to be de-prioritized. Additionally and/or preferably in certain embodiments, the above mentioned condition may further comprise a Random Access (RA) procedure is performed (and not completed) and/or a measurement gap and/or Sidelink (SL) transmission being prioritized. In response to at least one triggered event and one UEI report, the UE will determine a valid bundle of resources for step-1 and resources for step-2.

Figure 10:
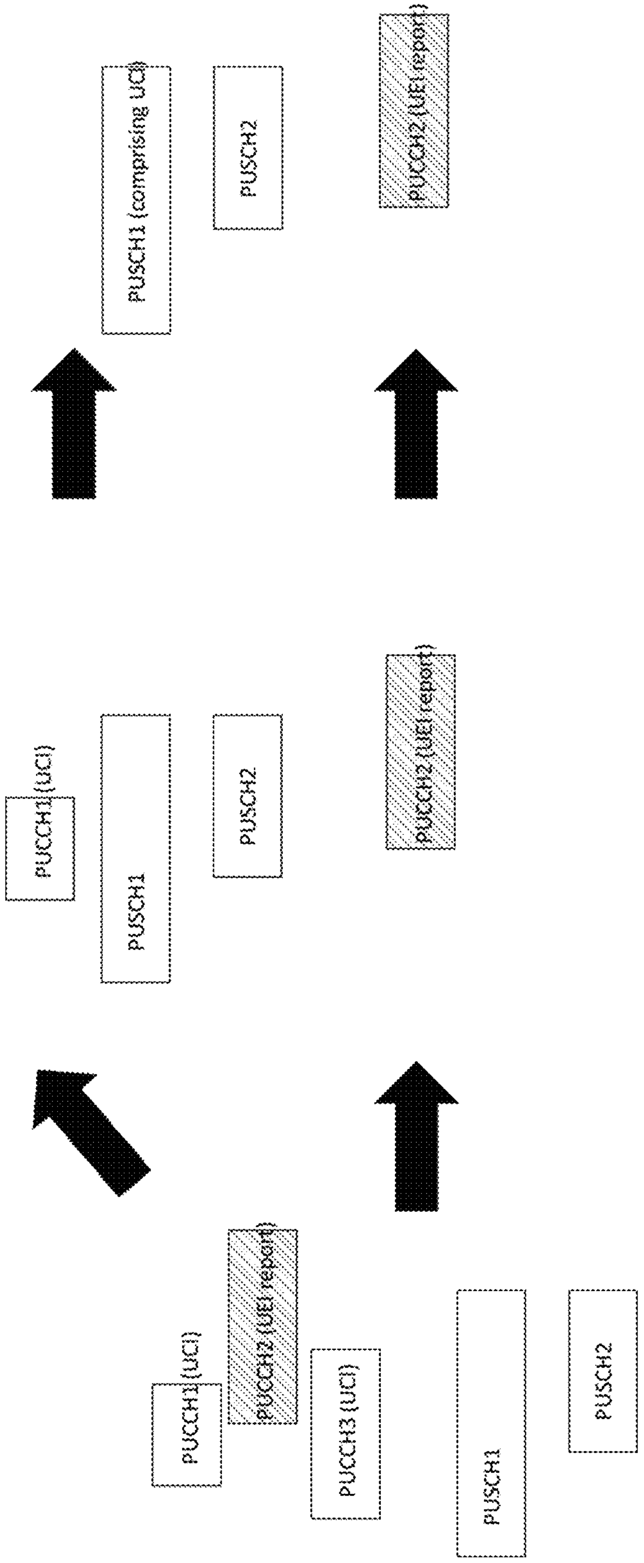
FIG. 10 is an example diagram showing PUCCH2 is assumed to be step-2 of mode-B comprising the UEI report, and the UE has transmitted a PN on a corresponding UL resource in a previous timing, in accordance with embodiments of the present invention.

For example, as shown in FIG. 10, PUCCH2 is assumed to be step-2 of mode-B comprising the UEI report, and the UE has transmitted a PN on a corresponding UL resource in a previous timing. In this example, the UE has PUCCH1 and PUCCH3 for transmitting UCI other than the UEI report, and the five channels are overlapping with each other in time domain (partially or fully overlapping). In this example, any two different UL channels could correspond to a same or different serving cell.

A first method is to perform a separate UCI multiplex procedure for the UEI report and UCI (not associated with the event or UEI report). In FIG. 10, the UE would determine two (resulted) PUCCHs (i.e., PUCCH1 (UCI) and PUCCH2 (UEI report)). The UE would resolve overlapping for PUCCH and PUSCH (e.g., PUCCH1 and PUSCH1 and PUSCH2). The UE may assume presence of the UEI report (and PUCCH2) even if there is no triggered event or pending UEI report. Alternatively, in this example, if PUCCH1 and PUSCH1 or PUSCH2 are in different serving cells and the UE supports simultaneous transmission of PUCCH and PUSCH, the UE determines PUCCH1, PUSCH1, PUSCH2 are valid for transmission (before comparing with PUCCH2 e.g., with the UEI report). In this example, the UE would determine a resulted channel as PUCCH1, PUSCH1, and PUSCH2. After resolving overlapping with PUCCH2, the UE transmits either PUCCH1 or PUCCH2. This is because the UE transmits up to one channel on one serving cell and typically PUCCH1 and PUCCH2 correspond to the same serving cell (e.g., Primary Cell (PCell) or PUCCH-Secondary Cell (SCell)). Preferably in certain embodiments, comparing between PUCCH1 and PUCCH2 (i.e., UCI not associated with event, and UEI report) may depend on a priority rule (or prioritization rule) or a priority value associated with a CSI report. Preferably in certain embodiments, always prioritizing PUCCH2 could be performed. Preferably in certain embodiments, always prioritizing PUCCH1 could be performed. Based on performing transmission of the UEI report and UCI other than the UEI report (which is not associated with an event) on a different channel, even the network node miss detect step-1, the UE could avoid blindly decoding a corresponding channel with unknown size. Alternatively, the UE would determine a resulted PUSCH as PUSCH1 comprising UCI. If the UE supports simultaneous PUCCH and PUSCH transmission, PUSCH1 and PUSCH2 correspond to different serving cells than PUCCH2, the UE could transmit PUCCH2 and PUSCH1 and PUSCH2. Alternatively, if PUCCH2 is on the same serving cell with either PUSCH1 or PUSCH2, the UE determines one channel for transmission. Preferably in certain embodiments, a prioritization rule may be configured or specified or based on a priority value or priority index. Preferably in certain embodiments, the UE prioritizes to transmit PUSCH1 over PUCCH2. Preferably in certain embodiments, the UE does not transmit PUCCH2. Alternatively, the UE could determine another PUSCH for multiplexing the UEI report. Preferably in certain embodiments, the determination for multiplexing UEI report on PUSCH should be ensured that to be multiplexed in different PUSCH than the determined PUSCH for multiplex UCI other than the UEI report. Preferably in certain embodiments, the UE determines a first PUSCH for multiplex UCI other than the UEI report. Preferably in certain embodiments, the UE determines a second PUSCH for multiplexing UEI report. Preferably in certain embodiments, when the UE determines the second PUSCH for multiplexing UEI report, the UE will exclude the first PUSCH. Preferably in certain embodiments, (after excluding the first PUSCH, the UE would determine the second PUSCH based on dynamic scheduled/indicated PUSCH over configured PUSCH), PUSCH on the serving cell with lower serving cell index, and/or the PUSCH starts earlier. An alternative implementation for determining the second PUSCH for multiplexing UEI report could be based on a second one in order based on dynamic scheduled/indicated PUSCH over configured PUSCH), PUSCH on a serving cell with a lower serving cell index, and/or PUSCH starts earlier (which means determination of the first PUSCH and the second PUSCH does not have determine order). Preferably in certain embodiments, when the UE determines that there is no second PUSCH (in addition to the first PUSCH):

- If the UE supports simultaneous transmission of PUCCH and PUSCH, the UE transmits PUCCH comprising the UEI report and the first PUSCH, or
- If the UE does not support simultaneous transmission of PUCCH and PUSCH, the UE prioritizes to transmit the first PUSCH (and not transmit the PUCCH) or the UE prioritizes to transmit the PUCCH (and not transmit the first PUSCH), the UE prioritizes one channel among the first PUSCH and the PUCCH. Preferably in certain embodiments, a prioritization rule could be specified throughout the present disclosure.

Figure 11:
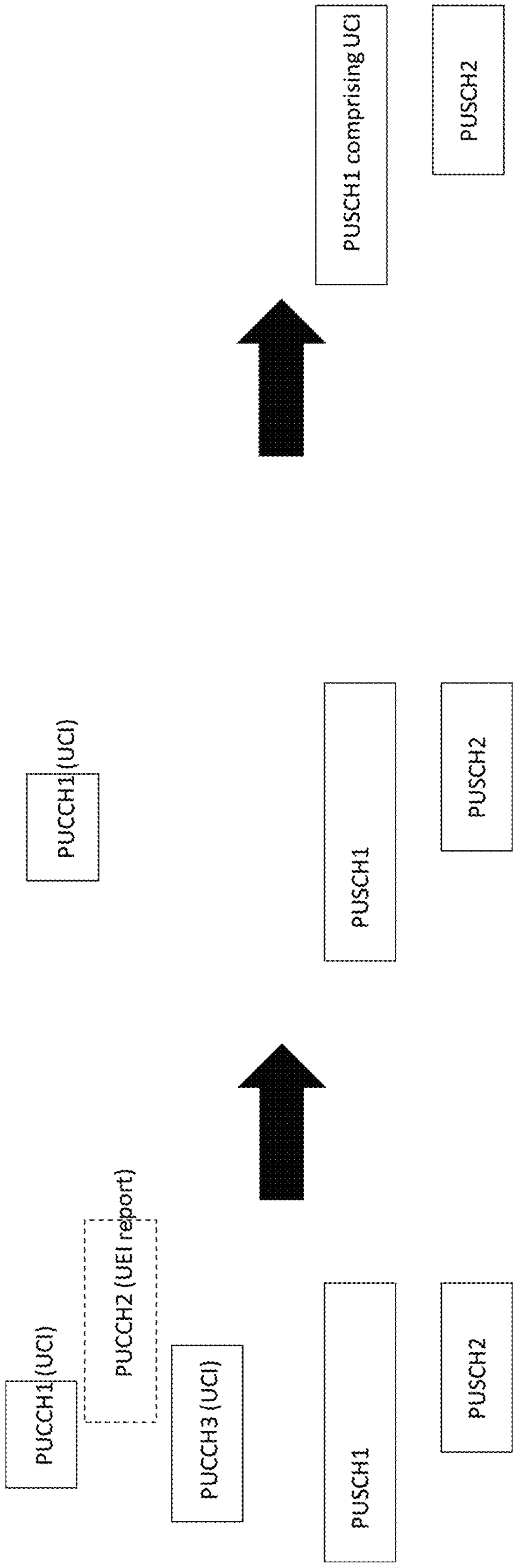
FIG. 11 is an example diagram showing due to the potential of step-1 and/or step-2 (e.g., PUCCH2), the network node may not have aligned an understanding on multiplexed content, in accordance with embodiments of the present invention.

A second method is to multiplex both UEI and the UEI report, and a specified or configured size of payload is used to determine the size of multiplexed content. In FIG. 11, due to the potential of step-1 (not shown in this figure) and/or step-2 (e.g., PUCCH2), the network node may not have aligned an understanding on multiplexed content. In this second method, once there is a UL resource/channel for step-2 overlapping with another/other UL channel (to be transmitted), the UE should take the UL resource/channel for step-2 into account as part of the UCI multiplexing procedure or assumes the specified or configured size of the payload size for the UEI report. Preferably in certain embodiments, one specified code-point corresponding to the specified or configured size of payload size for the UEI report corresponds to no UEI report. No matter if the UE transmits PN or not and/or has a pending UEI report or not, the UE should take the specified or configured size into account. Preferably in certain embodiments, size determination could be based on taking into account presence of the UEI report. Preferably in certain embodiments, a resulted channel determination could be based on taking into account the presence of the UL channel for the UEI report. Alternatively, the resulted channel determination does not take into account presence of the UL channel for the UEI report. In FIG. 11, the UE does not take into account when determining a resulted PUCCH. Preferably in certain embodiments, the UE transmits multiplexed content with specified or configured size for both the UCI and the UEI report. Preferably in certain embodiments, the UE transmits multiplexed content comprising a specified or configured size associated with the UEI report (even there is no pending event).

A third method is to transmit information associated with a payload size of resulted information/content. Preferably in certain embodiments, a specified combination or value or predefined combination or value could be as information that a resulted information/content does not comprise the UEI report. Preferably in certain embodiments, the information comprises "how many number of UEI reports". Preferably and/or additionally, the information could indicate whether the UEI report is present or not in the resulted information/content. When the UE is configured mode-B or the UEI report or event 2 for MIMO (and the UL resource/channel for step-2 overlap with PUCCH or PUSCH in time domain which is not associated with the event or the UEI report), the UE transmits information associated with payload size of resulted information/content. Preferably in certain embodiments, if there is no overlapping between UL resource/channel for step-2 and PUCCH or PUSCH which is not associated with the event or the UEI report in time domain, the UE does not transmit information associated with payload size of resulted information/content.

Figure 12:
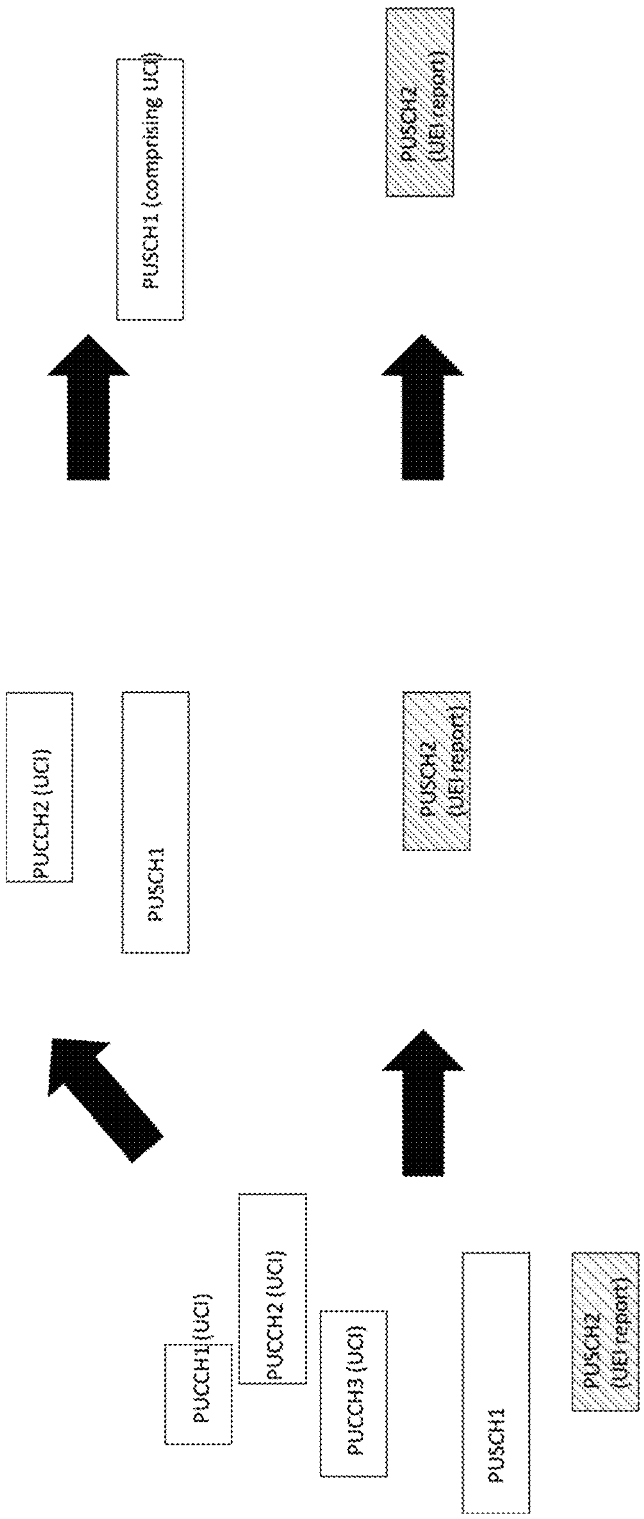
FIG. 12 is an example diagram showing PUSCH2 is assumed to be step-2 of mode-B comprising the UEI report, and the UE has transmitted a PN on a corresponding UL resource in previous timing, in accordance with embodiments of the present invention.

For example, in FIG. 12, PUSCH2 is assumed to be step-2 of mode-B comprising the UEI report, and the UE has transmitted a PN on a corresponding UL resource in previous timing. In this example, the UE has PUCCH1-PUCCH3 for transmitting UCI other than the UEI report, and the five channels are overlapping with each other in time domain (partially or fully overlapping). In this example, any two different UL channels could correspond to the same or different serving cell.

The first method for PUSCH for step-2 could be illustrated in FIG. 12. The UE would determine one (resulted) PUCCH (i.e., PUCCH2 (UCI)). The UE would resolve overlapping for PUCCH and PUSCH (e.g., PUCCH2 and PUSCH1). The UE would determine a resulted PUSCH as PUSCH1 comprising UCI. If PUSCH1 and PUSCH2 correspond to a different serving cell, the UE could transmit PUSCH1 and PUSCH2. When the UE determines a resulted PUSCH for resolving overlapping PUSCH(s) and/or PUCCH(s) associated with UCI not associated with an event, the UE does not take into account PUSCH associated with the UEI report (e.g., PUSCH configured for the UEI report). In other words, in this example, if there is no PUSCH1, the UE cannot multiplex UCI (which is not associated with the event) into PUSCH2 (e.g., the UEI report). Even if PUSCH2 is on a serving cell with a lower serving cell index or ID than PUSCH1, the UE determines to multiplex UCI on the PUSCH1. Preferably in certain embodiments, if the UE supports simultaneous transmission of PUSCH and PUCCH and PUCCH2 and PUSCH1 are associated with a different serving cell, the UE could determine a resulted channel as PUSCH1 and PUCCH2 (before comparing with PUSCH2 e.g., with the UEI report). If the UE could transmit simultaneously both PUSCH2 and PUSCH1 or all of PUSCH2, PUSCH1 and PUCCH2, the UE could separately transmit them. In one example, both channels or all of the channels are in a different serving cell and, preferably in certain embodiments, the UE supports simultaneous transmission of PUCCH and PUSCH. If the UE cannot simultaneously transmit PUSCH2 and PUSCH1, the UE would prioritize one of them. If the UE cannot simultaneously transmit PUSCH2 and PUCCH1, the UE would prioritize one of them. Preferably in certain embodiments, always prioritizing PUSCH2 could be performed. Preferably in certain embodiments, always prioritizing PUCCH1 could be performed. Preferably in certain embodiments, always prioritizing PUSCH1 could be performed. Preferably in certain embodiments, a priority rule or prioritization rule could be performed for determining one channel for transmission. Alternatively, if PUSCH1 and PUSCH2 are on the same serving cell, the UE determines one channel for transmission. Preferably in certain embodiments, a prioritization rule may be configured or specified or based on a priority value or priority index. Preferably in certain embodiments, the UE prioritizes to transmit PUSCH1 (comprising UCI other than the UEI report or event) over PUSCH2 (comprising the UEI report). Preferably in certain embodiments, the UE does not transmit PUSCH2. Alternatively, the UE could determine another PUSCH for multiplexing the UEI report. Preferably in certain embodiments, the determination for multiplexing the UEI report on PUSCH should be ensured to be multiplexed in a different PUSCH than the determined PUSCH for multiplex UCI other than the UEI report. Preferably in certain embodiments, the UE determines a first PUSCH for multiplex UCI other than the UEI report. Preferably in certain embodiments, the UE determines a second PUSCH for multiplexing the UEI report. In FIG. 12, the second PUSCH may not be PUSCH2, and the second PUSCH could corresponds to PUSCH3 (not shown in FIG. 12) which is another PUSCH in a different serving cell than PUSCH1. Preferably in certain embodiments, when the UE determines the second PUSCH for multiplexing the UEI report, the UE will exclude the first PUSCH. Preferably in certain embodiments, (after excluding the first PUSCH, the UE would determine the second PUSCH based on dynamic scheduled/indicated PUSCH over configured PUSCH), PUSCH on a serving cell with a lower serving cell index, and/or PUSCH starts earlier. An alternative implementation for determining the second PUSCH for multiplexing the UEI report could be based on a second one in order based on dynamic scheduled/indicated PUSCH over configured PUSCH, PUSCH on the serving cell with a lower serving cell index, and/or PUSCH starts earlier (which means determination of the first PUSCH and the second PUSCH does not have determining order). Alternatively, the UE could determine PUSCH associated with the UEI report for multiplexing one or more UCIs not associated with the event. Preferably in certain embodiments, the UE could multiplex one or more UCIs and the UEI report into PUSCH for the UEI report (e.g., PUSCH2 in FIG. 12). Preferably in certain embodiments, the UE could multiplex a different type of UCI into PUSCH for the UEI report. Preferably in certain embodiments, the different type of UCI corresponds to HARQ, and/or SR. Preferably in certain embodiments, when resolving overlapping for PUCCH(s) and/or PUSCH(s), the UE can multiplex the UCI not associated with the event into PUSCH/PUCCH associated with the UEI report. Preferably in certain embodiments, when resolving overlapping for PUCCH(s) and/or PUSCH (s), the UE does not multiplex the UCI not associated with the event into PUSCH/PUCCH associated with the UEI report.

Figure 13:
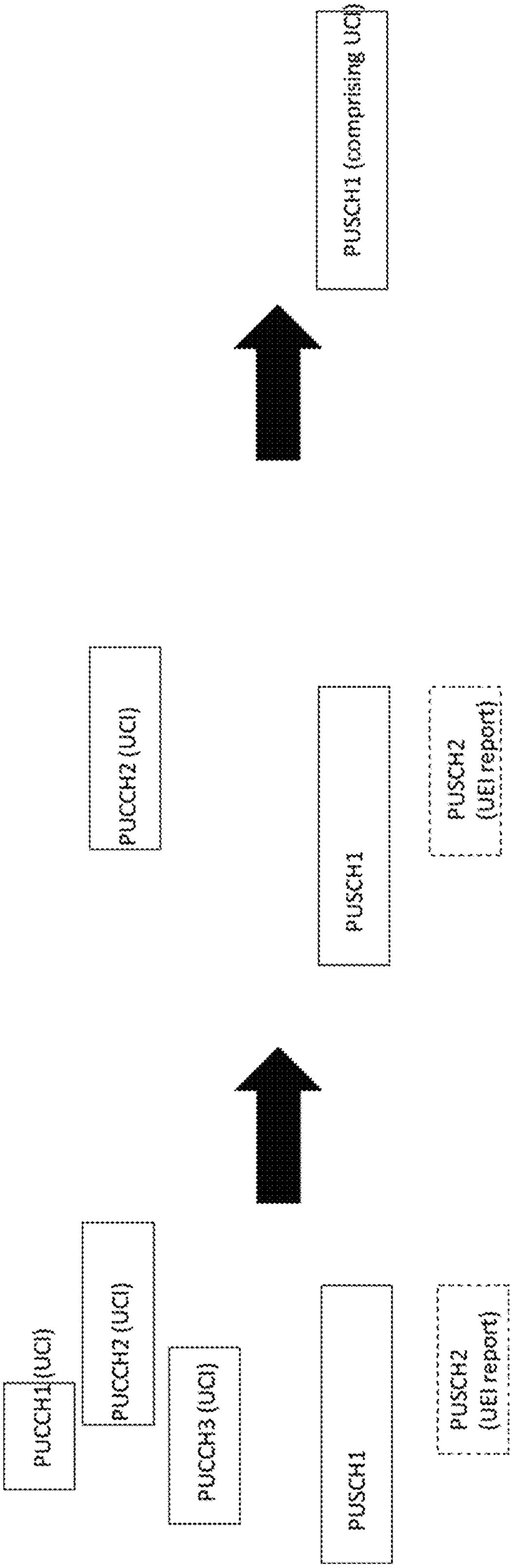
FIG. 13 is an example diagram showing the second method for PUSCH for step-2, in accordance with embodiments of the present invention.

The second method for PUSCH for step-2 could be illustrated in FIG. 13. In this second method, once there is a UL resource/channel for step-2 overlapping with another/other UL channel (to be transmitted), the UE should take the UL resource/channel for step-2 into account as part of a UCI multiplexing procedure or assumes the specified or configured size of payload size for the UEI report. Preferably in certain embodiments, one specified code-point corresponding to the specified or configured size of payload size for the UEI report corresponds to no UEI report. No matter if the UE transmits the PN or not and/or has a pending UEI report or not, the UE should take the specified or configured size into account. Preferably in certain embodiments, size determination could be based on taking into account the presence of the UEI report. Preferably in certain embodiments, resulted channel determination could be based on taking into account the presence of the UL channel for the UEI report. Alternatively, resulted channel determination does not take into account presence of the UL channel for the UEI report. In FIG. 13, the UE does not take into account when determining a resulted PUCCH. Preferably in certain embodiments, the UE transmits multiplexed content with specified or configured size for both UCI and the UEI report. Preferably in certain embodiments, the UE transmits multiplexed content comprising a specified or configured size associated with the UEI report (even if there is no pending event).

The third method for PUSCH for step-2 is shown in FIG. 13. When the UE is configured mode-B or the UEI report or event 2 for MIMO (and UL resource/channel for step-2 overlap with PUCCH or PUSCH in time domain which is not associated with the event or the UEI report), the UE transmits information associated with payload size of resulted information/content. Preferably in certain embodiments, if there is no overlapping between the UL resource/channel for step-2 and PUCCH or PUSCH which is not associated with the event or the UEI report in time domain, the UE does not transmit information associated with the payload size of the resulted information/content.

Preferably in certain embodiments, any of the first method, the second method, and the third method for resolving overlapping for PUCCH and/or PUSCH associated with the UEI report could be applied for the PN. Preferably in certain embodiments, the UEI report in FIG. 10 or FIG. 11 could be replaced by the PN. One different feature between the UEI report and the PN may be the UE cannot multiplex the PN into PUSCH. Alternatively, The UE could multiplex the PN into PUSCH. Preferably in certain embodiments, even the PN is associated with or configured by an SR configuration, the PN could be multiplexed into PUSCH. Preferably in certain embodiments, based on whether a PUCCH resource is associated with a step-2 UL resource or not, the UE could determine whether to multiplex content or information of the PUCCH resource into a (overlapped in time domain) PUSCH.

In response to at least one triggered event (not cancelled), after transmitting the PN on step-1, a different case in FIG. 8 with one or more different conditions may result in different UE behavior.

Case 1

No overlapping UL channel/signal with both resources for step-1 and resources for step-2 in time domain, respectively.

The UE determines a bundle of resources for step-1 and resources for step-2 are valid. The UE could transmit the PN on resources for step-1 and transmit the UEI report on resources for step-2.

Case2

UCI overlapping with resources for step-2 in time domain, respectively).

Single cell: preferably in certain embodiments, the UE communicates with one or more network nodes via a single cell. Preferably in certain embodiments, the UE performs uplink transmission with one or more network nodes via a single cell.

A UCI multiplexing procedure may be not applied (to include at least the UEI report and UCI which is not associated with the event) or the UE prioritizes one channel among PUCCH/PUSCH for UCI and PUCCH/PUSCH for step-2. Preferably in certain embodiments, the UE prioritizes to transmit UCI. Preferably in certain embodiments, the UE de-prioritizes to transmit the UEI report. Preferably in certain embodiments, the UE, based on content of the UCI, determines to prioritize which channel. Preferably in certain embodiments, if the UCI comprises at least HARQ or SR, the UE prioritizes to transmit the UCI. Preferably in certain embodiments, if the UCI comprises CSI (without comprising HARQ or SR), the UE prioritizes to transmit the UEI report. Preferably in certain embodiments, UEI report may have a configured or specified/predefined priority value (higher priority value with lower priority and lower priority value with higher priority). Preferably in certain embodiments, based on the priority value, the UE determines to prioritize to transmit the UEI report or the UCI. Preferably in certain embodiments, no matter or regardless of the UE supporting multiplexing CSI and HARQ or not, the UE does not multiplex the UEI report (which is associated with a CSI report configuration) with UCI. Preferably in certain embodiments, the UE performs a separate UCI multiplexing procedure for UCI(s) NOT associated with the event and for the UEI report(s), respectively. Preferably in certain embodiments, a first (resulted) channel is determined for UCI(s) (NOT associated with event). Preferably in certain embodiments, a second (resulted) channel is determined for the UEI report (associated with the event). Preferably in certain embodiments, the UE determines to prioritize one between the first (resulted) channel and the second (resulted) channel. Preferably in certain embodiments, the UL channel for step-2 is PUCCH. Preferably in certain embodiments, the UL channel for step-2 is PUSCH or PUCCH.

Preferably in certain embodiments, a UCI multiplexing procedure comprises at least that the UE resolves overlapping for PUCCHs, and then the UE resolves overlapping for PUCCH and PUSCH. Preferably in certain embodiments, the UE performs one or more UCI multiplexing procedures for a set of overlapping PUCCHs and PUSCHs including the UEI report. Preferably in certain embodiments, the UE resolves overlapping for PUCCHs associated with the UEI report and resolves overlapping for PUCCHs associated with the UCI other than the UEI report separately. Preferably in certain embodiments, the UE resolves overlapping for PUCCH and PUSCH associated with the UEI report and resolves overlapping for PUCCH and PUSCH associated with the UCI other than the UEI report, separately. Preferably in certain embodiments, a first (resulted) channel corresponds to a UL channel after the UE resolves overlapping for PUCCH and PUSCH associated with the UCI other than the UEI report. Preferably in certain embodiments, a second (resulted) channel corresponds to a UL channel after the UE resolves overlapping for PUCCH and PUSCH associated with the UEI report. Preferably in certain embodiments, the first (resulted) channel and the second (resulted) channel overlap in time domain. In response to a single cell such that the UE cannot simultaneously transmit both PUSCH and PUCCH, the UE determines a prioritized channel among the first (resulted) channel and the second (resulted) channel. Preferably in certain embodiments, the prioritization is based on HARQ/SR>UEI report>CSI report. Preferably in certain embodiments, the prioritization is based on HARQ/SR>CSI report based on a priority value. Preferably in certain embodiments, the prioritization is based on UEI report>UCI other than the UEI report (or not associated with the event). Preferably in certain embodiments, the prioritization is based on the UCI other than the UEI report (or not associated with the event)>UEI report. Preferably in certain embodiments, priority index of PUCCH and PUSCH are assumed to be the same or the UE is not configured with the priority index (e.g., 0 or 1).

Preferably in certain embodiments, one possible implementation is to design the UL channel for step-2 is PUSCH. Preferably in certain embodiments, a UCI multiplexing procedure for the UEI report may not comprise resolving overlapping for PUCCH and PUSCH associated with the UEI report. Preferably in certain embodiments, the UCI multiplexing procedure for the UEI report may not comprise resolving overlapping for PUCCHs associated with UEI report. Preferably in certain embodiments, the second (resulted) channel corresponds to PUSCH.

Preferably in certain embodiments, when determining the first (resulted) channel, PUCCH and/or PUSCH associated with the UEI report is excluded (i.e., PUCCH and/or PUSCH not associated with the UEI report is included). Preferably in certain embodiments, when determining the second (resulted) channel, PUCCH and/or PUSCH NOT associated with the UEI report is excluded (i.e., PUCCH and/or PUSCH associated with the UEI report is included).

Alternatively, the UE is configured to multiplex the UEI report and UCI (not associated with the event). Preferably in certain embodiments, the UE could be configured with a size of the UEI report for multiplexing. Preferably in certain embodiments, a specified or predefined size is used to determine size of the UEI report. Preferably in certain embodiments, no matter if the UE has a pending UEI report or not, the UE assumes the specified or predefined or configured size for multiplexing with UCI not associated with the event. Preferably in certain embodiments, when the UE determines to perform a UCI multiplexing procedure in response to at least a resource for the UEI report and a resource for the UCI being overlapped in time domain, the UE assumes the specified or predefined or configured size for the UEI report. Preferably in certain embodiments, no matter if the UE has issue with transmitting the PN (e.g., step-1) or the network node miss detects the PN or not, a size alignment could be applied for the UE and the network node for transmitting the multiplexed UEI report and UCI(s). Preferably in certain embodiments, the UE could transmit the multiplexed UEI report and UCI not associated with the event on PUCCH or PUSCH.

Alternatively, the UE transmits information associated with payload size of resulted information/content in response to a UCI multiplexing procedure. Preferably in certain embodiments, after the UCI multiplexing procedure (in response to a resource for the UEI report and a resource for UCI being overlapped in time domain or in response to one or more events or in response to one or more UEI reports), the UE transmits information associated with a payload size of resulted information/content. Preferably in certain embodiments, when a resource for UCI and a resource for the UEI report overlap in time domain, the UE transmits information associated with the payload size of resulted information/content. Preferably in certain embodiments, when the UE transmits at least one UEI report (preferably with UCI not associated with an event or a second UEI report), the UE transmits information associated with the payload size of resulted information/content. Preferably in certain embodiments, the UE could transmits the multiplexed UEI report and UCI not associated with an event on PUCCH or PUSCH.

In another example, two parts of the UCI and/or the UEI report will be used for transmission. Preferably in certain embodiments, a first part of the UCI and/or the UEI report has a fixed size. Preferably in certain embodiments, the first part of the UCI and/or the UEI report will indicate a size of a second part of the UCI and/or the UEI report. Preferably in certain embodiments, a UCI multiplexing procedure comprising at least the UCI and/or the UEI report will be performed based on determining or assuming the UEI report corresponds to the CSI report. Preferably in certain embodiments, the first part of the UCI and/or the UEI report may comprise a higher priority content of the UCI (e.g., HARQ, and/or SR from the UCI). Preferably in certain embodiments, the second part of the UCI and/or the UEI report may comprise a lower priority content of the UCI (e.g., CSI report from the UCI). Preferably in certain embodiments, two parts of the UCI and/or the UEI report here corresponds to an example which could be extended to three parts or other number of parts or one part.

Preferably in certain embodiments, the UE prioritizes to transmit the UCI (not associated with an event) over the UEI report (step-2). Preferably in certain embodiments, one rationale is to reduce signal overhead due to similar content of the UEI report and the UCI. Preferably in certain embodiments, a UCI comprising HARQ/SR has a higher priority than the UEI report. Preferably in certain embodiments, a UCI comprising the CSI report has a higher priority than the UEI report in step-2. Preferably in certain embodiments, for a UCI comprising the CSI report, the UE prioritizes one CSI report based on priority associated with the CSI report and the UEI report. Alternatively, no matter what UEI report is associated with which priority, when there is overlapping in time domain between the UEI report and the UCI, the UE prioritizes to transmit UCI. Due to the UEI report may risk that the network node miss detects the PN in step-1, the UE prioritizes to transmit the UCI on PUCCH.

Throughout the present disclosure, a UEI report is one kind of a CSI report.

Throughout the present disclosure, a CSI report and CSI could be interchangeable.

Carrier aggregation (or multiple cells): preferably in certain embodiments, the UE communicates with one or more network nodes via more than one cell. Preferably in certain embodiments, the UE performs uplink transmission with one or more network nodes via more than one cell.

Based on the UE supporting simultaneous transmission of PUCCH and PUSCH, the UE could transmit PUCCH and PUSCH on separate cells and, preferably in certain embodiments, the PUCCH and the PUSCH are overlapped in time domain and, preferably in certain embodiments, the separate cells correspond to intra-band cells. Preferably in certain embodiments, when the UE supports simultaneous transmission of PUCCH and PUSCH, a UCI multiplex procedure may not comprise resolving overlapping for PUCCH and PUSCH. Preferably in certain embodiments, if the UE determines a first PUCCH for transmission and if there is a PUSCH being overlapped with the first PUCCH in time domain and also on the same serving cell, the UCI multiplexing procedure comprises resolving overlapping for PUCCH and PUSCH.

Preferably in certain embodiments, if the first (resulted) channel and the second (resulted) channel, which are overlapping in time domain, correspond to PUCCH and PUSCH or two PUSCHs on different serving cells, the UE could transmit both the first (resulted) channel and the second (resulted) channel. Preferably in certain embodiments, the UEI report in step-2 corresponds to a first PUSCH and UCI other than the UEI report (or not associated with an event) corresponds to a second PUCCH or a second PUSCH. Preferably in certain embodiments, the first PUSCH is overlapping with the second PUCCH or the second PUSCH in time domain. Preferably in certain embodiments, if the UE supports simultaneous transmission of PUCCH and PUSCH (and the first PUSCH and the second PUCCH or the second PUSCH are on different serving cells), the UE could transmit both the first PUSCH and the second PUCCH/PUSCH.

Alternatively, the UE is configured to multiplex the UEI report and the UCI (not associated with an event). Preferably in certain embodiments, the UE could be configured with a size of the UEI report for multiplexing. Preferably in certain embodiments, a specified or predefined size is used to determine the size of the UEI report. Preferably in certain embodiments, no matter if the UE has a pending UEI report or not, the UE assumes the specified or predefined or configured size for multiplexing with UCI is not associated with an event. Preferably in certain embodiments, when the UE determines to perform the UCI multiplexing procedure in response to at least a resource for the UEI report and a resource for the UCI being overlapped in time domain, the UE assumes the specified or predefined or configured size for the UEI report. Preferably in certain embodiments, no matter if the UE has issues for transmitting the PN (e.g., step-1) or the network node miss detects the PN or not, size alignment could be applied for the UE and the network node for transmitting the multiplexed UEI report and the UCI(s). Preferably in certain embodiments, the UE could transmit the multiplexed UEI report and the UCI not associated with the event on PUCCH or PUSCH.

Alternatively, the UE transmits information associated with a payload size of resulted information/content in response to the UCI multiplexing procedure. Preferably in certain embodiments, after the UCI multiplexing procedure (in response to a resource for the UEI report and a resource for the UCI being overlapped in time domain or in response to one or more events or in response to one or more UEI reports), the UE transmits information associated with the payload size of the resulted information/content. Preferably in certain embodiments, when the resource for UCI and the resource for the UEI report overlap in time domain, the UE transmits information associated with the payload size of the resulted information/content. Preferably in certain embodiments, when the UE transmit at least one UEI report (preferably with the UCI not associated with an event or a second UEI report), the UE transmits information associated with the payload size of the resulted information/content. Preferably in certain embodiments, the UE could transmit the multiplexed UEI report and the UCI not associated with the event on PUCCH or PUSCH.

In another example, two parts of the UCI and/or the UEI report will be used for transmission. Preferably in certain embodiments, a first part of the UCI and/or the UEI report has a fixed size. Preferably in certain embodiments, the first part of the UCI and/or the UEI report will indicate the size of a second part of the UCI and/or the UEI report. Preferably in certain embodiments, the UCI multiplexing procedure comprising at least the UCI and/or the UEI report will be performed based on determining or assuming the UEI report corresponding to the CSI report. Preferably in certain embodiments, the first part of the UCI and/or the UEI report may comprise a higher priority content of the UCI (e.g., HARQ, and/or SR from the UCI). Preferably in certain embodiments, the second part of the UCI and/or the UEI report may comprise a lower priority content of the UCI (e.g., CSI report from the UCI). Preferably in certain embodiments, two parts of the UCI and/or the UEI report here correspond to an example which could be extended to three parts or other number of parts or one part.

Preferably in certain embodiments, if the UCI corresponds to a serving cell other than the UEI report, the UE may determine one channel among PUCCH for the UCI and PUSCH/PUCCH for the UEI report. Preferably in certain embodiments, the UE may prioritize one channel based on content of the UCI. Preferably in certain embodiments, the UE may prioritize one channel based on a priority associated with the UEI report and the CSI report in the UCI. Preferably in certain embodiments, the UE may prioritize one channel based on an associated serving cell index. Preferably in certain embodiments, the UE may prioritize one channel based on a CSI priority value. Preferably in certain embodiments, a single cell and multi-cell may correspond to a different result. In one example, for a single cell, the UE prioritizes to transmit the UCI not associated with an event. For multi-cell, the UE prioritizes to transmit the UEI report. If both the UEI report and the UCI are associated with CSI, reportQuantity, time domain behavior (aperiodic/periodic/semi-persistent/UE initiated), serving cell index, and/or (CSI-)ReportconfigId could be used for determining priority and/or for determining one channel for transmission.

Case3

PUSCH overlapping with resources for step-2 in time domain, respectively.

Single cell: preferably in certain embodiments, the UE communicates with one or more network nodes via a single cell. Preferably in certain embodiments, the UE performs uplink transmission with one or more network node via a single cell.

The UE determines either the PUSCH or the UL channel for the UEI report for transmission. Preferably in certain embodiments, the UE determines based on a priority value or a predefined rule (e.g., priority rule or prioritization rule). Preferably in certain embodiments, the predefined rule (e.g., priority rule or prioritization rule) could be which channel has an earlier starting symbol, a channel comprising UEI report>channel without comprising the UEI report. Preferably in certain embodiments, (when the UL channel for step-2 is PUCCH), the UE does not multiplex the UEI report on PUSCH which is not scheduled or configured for the UEI report. Preferably in certain embodiments, (when the UL channel for step-2 is PUSCH), the UE prioritizes to transmit PUSCH without comprising the UEI report. Alternatively, the UE prioritizes to transmit PUSCH comprising the UEI report. Preferably in certain embodiments, the UE could determine which channel for transmission based on a configured UL channel or a dynamic scheduled/indicated UL channel. Preferably in certain embodiments, the UE prioritizes to transmit the UL channel associated with dynamic scheduling/indicating.

Alternatively, (when the UL channel for the step-2 is PUSCH), the UE could multiplex the UEI report on PUSCH which starts earlier (no matter the PUSCH which starts earlier corresponds to PUSCH associated with an event or UEI report). Preferably in certain embodiments, (when the UL channel for the step-2 is PUSCH), the UE could multiplex the UEI report on dynamic scheduling/indicating PUSCH. Preferably in certain embodiments, (when the UL channel for the step-2 is PUSCH), the UE could multiplex the UEI report on configured PUSCH which starts earlier (if there is no dynamic scheduling/indicating PUSCH(s) or only configured PUSCH(s)). Preferably in certain embodiments, (when the UL channel for the step-2 is PUCCH), the UE multiplexes the UEI report on PUSCH (which is not associated with an event or UEI report). Preferably in certain embodiments, the UE is configured to multiplex the UEI report and the UCI (not associated with an event). Preferably in certain embodiments, the UE could be configured with a size of the UEI report for multiplexing. Preferably in certain embodiments, a specified or predefined size is used to determine the size of the UEI report. Preferably in certain embodiments, no matter if the UE has a pending UEI report or not, the UE assumes the specified or predefined or configured size for multiplexing with the UCI not associated with the event. Preferably in certain embodiments, when the UE determines to perform a UCI multiplexing procedure in response to at least resources for the UEI report and resources for the UCI being overlapped in time domain, the UE assumes the specified or predefined or configured size for the UEI report. Preferably in certain embodiments, no matter if the UE has issues for transmitting the PN (e.g., step-1) or the network node miss detects the PN or not, size alignment could be applied for the UE and the network node for transmitting the multiplexed UEI report and the UCI(s). Preferably in certain embodiments, the UE could transmit the multiplexed UEI report and the UCI not associated with the event on PUCCH or PUSCH.

Alternatively, the UE transmits information associated with payload size of resulted information/content in response to a UCI multiplexing procedure. Preferably in certain embodiments, after the UCI multiplexing procedure (in response to resources for the UEI report and resources for the UCI being overlapped in time domain or in response to one or more events or in response to one or more UEI reports), the UE transmits information associated with the payload size of the resulted information/content. Preferably in certain embodiments, when resources for the UCI and resources for the UEI report overlap in time domain, the UE transmits information associated with the payload size of the resulted information/content. Preferably in certain embodiments, when the UE transmits at least one UEI report (preferably with the UCI not associated with an event or a second UEI report), the UE transmits information associated with the payload size of the resulted information/content. Preferably in certain embodiments, the UE could transmit the multiplexed UEI report and the UCI not associated with the event on PUCCH or PUSCH.

In another example, two parts of the UCI and/or the UEI report will be used for transmission. Preferably in certain embodiments, a first part of the UCI and/or the UEI report has a fixed size. Preferably in certain embodiments, the first part of the UCI and/or the UEI report will indicate a size of a second part of the UCI and/or the UEI report. Preferably in certain embodiments, a UCI multiplexing procedure comprising at least the UCI and/or the UEI report will be performed based on determining or assuming the UEI report corresponding to the CSI report. Preferably in certain embodiments, the first part of the UCI and/or the UEI report may comprise a higher priority content of the UCI (e.g., HARQ, and/or SR from the UCI). Preferably in certain embodiments, the second part of the UCI and/or the UEI report may comprise a lower priority content of the UCI (e.g., CSI report from the UCI). Preferably in certain embodiments, two parts of the UCI and/or the UEI report here correspond to an example which could be extended to three parts or other number of parts or one part.

Carrier aggregation (or multiple cells): preferably in certain embodiments, the UE communicates with one or more network nodes via more than one cell. Preferably in certain embodiments, the UE performs uplink transmission with one or more network nodes via more than one cell.

Based on the UE supporting simultaneous transmission of PUCCH and PUSCH, the UE could transmit PUCCH and PUSCH on separate cells and, preferably in certain embodiments, the PUCCH and the PUSCH are overlapped in time domain and, preferably in certain embodiments, the separate cells correspond to intra-band cells. Preferably in certain embodiments, when the UE supports simultaneous transmission of PUCCH and PUSCH, a UCI multiplex procedure may not comprise resolving overlapping for PUCCH and PUSCH. Preferably in certain embodiments, if the UE determines a first PUCCH for transmission and if there is a PUSCH being overlapped with the first PUCCH in time domain and also on the same serving cell, the UCI multiplexing procedure comprises resolving overlapping for PUCCH and PUSCH.

Preferably in certain embodiments, if the first (resulted) channel and the second (resulted) channel, which are overlapping in time domain, correspond to PUCCH and PUSCH or two PUSCHs on different serving cells, the UE could transmit both the first (resulted) channel and the second (resulted) channel. Preferably in certain embodiments, the UEI report in step-2 corresponds to a first PUSCH and PUSCH other than the UEI report (or not associated with an event) corresponds to a second PUCCH or a second PUSCH. Preferably in certain embodiments, the first PUSCH is overlapping with the second PUCCH or the second PUSCH in time domain. Preferably in certain embodiments, if the UE supports simultaneous transmission of PUCCH and PUSCH (and the first PUSCH and the second PUCCH or the second PUSCH are on different serving cells), the UE could transmit both the first PUSCH and the second PUCCH/PUSCH. Preferably in certain embodiments, for Case3.

Alternatively, the UE is configured to multiplex the UEI report and the UCI (not associated with an event). Preferably in certain embodiments, the UE could be configured with a size of the UEI report for multiplexing. Preferably in certain embodiments, a specified or predefined size is used to determine the size of the UEI report. Preferably in certain embodiments, no matter if the UE has a pending UEI report or not, the UE assumes the specified or predefined or configured size for multiplexing with the UCI not associated with an event. Preferably in certain embodiments, when the UE determines to perform the UCI multiplexing procedure in response to at least resources for the UEI report and resources for the UCI being overlapped in time domain, the UE assumes the specified or predefined or configured size for the UEI report. Preferably in certain embodiments, no matter if the UE has issues for transmitting the PN (e.g., step-1) or the network node miss detects the PN or not, size alignment could be applied for the UE and the network node for transmitting the multiplexed UEI report and the UCI(s). Preferably in certain embodiments, the UE could transmit the multiplexed UEI report and the UCI not associated with the event on PUCCH or PUSCH.

Alternatively, the UE transmits information associated with the payload size of resulted information/content in response to the UCI multiplexing procedure. Preferably in certain embodiments, after the UCI multiplexing procedure (in response to resources for the UEI report and resources for the UCI being overlapped in time domain or in response to one or more events or in response to one or more UEI reports), the UE transmits information associated with the payload size of the resulted information/content. Preferably in certain embodiments, when resources for the UCI and resources for the UEI report overlap in time domain, the UE transmits information associated with the payload size of the resulted information/content. Preferably in certain embodiments, when the UE transmit at least one UEI report (preferably with the UCI not associated with an event or a second UEI report), the UE transmits information associated with the payload size of the resulted information/content. Preferably in certain embodiments, the UE could transmit the multiplexed UEI report and the UCI not associated with the event on PUCCH or PUSCH.

In another example, two parts of the UCI and/or the UEI report will be used for transmission. Preferably in certain embodiments, a first part of the UCI and/or the UEI report has a fixed size. Preferably in certain embodiments, the first part of the UCI and/or the UEI report will indicate the size of a second part of the UCI and/or the UEI report. Preferably in certain embodiments, a UCI multiplexing procedure comprising at least the UCI and/or the UEI report will be performed based on determining or assuming the UEI report corresponding to the CSI report. Preferably in certain embodiments, the first part of the UCI and/or the UEI report may comprise a higher priority content of the UCI (e.g., HARQ, and/or SR from the UCI). Preferably in certain embodiments, the second part of the UCI and/or the UEI report may comprise a lower priority content of the UCI (e.g., CSI report from the UCI). Preferably in certain embodiments, two parts of the UCI and/or the UEI report here correspond to an example which could be extended to three parts or other number of parts or one part.

Case4

Both PUSCH and PUCCH comprising UCI overlapping with resources for step-2 in time domain, respectively.

When the UE performs the first method as illustrated above, the UE may have two resulted UL channels corresponding to the UCI (not associated with the UEI report or event) and the UEI report. If the UE can simultaneously transmit both of them, the UE transmits the two resulted UL channels comprising the UCI and the UEI report, respectively. If the UE cannot simultaneously transmit the two resulted channels, the UE prioritizes to transmit one of the two resulted UL channels. A prioritization rule (or priority rule) could be configured or specified. Preferably in certain embodiments, detailed prioritization may depend on one or more conditions mentioned in FIG. 8.

When the UE performs the second method as illustrated above, the UE is configured with a specified size of a payload. When there is overlapping in time between the UL channel/resource for step-2 and PUCCH/PUSCH NOT associated with the UEI report or event, the UE will determine or assume the specified or configured size for the UEI report. Preferably in certain embodiments, the UE assumes or determines the specified or configured size no matter whether the UE has a pending UEI report or has transmitted the PN or not.

When the UE performs the third method as illustrated above, the UE needs to transmit "information associated with payload size of resulted information/content".

Case5~Case16

Typically, PUCCH for step-1 has a higher priority than another/other UL channel. If the UE could transmit such indication of the PN no matter due to multiplexing the PN on PUCCH or another/other UL channel, such indication of the PN could indicate usage of one or more corresponding UL resources/channels for step-2. There may be some cases that step-1 has a lower priority than another/other UL channel in response to a result of logical channel prioritization, overlapping with an RA procedure in time domain (partially or fully overlapping), having a lower priority index, overlapping a measurement gap in time domain (partially or fully overlapping) and/or overlapping with cell Discontinuous Reception (DRX) in-active period (or non-active period) in time domain (partially or fully overlapping). If the UE determines to (prioritize to) transmit another/other channel rather than PUCCH for the PN (e.g., step-1), the UE determines a corresponding UL channel/resource for step-2 is not valid. If the UE could not transmit such indication of the PN, the UE will determine a corresponding UL channel/resource for step-2 is not valid. Preferably in certain embodiments, the UE determines one future/next valid UL resource for step-1 and a valid UL resource for step-2. In one example, for Case9~Case16, for a single cell or for carrier aggregation without supporting simultaneous PUCCH and PUSCH transmission, if the UE determines to transmit PUSCH over PUCCH for step-1, the UE does not transmit PUCCH for step-1 and/or the UE does not multiplex the PN into PUSCH and/or for Case13~Case16, the UE could multiplex the UCI (other than the PN) into PUSCH, (if timeline is allowed). If the UE determines to transmit PUCCH for step-1 over PUSCH, the UE does not transmit the PUSCH. Preferably in certain embodiments, PUCCH for step-1 is configured via one SR configuration (e.g., SchedulingRequestConfig, SchedulingRequestConfig, and/or SchedulingRequestResourceConfig). Preferably in certain embodiments, the PN resource or PUCCH resource for step-1 is not configured via an SR configuration (which means there is no dedicated SR configuration for configuring the PUCCH resource for step-1). Alternatively, the PUCCH resource for step-1 could be configured via a PUCCH resource directly. Preferably in certain embodiments, the PN corresponds to one kind of UCI content which is different than CSI, HARQ, and SR. Preferably in certain embodiments, the PN corresponds to one kind of UCI content which is different than CSI, and SR. Preferably in certain embodiments, the PN could be one kind of UCI content which is similar to HARQ. Preferably in certain embodiments, the PN corresponds to one kind of UCI content which is different than HARQ and SR. Preferably in certain embodiments, the PN could be one kind of UCI content which is similar to CSI.

Preferably in certain embodiments, when there is overlapping in time domain between the UL resource/channel for step-1 and PUSCH/PUCCH as shown in Case5~Case16 in FIG. 8, the UE performs one UCI multiplexing procedure by taking into account the PN associated with an event or UEI report. Preferably in certain embodiments, for step-2, the UE performs two UCI multiplexing procedures separately for UCI other than the UEI report and for the UEI report. Preferably in certain embodiments, in the end, if the UE cannot simultaneously transmit both the first (resulted) channel and the second (resulted) channel, the UE determines one among the first (resulted) channel and the second (resulted) channel.

For Case5~Case8 or Case13~Case16, considering time domain overlapping for the PUCCH resource for step-1 and (one or more) the PUCCH resource for UCI, when UCI is SR, since there is only one indication or SR resource that could be transmitted (considering in one PUCCH resource group, and preferably all PUCCH are on a same serving cell), the UE needs to determine the one indication or SR resource among the PUCCH resource for step-1 and the (one or more) PUCCH resource for UCI.

A first way is to avoid simultaneously triggering two procedures between the SR and the UEI report. Preferably in certain embodiments, when the UE has a pending SR procedure (without cancellation), the UE is not allowed to trigger another SR procedure associated with the UEI report. Preferably in certain embodiments, when the UE has a pending SR procedure and/or determines a first SR resource (PUCCH resource) associated with the pending SR procedure. Preferably in certain embodiments, once a condition of an event is reached, the UE does not determine a second SR resource (PUCCH resource) which is partially or fully overlapped with the first SR resource (PUCCH resource).

A second way is to determine one SR resource or indication associated with one SR resource based on one configured or specified/predefined priority rule or prioritization rule. Preferably in certain embodiments, the UE prioritizes to determine one SR resource or to provide indication associated with one SR resource associated with the UEI report or the event (e.g., associated with the PN). Preferably in certain embodiments, the UE prioritizes to determine one SR resource or to provide indication associated with one SR resource associated with the SR resource not associated with the UEI report or the event (e.g., not associated with the PN). Preferably in certain embodiments, a first priority threshold or a first priority could be configured or specified/predefined for the PN (PUCCH for PN, SR configuration for PN). Preferably in certain embodiments, a second priority threshold or a second priority could be configured or specified/pre-defined for the SR other than the PN. Alternatively, priority of a first SR resource is determined based on a highest priority associated with one or more logical channels when the first SR resource is associated with a first SR configuration associated with at least one logical channel. Preferably in certain embodiments, priority of a second SR resource is determined based on a highest priority associated with one or more logical channels when the second SR resource is associated with a second SR configuration associated with at least one logical channel.

A third way is to signal information associated with both the first SR resource and the second SR resource. Alternatively, the UE is allowed to transmit both the first SR resource and the second SR resource. Preferably in certain embodiments, when the first SR resource and the second SR resource are fully overlapped in time domain (and without overlapping in frequency domain), the UE could simultaneously transmit both the first SR resource and the second SR resource. Preferably in certain embodiments, the first SR resource and the second SR resource are associated with a different purpose. Preferably in certain embodiments, the first SR resource is associated with an SR configuration NOT associated with the event or the PN. Preferably in certain embodiments, the second SR resource is associated with the PN. Preferably in certain embodiments, when the first SR resource and the second SR resource is overlapped with one or more PUCCH resources for HARQ or CSI, the UE could multiplex information associated with both the first SR resource and the second SR resource with HARQ or CSI.

When the UE has one triggered SR procedure, the UE determines a third SR resource associated with the triggered SR procedure. Preferably in certain embodiments, when there are K SR resources overlapping in time domain with the PUCCH resource for HARQ or CSI, the UE could multiplex information for indicating the third SR resource among the K SR resources with HARQ or CSI. Preferably in certain embodiments, size of the information could be $\log_2(K+1)$ with a ceiling function.

When the UE has to provide information for at most two SR resources among K SR resources, one way could be to separately indicate and another way is to jointly indicate. Preferably in certain embodiments, for separate indication, K SR resources could be divided into K1 SR resources and K2 SR resources, size of first sub-information could be $\log_2(K1+1)$ with the ceiling function and size of second sub-information could be $\log_2(K2+1)$ with the ceiling function. Preferably in certain embodiments, for joint indication, size of the information could be $\log_2(K(K+1)/2)$. Preferably in certain embodiments, a simplified way is that the information comprises $\log_2(K-1+1)+1$ bits, wherein K−1 SR resources which is not associated with the PN and one bit to indicate whether to use a corresponding resource for step-2.

If the UE determines to transmit a first SR resource (which is not for the PN or event), the UE determines a second SR resource for the PN which is overlapping with the first SR resource in time domain being as not valid.

For Case5~Case16, priority of step-1 could be determined based on a lower priority of bundle of step-1 and step-2. Preferably in certain embodiments, the UEI report corresponds to a CSI report or associated with CSI. Preferably in certain embodiments, when the UE performs a UCI multiplexing procedure for resolving overlapping for PUCCHs comprising step-1, the UE assumes or determines priority of the PN as priority of CSI. Preferably in certain embodiments, even a resource for step-1 is associated with or configured by an SR configuration or even step-1 is an SR type UCI, the UE prioritizes to transmit a higher priority UCI. Preferably in certain embodiments, the UE (always) transmits the UCI not associated with the event and/or drops PUCCH for step-1. Preferably in certain embodiments, for Case5~Case8, when the UCI corresponds to HARQ and/or SR, the UE (always) transmits those UCIs and/or drops PUCCH for step-1. Preferably in certain embodiments, one rationale is that the PN (or said SR like step-1) is to provide information of usage of step-2 and due to step-2 maybe being de-prioritized via other channel, priority of step-1 remains the same as step-2. Preferably in certain embodiments, the UE would determine or assume step-1 (PN) as a one bit UCI. Preferably in certain embodiments, the UE would determine or assume step-1 (PN) as CSI. Preferably in certain embodiments, when resolving overlapping for PUCCH(s), the UE excludes the UL channel for step-1. Preferably in certain embodiments, if a determined PUCCH resource cannot accommodate one or more UCIs not associated with the event and the PN, the UE prioritizes to multiplex HARQ and SR in the one or more UCIs. Preferably in certain embodiments, if a determined PUCCH resource cannot accommodate one or more UCIs not associated with the event and the PN, the UE prioritizes to multiplex HARQ and SR in the one or more UCIs and the CSI report associated with the higher priority. Preferably in certain embodiments, priority of the CSI report is determined based on reportQuantity, time domain behavior (e.g., aperiodic/periodic/semi-persistent/UE initiated), serving cell index, (CSI-)ReportconfigId. Preferably in certain embodiments, a lower value of the serving cell index and/or (CSI-)ReportconfigId corresponds to a higher priority. Preferably in certain embodiments, ascending value corresponds to aperiodic, semi-persistent, and periodic. Preferably in certain embodiments, ascending value corresponds to UE initiated, aperiodic, semi-persistent, and periodic. Alternatively, ascending value corresponds to aperiodic, UE initiated, semi-persistent, and periodic. Alternatively, ascending value corresponds to aperiodic, semi-persistent, UE initiated, and periodic. Alternatively, ascending value corresponds to aperiodic, semi-persistent, periodic, and UE initiated. Preferably in certain embodiments, a priority value of the PN is determined based on reportQuantity, time domain behavior (e.g., aperiodic/periodic/semi-persistent/UE initiated), serving cell index, (CSI-)ReportconfigId associated with the UEI report (or the CSI report associated with the UEI report).

Preferably in certain embodiments, no matter if or regardless of a priority value determined based on reportQuantity, time domain behavior (e.g., aperiodic/periodic/semi-persistent/UE initiated), serving cell index, (CSI-)ReportconfigId, the PN associated with UEI report is deprioritized by any CSI report.

For Case9~Case12, the UE could multiplex the PN into PUSCH. Preferably in certain embodiments, when PUSCH could accommodate the PN, the UE could multiplex the PN into the PUSCH. Preferably in certain embodiments, even if the PN is SR like the UCI, the UE could multiplex the PN into PUSCH. Preferably in certain embodiments, the UE does not expect the SR configuration for the PN is associated with a logical channel. Preferably in certain embodiments, the UE does not expect the SR configuration for the PN is associated with SL CSI reporting. Preferably in certain embodiments, the UE does not expect the SR configuration for the PN is associated with a Link Recovery Request (LRR). Preferably in certain embodiments, for SR associated with at least one logical channel, when the UE has to transmit an SR on SR resources overlapping with PUSCH (similar to step-1 of case9-12), the UE does not multiplex the SR into PUSCH. Preferably in certain embodiments, the UE communicates with a single serving cell and/or the UE does not support simultaneous transmission of PUCCH and PUSCH, the UE prioritizes to transmit either PUCCH for SR or PUSCH. Preferably in certain embodiments, if the UE can simultaneously transmit both PUCCH for SR and PUSCH (on different serving cells), the UE can transmit both PUCCH and PUSCH. Preferably in certain embodiments, the UE communicates with a single serving cell and/or the UE does not support simultaneous transmission of PUCCH and PUSCH, the UE could multiplex the PN into PUSCH. Preferably in certain embodiments, if the UE can transmit indication of the PN no matter if PUCCH or being multiplexed into PUSCH, the UE determines this pair of resources for step-1 and step-2 are valid. Preferably in certain embodiments, when there is more than one PN resource (e.g., K PN resources) overlap in time domain, when multiplexing the PN into PUSCH or PUCCH for the UCI not associated with an event, the UE determines multiplexed result/content/information comprising information associated with the PN. Preferably in certain embodiments, information associated with the PN will indicate which one or more PN resources re selected or determined or associated with one or more triggered events. Preferably in certain embodiments, the size of the information associated with the PN may depend on a number of the more than one PN resources (e.g., K). Preferably in certain embodiments, the UE can transmit up to one PN resource. Preferably in certain embodiments, the UE can transmit up to two PN resources. Preferably in certain embodiments, based on a number of PN resources that the UE can simultaneously transmit, the size of the information may be different. Preferably in certain embodiments, for at most one, the size of the information could be $\log_2(K+1)$ with a ceiling function. Preferably in certain embodiments, for at most two, the size of the information could be $\log_2(K(K+1)/2)$ with the ceiling function. Preferably in certain embodiments, for at most three, the size of the information could be $\log_2(K(K+1)(2K+1)/6)$ with the ceiling function. Preferably in certain embodiments, an ascending order of a PN resource ID or index (e.g., SR resource ID or index) could correspond to a code-point of the information. Preferably in certain embodiments, based on the UE determining to transmit on which PN resource, the UE transmits the information for indicating the PN resource.

For Case13~Case16, the UE could multiplex the PN with PUSCH or PUCCH carrying the UCI not associated with an event. Preferably in certain embodiments, the UE transmit PUSCH with a multiplexed content/information comprising the PN. Preferably in certain embodiments, the UE transmits PUCCH with a multiplexed content/information comprising the PN. Preferably in certain embodiments, for an SR associated with a logical channel or SL CSI reporting or LRR, the UE does not multiplex the SR on PUSCH. Preferably in certain embodiments, instead, the UE only multiplexes HARQ and/or CSI and/or the PN among the UCI into PUSCH. Preferably in certain embodiments, whether the UE multiplexes HARQ and/or CSI and/or the PN into PUSCH may depend on whether a number of coded symbols for HARQ and/or CSI and/or the PN is enough or not. Preferably in certain embodiments, if there is not enough coded symbols, the UE prioritizes to multiplex HARQ followed by a higher priority CSI. Preferably in certain embodiments, the PN will be assumed or determined as one kind of CSI.

Throughout the present disclosure, any description, method, solution, way, or mechanism for any case (e.g., Case1~Case16) could be combined, in whole or in part.

Preferably in certain embodiments, the UCI multiplexing procedure is performed for a set of UCI(s) (including the UEI report(s), if a corresponding event is triggered) with a corresponding overlapped PUCCH in time domain.

Preferably in certain embodiments, the UCI multiplexing procedure is performed for a set of UCI(s) (NOT including the UEI report(s), if triggered) with a corresponding overlapped PUCCH in time domain.

Preferably in certain embodiments, the UCI multiplexing procedure is performed for a set of UEI report(s) (NOT including UCI(s) not associated with an event) with corresponding overlapped PUCCH in time domain.

Preferably in certain embodiments, the UE would determine one (resulted) UL channel for transmission. Preferably in certain embodiments, the one (resulted) UL channel is at least from one of the corresponding overlapped PUCCHs. Preferably in certain embodiments, the one (resulted) UL channel is determined based on a PUCCH with a latest starting symbol among the one of the corresponding overlapped PUCCHs.

Considering the possibility of missing detection of step-1 on the network node side, a procedure for PUCCH/PUSCH/UCI overlapping handling including step-2 may be performed separately for PUCCH/PUSCH/UCI (NOT associated with an event) and PUCCH/PUSCH/UCI (associated with an event). Preferably in certain embodiments, a first (resulted) channel is determined for PUCCH/PUSCH/UCI (NOT associated with an event). Preferably in certain embodiments, a second (resulted) channel is determined for PUCCH/PUSCH/UCI (associated with an event). No multiplexing between the first (resulted) channel and the second (resulted) channel is assumed on the UE side. The UE's behavior may be one or more of the following bullets if the UE cannot simultaneously transmit both the first (resulted) channel and the second (resulted) channel (a priority index is assumed to be the same for both channels):

- (Always) Prioritizes the UCI (not associated with an event) or the first (resulted) channel,
- (Always) Prioritizes the UEI report (associated with an event) or the second (resulted) channel,
- Prioritizes the UCI (not associated with an event) or the first (resulted) channel if the UCI corresponds to HARQ or SR,
- Prioritizes the UCI (not associated with an event) or the first (resulted) channel if the UCI corresponds to CSI (without HARQ nor SR).

Preferably in certain embodiments, the UE drops the deprioritized channel (and content).

Preferably in certain embodiments, if the UE determines the UL resource for step-2 (or the UEI report in step 2) is de-prioritized before transmitting a corresponding SR/PN in step-1, the UE does not determine this bundle of step-1 and step-2 is valid or a candidate bundle.

Preferably in certain embodiments, if the UE determines the UL resource for step-2 (or the UEI report in step 2) is de-prioritized after transmitting a corresponding SR/PN in step-1, the UE drops the UEI report.

Throughout the present disclosure, UCI(s) or UCI could be interchangeable.

Throughout the present disclosure, the UCI not associated with an event corresponds to or is the UCI comprising any one or any combination of CSI, PC5 Quality of Service (QoS) Identifier (PQI), Rank Indicator (RI), SR, HARQ, Signal-To-Interference Plus Noise Ratio (SINR), Layer 1/Layer 3 (L1/L3)-Reference Signal Received Power (RSRP) (not associated with an event).

Preferably in certain embodiments, a single Transmission/Reception Point (TRP) is assumed for UCI multiplexing or a separate mode for HARQ multiplexing.

Preferably in certain embodiments, a priority index corresponds to a value 0 or 1 which is a higher index with higher priority and a lower index with lower priority (e.g., the priority index is different than priority value).

Preferably in certain embodiments, the UL channel corresponds to PUSCH or PUCCH.

Preferably in certain embodiments, condition of an event could be quality (e.g., L1-RSRP or L1-SINR) of a serving cell is worse than a threshold.

Preferably in certain embodiments, condition of an event could be quality (e.g., L1-RSRP or L1-SINR) of a candidate cell is better than a threshold.

Preferably in certain embodiments, condition of an event could be quality (e.g., L1-RSRP or L1-SINR) of a candidate cell is better than quality of a serving cell with a threshold.

Preferably in certain embodiments, condition of an event could be quality (e.g., L1-RSRP or L1-SINR) of a candidate cell is better than a first threshold and quality of a serving cell is worse than a second threshold.

Preferably in certain embodiments, quality of a serving cell is based on a measurement result of RS determined from an indicated TCI state (e.g., Quasi-Co-Location (QCL) type-D RS).

Preferably in certain embodiments, quality of a serving cell is based on a measurement result of RS determined from an activated TCI state with best or worst quality (e.g., QCL type-D RS).

Preferably in certain embodiments, condition of an event could be quality (e.g., L1-RSRP or L1-SINR) of a current beam is less than a threshold.

Preferably in certain embodiments, condition of an event could be quality (e.g., L1-RSRP or L1-SINR) of a candidate beam is better than a threshold.

Preferably in certain embodiments, condition of an event could be quality (e.g., L1-RSRP or L1-SINR) of a candidate beam is better than quality of a current beam with a threshold.

Preferably in certain embodiments, condition of an event could be quality (e.g., L1-RSRP or L1-SINR) of a candidate beam is better than a first threshold and quality of a current beam is worse than a second threshold.

Preferably in certain embodiments, quality of a current beam is based on a measurement result of RS determined from an indicated TCI state (e.g., QCL type-D RS).

Preferably in certain embodiments, quality of a current beam is based on a measurement result of RS determined from an activated TCI state with best or worst quality (e.g., QCL type-D RS).

Preferably in certain embodiments, when the UE has one or more triggered MIMO events, the one or more (UEI) reports associated with the one or more triggered MIMO events are generated as an L1 signal (e.g., UCI).

Preferably in certain embodiments, when the UE has one or more triggered LTM events, the one or more (UEI) reports associated with the one or more triggered LTM events re generated as an L2 signal (e.g., MAC CE).

Preferably in certain embodiments, for an LTM event, the UE may ignore configurations associated with mode-A or mode-B. Preferably in certain embodiments, the UE transmits a report associated with the LTM event based on multiplexing MAC CE (comprising information/content of the report associated with the LTM event).

Preferably in certain embodiments, when the UE has both a triggered LTM event and a MIMO event, the UE could transmit both the report associated with the MIMO event and the report associated with the LTM event. Preferably in certain embodiments, the information for indicating a number of reports (associated with an event) may correspond to the MIMO event(s). Preferably in certain embodiments, the UE could transmit a report associated with the MIMO event based on UCI multiplexing and the transmit report associated with the LTM event based on MAC Protocol Data Unit (PDU) generation (e.g., the MAC PDU comprises the MAC CE comprising information/content of the report associated with the LTM event).

According to a report configuration without an associated event (e.g., reportQuantity set to 'cri-RSRP', 'ssb-Index-RSRP', 'cri-SINR' or 'ssb-Index-SINR', or 'cri-RSRP-Index', 'ssb-Index-RSRP-Index', 'cri-SINR-Index', 'ssb-Index-SINR-Index'), a report is carried by a single part CSI. Preferably in certain embodiments, the report configuration without an associated event could refer to an LTM report configuration or MIMO/CSI report configuration. Preferably in certain embodiments, the UE either transmits the entire single part CSI or does not transmit the single part CSI (due to de-prioritization).

Preferably in certain embodiments, for an intra-MIMO or intra-LTM event, concept 2 could be used.

Preferably in certain embodiments, for a MIMO event and LTM event, concept 1 or concept 2 could be used.

Preferably in certain embodiments, a PN resource comprises a different or a same number of symbols, number of Physical Resource Blocks (PRBs), PUCCH format, starting symbol, and/or starting PRB.

Preferably in certain embodiments, the UE triggers an event or determines that an event is triggered when one or more time instances that the UE determines condition of the event is fulfilled.

Preferably in certain embodiments, condition of an event is specified as described in RAN1 116 agreement or in RAN1 116bis agreement or in RAN1 117 agreement or in RAN2 126 agreement.

Throughout the present disclosure, an event associated with the UEI report corresponds to any one or any combination of: event-1, event-2, event-3, event-4, even-5, event-6, event-7a, event-7b, event-8, or event-9 (listed in RAN1 116 agreement or 116-bis agreement).

Throughout the present disclosure, the UEI report corresponds to a beam report.

Throughout the present disclosure, the UEI report comprises (at least) information related to L1-RSRP associated with a current beam and/or L1-RSRP related to one or more candidate beams.

Throughout the present disclosure, "quality" corresponds to "L1-RSRP preferably with quantization value".

Throughout the present disclosure, comparison of the quality between a current beam and a candidate beam corresponds to comparing an L1-RSRP value, or comparing a quantized L1-RSRP value (or index).

Throughout the present disclosure, a PN resource and a resource for PN could be interchangeable.

Throughout the present disclosure, a UEI resource and a resource for (transmitting) the UEI report could be interchangeable.

Throughout the present disclosure, a PN resource (associated with one event) could be configured per Bandwidth Part (BWP), per serving cell.

Throughout the present disclosure, a PN resource (associated with one event) needs MAC CE or a dynamic signal for activation and/or deactivation.

Throughout the present disclosure, a UEI resource (associated with one event) could be configured per BWP, per serving cell.

Throughout the present disclosure, a UEI resource (associated with one event) needs MAC CE or a dynamic signal to activate and/or deactivate.

Throughout the present disclosure, for a bundle of PN resources and UEI resources, both the PN resource and the UEI resource correspond to a same BWP or a same serving cell.

Throughout the present disclosure, for a bundle of PN resources and UEI resources, the PN resource and the UEI resource could correspond to a different BWP or a different serving cell.

Throughout the present disclosure, for a bundle of PN resources and UEI resources, both the PN resource and the UEI resource correspond to a resource with MAC CE or a dynamic signal to activate or deactivate.

Throughout the present disclosure, alternatively, for a bundle of PN resources and UEI resources, both the PN resource and the UEI resource correspond to a resource without MAC CE or a dynamic signal to activate or deactivate (i.e., once (pre-)configured, the UE could use for transmission).

Preferably in certain embodiments, the UE may transmit the PN without transmitting the UEI report on a corresponding resource due to one or more specific events.

Throughout the present disclosure, a TCI state and a beam could be interchangeable.

Throughout the present disclosure, TTI could be replaced or be a slot, subframe, a number of symbols, and/or a sub-slot.

Throughout the present disclosure, a noun using capital/non-capital, or comprising with/without a hyphen could represent the same thing.

Throughout the present disclosure, ID and ID of a noun could be replaced by each other.

Throughout the present disclosure, the concept of association between the PN and the UE-initiated report could be replaced by the PN and another/other pre-configure UL resource(s) for a purpose different than the UE-initiated report. Preferably in certain embodiments, the purpose different than the UE-initiated report could have time-critical characteristics.

This disclosure designs association between a PN and an event or a configured UL resource associated with an event.

This disclosure designs which information is indicated by a UL resource for PN.

This disclosure designs to solve uncertainty of the actual number of triggered events and the corresponding reports.

This disclosure designs prioritization of the PN resource for transmission or power allocation.

Various examples and embodiments of the present invention are described below. For the methods, alternatives, concepts, examples, and embodiments detailed above and herein, the following aspects and embodiments are possible.

Figure 14:
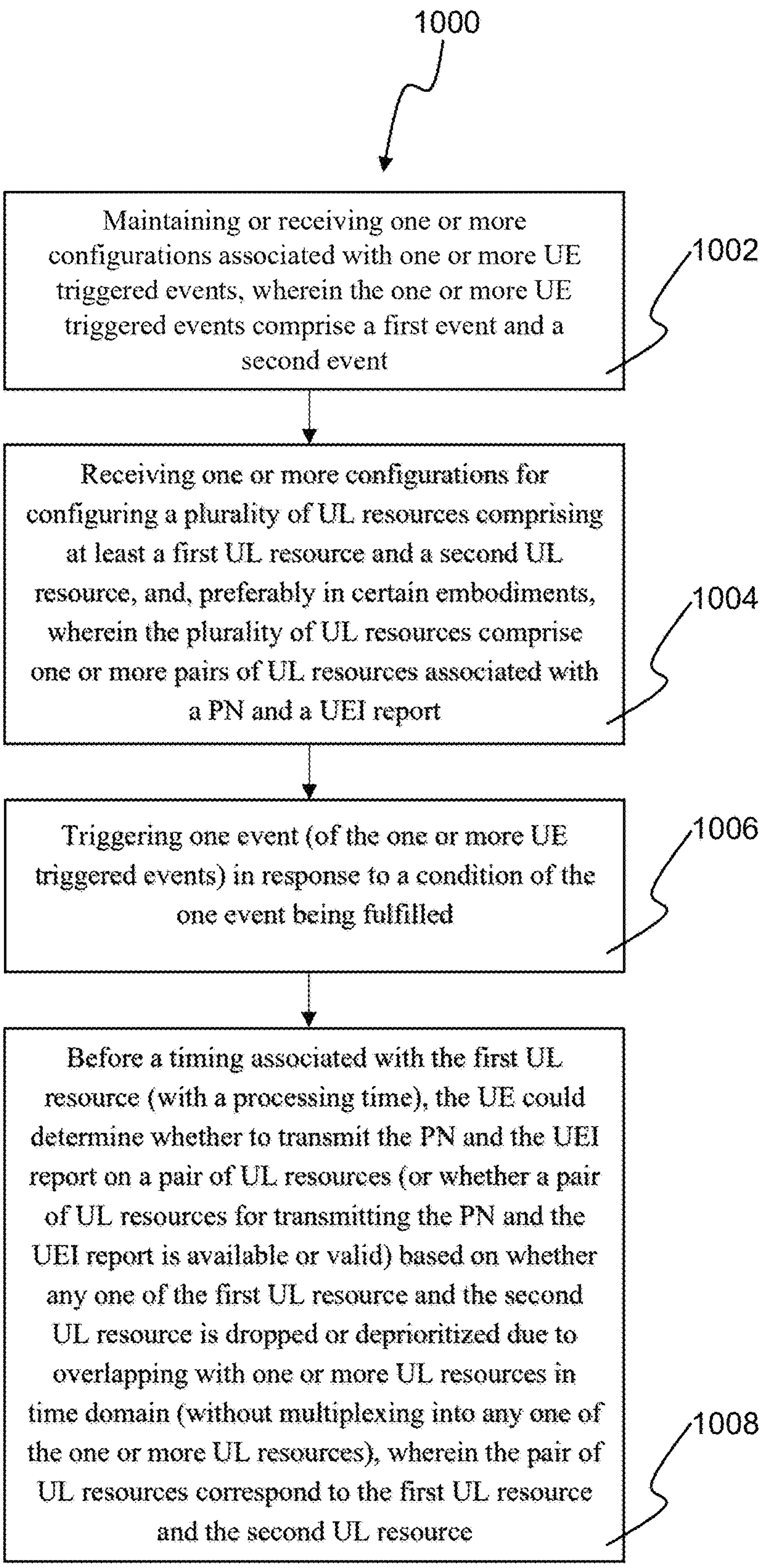
FIG. 14 is a flow diagram of a method of a UE in a wireless communication system comprising maintaining or receiving one or more configurations associated with one or more UE triggered events, receiving one or more configurations for configuring a plurality of UL resources comprising at least a first UL resource and a second UL resource, triggering one event (of the one or more UE triggered events) in response to a condition of the one event being fulfilled, and before a timing associated with the first UL resource (with a processing time), the UE could determine whether to transmit the PN and the UEI report on a pair of UL resources (or whether a pair of UL resources for transmitting the PN and the UEI report is available or valid) based on whether any one of the first UL resource and the second UL resource is dropped or deprioritized due to overlapping with one or more UL resources in time domain (without multiplexing into any one of the one or more UL resources), in accordance with embodiments of the present invention.

Referring to FIG. 14, with this and other concepts, systems, and methods of the present invention, a method 1000 for a UE in a wireless communication system comprises maintaining or receiving one or more configurations associated with one or more UE triggered events, wherein the one or more UE triggered events comprise a first event and a second event (step 1002), receiving one or more configurations for configuring a plurality of UL resources comprising at least a first UL resource and a second UL resource, and, preferably in certain embodiments, wherein the plurality of UL resources comprise one or more pairs of UL resources associated with a PN and a UEI report (step 1004), triggering one event (of the one or more UE triggered events) in response to a condition of the one event being fulfilled (step 1006), and before a timing associated with the first UL resource (with a processing time), the UE could determine whether to transmit the PN and the UEI report on a pair of UL resources (or whether a pair of UL resources for transmitting the PN and the UEI report is available or valid) based on whether any one of the first UL resource and the second UL resource is dropped or deprioritized due to overlapping with one or more UL resources in time domain (without multiplexing into any one of the one or more UL resources), wherein the pair of UL resources correspond to the first UL resource and the second UL resource (step 1008).

Preferably in certain embodiments, when a third UL resource overlaps with the first UL resource in time domain such that the UE cannot transmit the PN on the first UL resource or multiplex the PN into the third UL resource, the UE does not transmit the PN on the first UL resource and/or the UE determines a future/next pair of UL resources; when a fourth UL resource overlaps with the second UL resource in time domain such that the UE cannot transmit the UEI report on the second UL resource or multiplex the UEI report into the fourth UL resource, the UE does not transmit the UEI report on the second UL resource and/or the UE determines a future/next pair of UL resources; when a third UL resource overlaps with the first UL resource in time domain and the UE can transmit the PN on the first UL resource or multiplex the PN into the third UL resource, the UE transmits the PN on the first UL resource and/or the UE transmits a multiplexed content comprising the PN on the third UL resource; and/or when a fourth UL resource overlaps with the second UL resource in time domain and the UE can transmit the UEI report on the second UL resource or multiplex the UEI report into the fourth UL resource, the UE transmits the UEI report on the second UL resource and/or the UE transmits a multiplexed content comprising the UEI report on the fourth UL resource.

Preferably in certain embodiments, the UE is not allowed to multiplex the UEI report and the UCI not associated with an event into a same UL resource; the UE is not allowed to multiplex the PN and the UCI not associated with an event into a same UL resource; the UE multiplexes the UEI report and the UCI not associated with an event into a same UL resource, and/or the UE multiplexes the PN and the UCI not associated with an event into a same UL resource.

Preferably in certain embodiments, the UE supports simultaneous transmission of PUCCH and PUSCH.

Preferably in certain embodiments, when the UE supports simultaneous transmission of PUCCH and PUSCH, the UE simultaneously transmits PUSCH on the second UL resource comprising the UEI report and PUCCH on the fourth UL resource comprising the UCI not associated with an event.

Preferably in certain embodiments, when the UE does not support simultaneous transmission of PUCCH and PUSCH: the UE transmits PUSCH on the second UL resource comprising the UEI report, and/or drops PUCCH comprising the UCI not associated with an event and/or the PUSCH on the second UL resource further comprises part or full/all of the UCI, and/or the UE multiplexes part or full/all of the UCI with the UEI report; and/or the UE transmits PUCCH on the fourth UL resource comprising the UCI not associated with an event, and/or drops the PUSCH comprising the UEI report; the UE transmits one channel among the PUSCH and the PUCCH; the UE determines one channel among the PUSCH and the PUCCH to be transmitted based on a priority rule and/or content of the UCI; if content of the UCI corresponds to HARQ or SR, the UE prioritizes to transmit PUCCH on the fourth UL resource; if content of the UCI corresponds to CSI, the UE prioritizes to transmit PUSCH on the second UL resource; if content of the UCI corresponds to SR associated with a priority being higher than priority of a logical channel where PUSCH comprises or is higher than a priority threshold, the UE prioritizes to transmit SR on the fourth UL resource; and/or if content of the UCI corresponds to SR associated with a priority being lower than priority of a logical channel where PUSCH comprises or is lower than a second priority threshold, the UE prioritizes to transmit PUSCH comprising at least the UEI report on the second UL resource.

Preferably in certain embodiments, after the UE transmits the PN on the first UL resource, the UE transmits the UEI report on the second UL resource or the UE drops the UEI report due to overlapping with one or more UL resources.

Preferably in certain embodiments, the one or more UL resources could be schedule or configured by a network node.

Preferably in certain embodiments, the one or more UL resources are used for PUSCH (with/without aperiodic CSI or semi-persistent CSI) and/or PUCCH (with UCI).

Referring back to FIGS. 3 and 4, in one or more embodiments from the perspective of a device (e.g. UE) in a wireless communication system, the device 300 includes a program code 312 stored in memory 310 of the transmitter. The CPU 308 could execute program code 312 to: (i) maintain or receive one or more configurations associated with one or more UE triggered events, wherein the one or more UE triggered events comprise a first event and a second event; (ii) receive one or more configurations for configuring a plurality of UL resources comprising at least a first UL resource and a second UL resource, and, preferably in certain embodiments, wherein the plurality of UL resources comprise one or more pairs of UL resources associated with a PN and a UEI report; (iii) trigger one event (of the one or more UE triggered events) in response to a condition of the one event being fulfilled; and (iv) before a timing associated with the first UL resource (with a processing time), the UE could determine whether to transmit the PN and the UEI report on a pair of UL resources (or whether a pair of UL resources for transmitting the PN and the UEI report is available or valid) based on whether any one of the first UL resource and the second UL resource is dropped or deprioritized due to overlapping with one or more UL resources in time domain (without multiplexing into any one of the one or more UL resources), wherein the pair of UL resources correspond to the first UL resource and the second UL resource. Moreover, the CPU 308 can execute the program code 312 to perform all of the described actions, steps, and methods described above, below, or otherwise herein.

Figure 15:
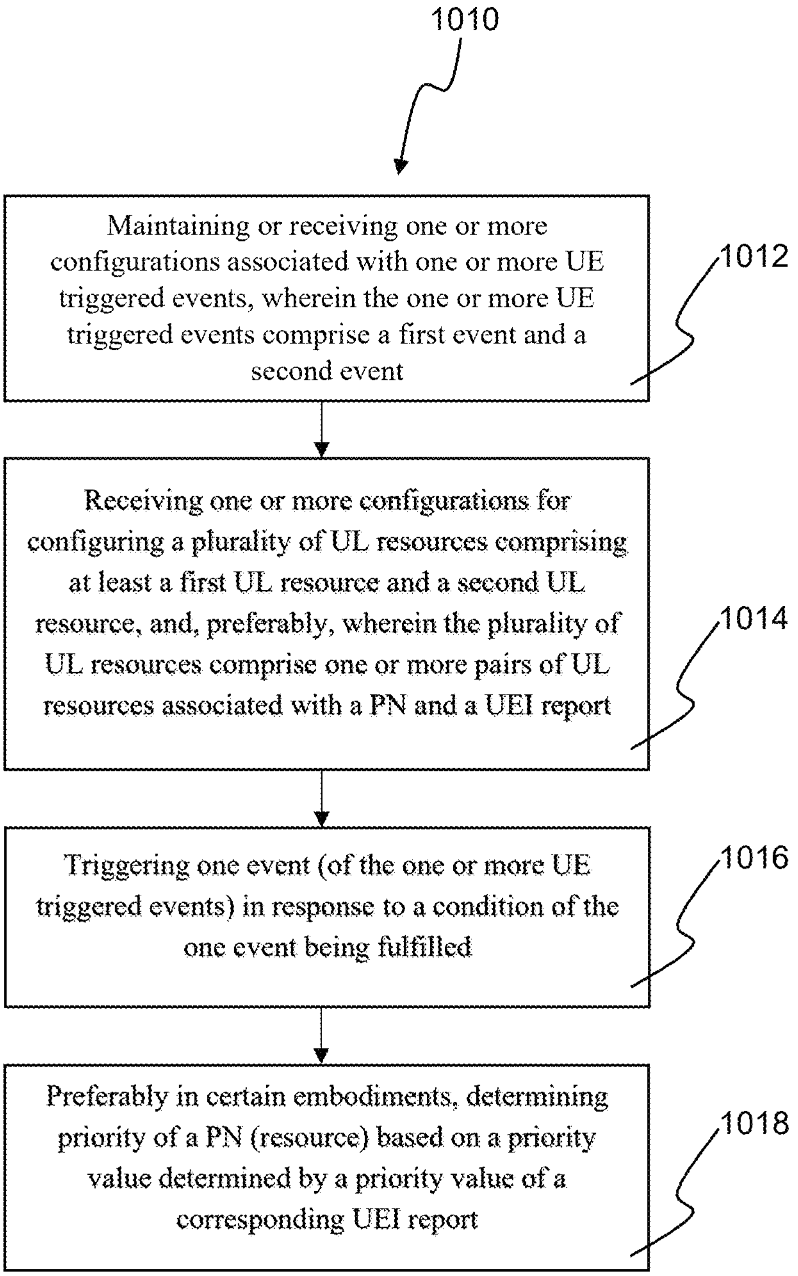
FIG. 15 is a flow diagram of a method of a UE in a wireless communication system comprising maintaining or receiving one or more configurations associated with one or more UE triggered events, receiving one or more configurations for configuring a plurality of UL resources comprising at least a first UL resource and a second UL resource, triggering one event (of the one or more UE triggered events) in response to a condition of the one event being fulfilled, and preferably in certain embodiments, determining priority of a PN (resource) based on a priority value determined by a priority value of a corresponding UEI report, in accordance with embodiments of the present invention.

Referring to FIG. 15, with this and other concepts, systems, and methods of the present invention, a method 1010 for a UE in a wireless communication system comprises maintaining or receiving one or more configurations associated with one or more UE triggered events, wherein the one or more UE triggered events comprise a first event and a second event (step 1012), receiving one or more configurations for configuring a plurality of UL resources comprising at least a first UL resource and a second UL resource, and, preferably, wherein the plurality of UL resources comprise one or more pairs of UL resources associated with a PN and a UEI report (step 1014), triggering one event (of the one or more UE triggered events) in response to a condition of the one event being fulfilled (step 1016), and preferably in certain embodiments, determining priority of a PN (resource) based on a priority value determined by a priority value of a corresponding UEI report (step 1018).

Preferably in certain embodiments, a prioritization rule could be based on the following order: HARQ/SR>CSI (not associated with an event)>CSI (associated with an event, e.g., UEI report), or HARQ/SR>CSI (associated with an event, e.g., UEI report)>CSI (not associated with an event).

Preferably in certain embodiments, the prioritization rule could be based on the following order: HARQ/SR>CSI.

Preferably in certain embodiments, for an intra-CSI prioritization rule or comparison, the priority rule depends on reportQuantity, time domain behavior, serving cell index, and/or (CSI-)ReportconfigId. Preferably in certain embodiments, the priority rule is used for determining a CSI report. Preferably in certain embodiments, a CSI report comprises a UEI report.

Preferably in certain embodiments, the PN resource is configured by an SR configuration.

Preferably in certain embodiments, (when the UE does not support simultaneous transmission of PUCCH and PUSCH for multi-carriers or for a single carrier) when the first UL resource overlaps in time domain with a third UL resource which is used for PUSCH, the UE could multiplex information associated with the PN into the third UL resource, and/or the UE transmits PUSCH on the third UL resource and/or the UE does not transmit PUCCH for the PN on the first UL resource.

Preferably in certain embodiments, if there is a fifth UL resource (for transmitting the PN) overlapping in time domain with a third UL resource which is used for PUSCH or PUCCH, the UE multiplexes information associated with the PN into the fifth UL resource; when the UE does not have a pending UEI report or does not trigger an event, the information associated with PN indicates no triggered event or no PN or no pending UEI report; one specific code-point of the information associated with the PN is used to indicate no triggered event or no PN or no pending UEI report; an ascending order code-point of the information associated with the PN corresponds to the PN resource with an ascending order of the PN resource ID/index; code-point zero of the information associated with the PN is used to indicate no triggered event or no PN or no pending UEI report; and/or code-point one to up to $((2^n)-1)$ corresponds to one PN resource with an ascending order of the PN resource ID/index, and Preferably in certain embodiments, a plurality of PN resources are overlapping in time domain (or in a slot).

Preferably in certain embodiments, for the SR, the UE does not multiplex information associated with the SR into PUSCH.

Preferably in certain embodiments, for the PN, the UE could multiplex information associated with the PN into PUSCH.

Preferably in certain embodiments, for an SR overlapping with the PN and preferably with one or more UL channels, the UE multiplexes either the SR or the PN into one UL channel, or the UE multiplexes both the SR and PN.

Preferably in certain embodiments, based on a resulted channel corresponding to PUSCH or PUCCH, the UE determines whether to multiplex both the SR and PN or multiplex the PN only.

Preferably in certain embodiments, when the UE determines to multiplex the SR and PN into one PUCCH comprising HARQ, the UE provides information associated with the SR and information associated with the PN, and/or when the UE determines to multiplex the SR and PN into one PUSCH, the UE provides information associated with the PN (and does not provide information associated with the SR).

Preferably in certain embodiments, the information associated with the SR provides one determined SR resource (or no triggered SR procedure), and/or the information associated with the PN provides one determined PN resource (or no triggered event).

Preferably in certain embodiments, the information associated with the SR and the information associated with the PN could be provided separately, or the information associated with the SR and the information associated with the PN could be jointly encoded.

Preferably in certain embodiments, for jointly encoding the information associated with the SR and the information associated with the PN, a specific code-point of joint information (e.g., zero) corresponds to no triggered SR and no triggered event; and/or ascending order of the code-point of joint information corresponds to the SR and PN resource with an ascending order of resource ID/index, or ascending order of the code-point of joint information corresponds to the SR resource with an ascending order of the SR resource ID/index followed by the PN resource with an ascending order of the PN resource ID/index, or ascending order of the code-point of joint information corresponds to the PN resource with an ascending order of the PN resource ID/index followed by the SR resource with an ascending order of the SR resource ID/index.

Preferably in certain embodiments, the information associated with the PN indicates up to a number of PN resources; the number is one; the number is two; the number is up to the UE's capability; and/or size of the information associated with the PN is based on a second number of overlapping PN resources and the number of (indicated) PN resources.

Preferably in certain embodiments, the information associated with the PN indicates up to a number of SR resources; the number is one; the number is two; the number is up to the UE's capability; and/or size of the information associated with the SR is based on a second number of overlapping SR resources and the number of (indicated) SR resources.

Preferably in certain embodiments, the joint information associated with the PN and SR indicates up to a number of resources; the number is one; the number is two; the number is up to the UE's capability; and/or size of the joint information associated with the SR and PN is based on a second number of overlapping SR resources and PN resources and the number of (indicated) SR resources and PN resources.

Preferably in certain embodiments, when the UE resolves overlapping with the SR and PN, the UE prioritizes to transmit either one; the UE prioritizes to transmit the SR; the UE prioritizes to transmit the PN; when priority associated with the SR (e.g., priority associated with the logical channel associated with the SR) is lower than a threshold, the UE transmits the PN; when priority associated with the SR (e.g., priority associated with the logical channel associated with the SR) is higher than a threshold, the UE transmits the SR; when priority associated with the PN is higher than a second threshold, the UE transmits the PN; when priority associated with the PN is lower than a second threshold, the UE transmits the SR; the UE determines or considers the PN as a CSI type UCI; the UE determines or considers the SR as an SR type UCI; a higher priority value corresponds to a lower priority; and/or a lower priority value corresponds to a higher priority.

Referring back to FIGS. 3 and 4, in one or more embodiments from the perspective of a device (e.g. UE) in a wireless communication system, the device 300 includes a program code 312 stored in memory 310 of the transmitter. The CPU 308 could execute program code 312 to: (i) maintain or receive one or more configurations associated with one or more UE triggered events, wherein the one or more UE triggered events comprise a first event and a second event; (ii) receive one or more configurations for configuring a plurality of UL resources comprising at least a first UL resource and a second UL resource, and, preferably, wherein the plurality of UL resources comprise one or more pairs of UL resources associated with a PN and a UEI report; (iii) trigger one event (of the one or more UE triggered events) in response to a condition of the one event being fulfilled; and (iv) preferably in certain embodiments, determine priority of a PN (resource) based on a priority value determined by a priority value of a corresponding UEI report. Moreover, the CPU 308 can execute the program code 312 to perform all of the described actions, steps, and methods described above, below, or otherwise herein.

Figure 16:
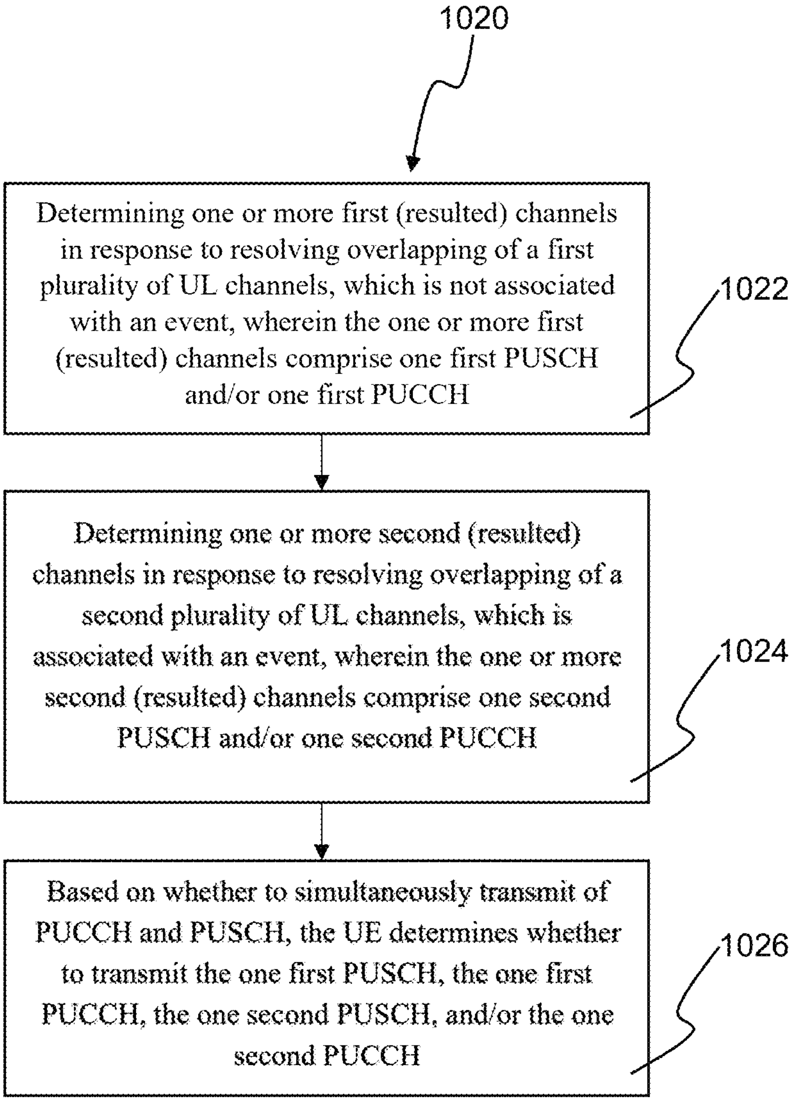
FIG. 16 is a flow diagram of a method of a UE in a wireless communication system comprising determining one or more first (resulted) channels in response to resolving overlapping of a first plurality of UL channels, which is not associated with an event, determining one or more second (resulted) channels in response to resolving overlapping of a second plurality of UL channels, which is associated with an event, and based on whether to simultaneously transmit PUCCH and PUSCH, the UE determines whether to transmit the one first PUSCH, the one first PUCCH, the one second PUSCH, and/or the one second PUCCH, in accordance with embodiments of the present invention.

Referring to FIG. 16, with this and other concepts, systems, and methods of the present invention, a method 1020 for a UE in a wireless communication system comprises determining one or more first (resulted) channels in response to resolving overlapping of a first plurality of UL channels, which is not associated with an event, wherein the one or more first (resulted) channels comprise one first PUSCH and/or one first PUCCH (step 1022), determining one or more second (resulted) channels in response to resolving overlapping of a second plurality of UL channels, which is associated with an event, wherein the one or more second (resulted) channels comprise one second PUSCH and/or one second PUCCH (step 1024), and based on whether to simultaneously transmit of PUCCH and PUSCH, the UE determines whether to transmit the one first PUSCH, the one first PUCCH, the one second PUSCH, and/or the one second PUCCH (step 1026).

Preferably in certain embodiments, even if the UE supports simultaneous multiplexing HARQ and CSI, the UE performs a separate UCI multiplexing procedure for the UEI report corresponding CSI and HARQ (which is not associated with the event).

Preferably in certain embodiments, for a single cell or for multi-cells without supporting simultaneous transmission of PUCCH and PUSCH, the UE prioritizes to transmit one channel among the one first PUSCH, the one first PUCCH, the one second PUSCH, and/or the one second PUCCH.

Preferably in certain embodiments, for a single cell or for multi-cells without supporting simultaneous transmission of PUCCH and PUSCH, the UE prioritizes to transmit one channel among the one first PUSCH and the one second PUSCH.

Preferably in certain embodiments, for a single cell or for multi-cells without supporting simultaneous transmission of PUCCH and PUSCH, the UE prioritizes to transmit one channel among the one first PUCCH and the one second PUSCH, and/or the UE does not multiplex UCI in the one first PUCCH into the one second PUSCH.

Referring back to FIGS. 3 and 4, in one or more embodiments from the perspective of a device (e.g. UE) in a wireless communication system, the device 300 includes a program code 312 stored in memory 310 of the transmitter. The CPU 308 could execute program code 312 to: (i)

determine one or more first (resulted) channels in response to resolving overlapping of a first plurality of UL channels, which is not associated with an event, wherein the one or more first (resulted) channels comprise one first PUSCH and/or one first PUCCH; (ii) determine one or more second (resulted) channels in response to resolving overlapping of a second plurality of UL channels, which is associated with an event, wherein the one or more second (resulted) channels comprise one second PUSCH and/or one second PUCCH; and (iii) based on whether to simultaneously transmit of PUCCH and PUSCH, the UE determines whether to transmit the one first PUSCH, the one first PUCCH, the one second PUSCH, and/or the one second PUCCH. Moreover, the CPU 308 can execute the program code 312 to perform all of the described actions, steps, and methods described above, below, or otherwise herein.

Figure 17:
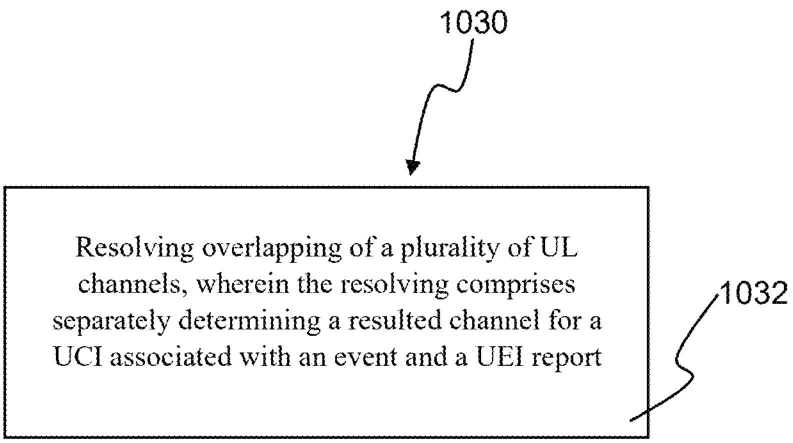
FIG. 17 is a flow diagram of a method of a UE in a wireless communication system comprising resolving overlapping of a plurality of UL channels, wherein the resolving comprises separately determining a resulted channel for a UCI associated with an event and a UEI report, in accordance with embodiments of the present invention.

Referring to FIG. 17, with this and other concepts, systems, and methods of the present invention, a method 1030 for a UE in a wireless communication system comprises resolving overlapping of a plurality of UL channels, wherein the resolving comprises separately determining a resulted channel for a UCI associated with an event and a UEI report (step 1032).

Preferably in certain embodiments, the resolving comprises resolving overlapping of PUCCH(s) in time domain; the resolving comprising to determine a (resulted) PUCCH after resolving overlapping of PUCCH(s); when the UE determines a (resulted) PUCCH for UCI not associated with an event, the UE excludes PUCCH resource(s) which is associated with the event; the resolving comprises resolving overlapping of PUCCH(s) and PUSCH(s) (or the resulted PUCCH and PUSCH(s)) in time domain; the resolving comprises to determine a (resulted) PUSCH after resolving overlapping of PUCCH(s) and PUSCH(s) (or the resulted PUCCH and PUSCH(s)); when the UE determines a (resulted) PUSCH for UCI not associated with an event, the UE excludes PUSCH resource(s) which is associated with the event; and/or even when a PUSCH resource associated with an event has a lower serving cell index, and/or an earlier starting symbol and/or corresponds to a dynamic scheduling or indication, the UE determines a (resulted) PUSCH for UCI not associated with the event based on PUSCH not associated with the event.

Preferably in certain embodiments, a UCI multiplex procedure comprises to resolve overlapping of PUCCH(s) and/or PUSCH(s); PUCCH(s) and/or PUSCH(s) are partially or fully overlapped in time domain; PUCCH(s) and/or PUSCH(s) corresponds to a same cell group; and/or PUCCH(s) and/or PUSCH(s) are on a same or different serving cell.

Referring back to FIGS. 3 and 4, in one or more embodiments from the perspective of a device (e.g., UE) in a wireless communication system, the device 300 includes a program code 312 stored in memory 310 of the transmitter. The CPU 308 could execute program code 312 to: (i) resolve overlapping of a plurality of UL channels, wherein the resolving comprises separately determining a resulted channel for a UCI associated with an event and a UEI report. Moreover, the CPU 308 can execute the program code 312 to perform all of the described actions, steps, and methods described above, below, or otherwise herein.

Figure 18:
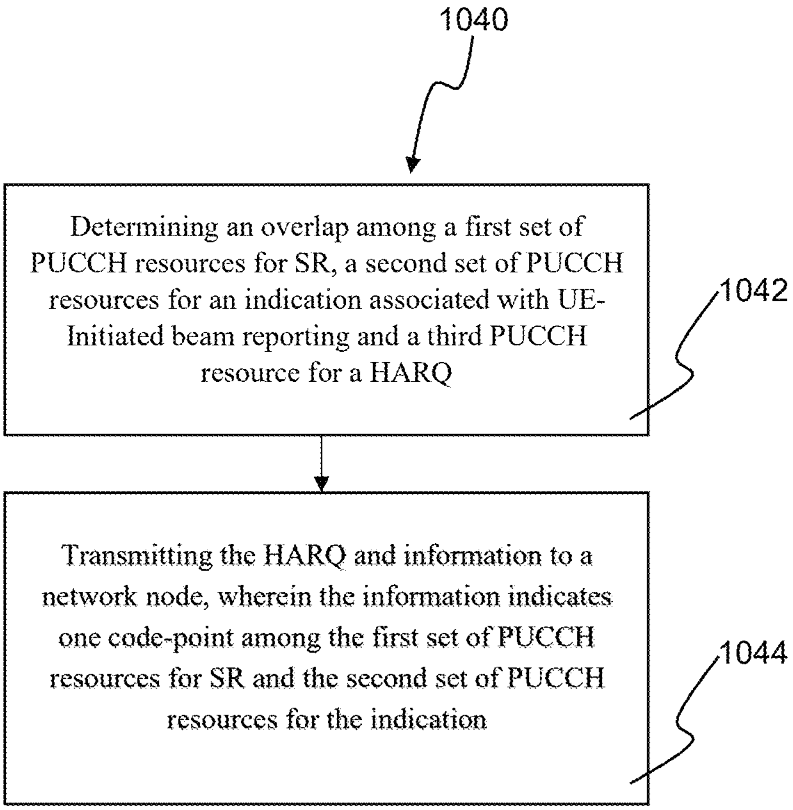
FIG. 18 is a flow diagram of a method of a UE in a wireless communication system comprising determining an overlap among a first set of PUCCH resources for SR, a second set of PUCCH resources for an indication associated with UEI beam reporting and a third PUCCH resource for a HARQ, and transmitting the HARQ and information to a network node, in accordance with embodiments of the present invention.

Referring to FIG. 18, with this and other concepts, systems, and methods of the present invention, a method 1040 for a UE in a wireless communication system comprises determining an overlap among a first set of PUCCH resources for SR, a second set of PUCCH resources for an indication associated with UE-Initiated beam reporting and a third PUCCH resource for a HARQ (step 1042), and transmitting the HARQ and information to a network node, wherein the information indicates one code-point among the first set of PUCCH resources for SR and the second set of PUCCH resources for the indication (step 1044).

In various embodiments, the overlap corresponds to overlap in one slot and in one serving cell; the overlap corresponds to overlap in one slot, the overlap corresponds to overlap in at least one symbol; and/or the first set of PUCCH resources, the second set of PUCCH resources, and the third PUCCH resource are on a PCell or a PUCCH-SCell.

In various embodiments, the third PUCCH resource corresponds to PUCCH format 2, or PUCCH format 3, or PUCCH format 4; the first set of PUCCH resources for SR corresponds to PUCCH format 0 or PUCCH format 1; and/or the second set of PUCCH resources for the indication corresponds to PUCCH format 0 or PUCCH format 1; and/or the HARQ and the information are transmitted on the third PUCCH resource.

In various embodiments, the information is indicated via $\lceil \log_2(K1+K2+1) \rceil$ bits, wherein K1 corresponds to a number of PUCCH resources in the first set of PUCCH resources and K2 corresponds to a number of PUCCH resources in the second set of PUCCH resources; code-point zero (e.g. the code-point with or set to zero) corresponds to there being no triggered SR to be transmitted via a PUCCH resource in the first set of PUCCH resources and there being no triggered event with the indication to be transmitted via a PUCCH resource in the second set of PUCCH resources (e.g. the SR is not to be transmitted via the (or any) PUCCH resource in the first set of PUCCH resources and the indication is not to be transmitted via the (or any) PUCCH resource in the second set of PUCCH resources); an ascending order of the code-point indicated by the information corresponds to a PUCCH resource for SR with ascending order of resource ID or index followed by a PUCCH resource for the indication with ascending order of resource ID or index; a resource ID or index for SR corresponds to schedulingRequestResourceId; and/or a resource ID or index for the indication corresponds to a PUCCH resource ID or index associated with the indication.

In various embodiments, size of the information is based on a number of PUCCH resources in the first set of PUCCH resources and a number of PUCCH resources in the second set of PUCCH resources.

In various embodiments, each PUCCH resource in the second set of PUCCH resources is used to transmit the indication.

In various embodiments, the UE receives one or more CSI report configurations with UEI beam reporting, wherein each of the one or more CSI report configurations is configured with an event and one PUCCH resource for the indication.

In various embodiments, if the UE determines to transmit both the SR and the indication associated with an event, or if there is a pending SR to be transmitted via one PUCCH resource in the first set of PUCCH resources and a pending indication (for UEI beam reporting) with an indication to be transmitted via one PUCCH resource in the second set of PUCCH resources: the UE determines the information based on a priority that the indication is higher than the SR, wherein the SR is associated with at least one logical channel, the information indicates a code-point associated with the one PUCCH resource for the indication, and/or the information indicates a code-point associated with a positive indication (for UEI beam reporting).

In various embodiments, the UE determines to transmit the SR and not transmit the indication, or if there is a pending SR to be transmitted via one PUCCH resource in the first set of PUCCH resources, and there is no pending indication (for UEI beam reporting) to be transmitted via one PUCCH resource in the second set of PUCCH resources: the information indicates a code-point associated with the one PUCCH resource for the SR, and/or the information indicates a code-point associated with a positive SR.

In various embodiments, the UE is configured with a fourth PUCCH resource; the fourth PUCCH resource is used to transmit an indication or corresponds to an indication, wherein the indication is associated with one CSI Report configuration associated with an event; and/or the fourth PUCCH resource is used to transmit SR or corresponds to SR.

In various embodiments, the UE determines a second overlap between the fourth PUCCH resource and a PUSCH resource; the second overlap corresponds to overlap in a second slot; the second overlap corresponds to overlap in at least one symbol; and/or the fourth PUCCH resource and the PUSCH resource are on a same serving cell, or a different serving cell.

In various embodiments, if the fourth PUCCH resource corresponds to the SR or is used to transmit the SR, the UE does not multiplex a second information into the PUSCH resource, and the UE drops the fourth PUCCH resource; and/or if the fourth PUCCH resource corresponds to the indication or is used to transmit the indication, the UE multiplexes the second information into the PUSCH resource.

In various embodiments, when a condition of the event is satisfied, the UE triggers to transmit a UEI beam report associated with the one CSI Report configuration, and the UE generates or determines the second information to indicate a positive indication (for UEI beam reporting) or presence of indication; and/or when the condition of the event is not satisfied, the UE does not trigger to transmit the UEI beam report associated with the one CSI Report configuration, and the UE generates or determines the second information to indicate a negative indication (for UEI beam reporting) or absence of the indication.

In various embodiments, the UEI beam reporting is associated with an event corresponds to any of: a first event (e.g., Event-1) comprising quality of a current beam, such as L1-RSRP, is worse than a certain threshold; a second event (e.g., Event-2) comprising quality of at least one new beam, such as L1-RSRP, becomes a threshold value better than quality of the current beam; a third event (e.g., Event-7a) comprising quality of at least one new beam, such as L1-RSRP, becomes a threshold value better than quality of another beam derived from an activated TCI state with a worst quality; or a fourth event (e.g., Event-7b) comprises quality of at least one new beam, such as L1-RSRP, becomes a threshold value better than quality of another beam derived from the activated TCI state with a best quality.

In various embodiments, the indication corresponds to a PN for UEI beam reporting Mode-B or the indication corresponds to a request for UEI beam reporting Mode-A. The indication is not configured via an SR configuration, or the indication is not associated with the SR configuration.

In various embodiments, the UE determines a third overlap between a fifth set of PUCCH resource for the indication and a sixth PUCCH resource for a second HARQ; the third overlap corresponds to overlap in a third slot and in one serving cell; and/or the third overlap corresponds to overlap in a third slot; the third overlap corresponds to overlap in at least one symbol; and/or the fifth set of PUCCH resource and the sixth PUCCH resource are on a PCell or a PUCCH-SCell.

In various embodiments, the UE transmits the second HARQ and a third information on the sixth PUCCH resource, wherein the third information indicates one code-point among the fifth set of PUCCH resource for the indication; and/or the third information is indicated via $\lceil \log_2(K+1) \rceil$ bits, wherein K corresponds to a number of PUCCH resources in the fifth set of PUCCH resource; and/or code-point zero (e.g. code-point with or set to zero) corresponds to that the indication is not to be transmitted via one PUCCH resource in the fifth set of PUCCH resources; an ascending order of code-point of the third information corresponds to a PUCCH resource for the indication with ascending order of resource ID or index; and/or a resource ID or index for the indication corresponds to a PUCCH resource ID or index associated with the indication.

Referring back to FIGS. 3 and 4, in one or more embodiments from the perspective of a device (e.g., UE) in a wireless communication system, the device 300 includes a program code 312 stored in memory 310 of the transmitter. The CPU 308 could execute program code 312 to: (i) determine an overlap among a first set of PUCCH resources for SR, a second set of PUCCH resources for an indication associated with UE-Initiated beam reporting and a third PUCCH resource for a HARQ; and (ii) transmit the HARQ and information to a network node, wherein the information indicates one code-point among the first set of PUCCH resources for SR and the second set of PUCCH resources for the indication. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:

determining an overlap among a first set of Physical Uplink Control Channel (PUCCH) resources for Scheduling Request (SR), a second set of PUCCH resources for an indication notifying or requesting transmission of a UE-Initiated (UEI) beam report and a third PUCCH resource for a Hybrid Automatic Repeat Request (HARQ);

transmitting the HARQ and information to a network node, wherein the information indicates a code-point associated with a PUCCH resource among the first set of PUCCH resources for SR and the second set of PUCCH resources for the indication;

determining a second overlap between a fourth PUCCH resource and a PUSCH resource; and multiplexing a second information into the PUSCH resource if the fourth PUCCH resource corresponds to the indication or is used to transmit the indication, wherein the indication is associated with one CSI Report configuration associated with an event.

2. The method of claim 1, wherein:

the overlap corresponds to overlap in one slot and in one serving cell, the overlap corresponds to overlap in one slot, the overlap corresponds to overlap in at least one symbol, and/or the first set of PUCCH resources, the second set of PUCCH resources, and the third PUCCH resource are on a Primary Cell (PCell) or a PUCCH-Secondary Cell (SCell).

3. The method of claim 1, wherein:

the third PUCCH resource corresponds to PUCCH format 2, PUCCH format 3, or PUCCH format 4, the first set of PUCCH resources for SR corresponds to PUCCH format 0 or PUCCH format 1, the second set of PUCCH resources for the indication corresponds to PUCCH format 0 or PUCCH format 1, the indication corresponds to one-bit indication, and/or the HARQ and the information are transmitted on the third PUCCH resource.

4. The method of claim 1, wherein:
size of the information is determined based on a number of PUCCH resources in the first set of PUCCH resources and a number of PUCCH resources in the second set of PUCCH resources;
the information is indicated via $\lceil \log_2(K1+K2+1) \rceil$ bits, wherein K1 corresponds to a number of PUCCH resources in the first set of PUCCH resources and K2 corresponds to a number of PUCCH resources in the second set of PUCCH resources,
the code-point with zero corresponds to that the SR is not to be transmitted via a PUCCH resource in the first set of PUCCH resources and the indication is not to be transmitted via a PUCCH resource in the second set of PUCCH resources,
an ascending order of the code-point indicated by the information corresponds to a PUCCH resource for SR with ascending order of resource Identification (ID) or index followed by a PUCCH resource for the indication with ascending order of resource ID or index,
a resource ID or index for SR corresponds to schedulingRequestResourceId, and/or
a resource ID or index for the indication corresponds to a PUCCH resource ID or index associated with the indication.

5. The method of claim 1, wherein each PUCCH resource in the second set of PUCCH resources is used to transmit the indication, and/or
the UE transmits the UEI beam report after transmitting the information.

6. The method of claim 1, wherein the UE receives one or more Channel State Information (CSI) report configurations with UEI beam reporting, wherein each of the one or more CSI report configurations is configured with an event and one PUCCH resource for the indication.

7. The method of claim 1, wherein if the UE determines to transmit both the SR and the indication, or if there is a pending SR to be transmitted via one PUCCH resource in the first set of PUCCH resources and a pending indication for UEI beam reporting to be transmitted via one PUCCH resource in the second set of PUCCH resources:
the UE determines the information based on a priority that the indication is higher than the SR, wherein the SR is associated with at least one logical channel,
the information indicates a code-point associated with the one PUCCH resource for the indication, and/or
the information indicates a code-point associated with a positive indication for UEI beam reporting.

8. The method of claim 1, wherein if the UE determines to transmit the SR and not transmit the indication, or if there is a pending SR to be transmitted via one PUCCH resource in the first set of PUCCH resources, and there is no pending indication for UEI beam reporting to be transmitted via one PUCCH resource in the second set of PUCCH resources:
the information indicates a code-point associated with the one PUCCH resource for the SR, and/or
the information indicates a code-point associated with a positive SR.

9. The method of claim 1, wherein:
the UE is configured with the fourth PUCCH resource,
the second overlap corresponds to overlap in a second slot,
the second overlap corresponds to overlap in at least one symbol, and/or
the fourth PUCCH resource and the PUSCH resource are on a same serving cell, or a different serving cell.

10. The method of claim 9, wherein:
if the fourth PUCCH resource corresponds to the SR or is used to transmit the SR, the UE does not multiplex the second information into the PUSCH resource, and the UE drops the fourth PUCCH resource.

11. The method of claim 1, wherein:
when a condition of the event is satisfied, the UE triggers to transmit a UEI beam report associated with the one CSI Report configuration, and the UE generates or determines the second information to indicate a positive indication for UEI beam reporting or presence of the indication, and/or
when the condition of the event is not satisfied, the UE does not trigger to transmit the UEI beam report associated with the one CSI Report configuration, and the UE generates or determines the second information to indicate a negative indication for UEI beam reporting or absence of the indication.

12. The method of claim 1, wherein the UEI beam reporting is associated with an event corresponding to any of:
a first event comprising quality of a current beam is worse than a certain threshold,
a second event comprising quality of at least one new beam becomes a threshold value better than quality of the current beam,
a third event comprising quality of at least one new beam becomes a threshold value better than quality of another beam derived from an activated Transmission Configuration Indicator (TCI) state with a worst quality, or
a fourth event comprises quality of at least one new beam becomes a threshold value better than quality of another beam derived from the activated TCI state with a best quality.

13. The method of claim 1, wherein:
the indication corresponds to a Pre-Notification (PN) for UEI beam reporting Mode-B or the indication corresponds to a request for UEI beam reporting Mode-A,
the indication is not configured via an SR configuration, and/or
the indication is not associated with the SR configuration.

14. The method of claim 1, wherein:
the UE determines a third overlap between a fifth set of PUCCH resource for the indication and a sixth PUCCH resource for a second HARQ,
the third overlap corresponds to overlap in a third slot and in one serving cell,
the third overlap corresponds to overlap in a third slot,
the third overlap corresponds to overlap in at least one symbol, and/or
the fifth set of PUCCH resource and the sixth PUCCH resource are on a Primary Cell (PCell) or a PUCCH-Secondary Cell (SCell).

15. The method of claim 14, wherein:
the UE transmits the second HARQ and a third information on the sixth PUCCH resource, wherein the third information indicates one code-point among the fifth set of PUCCH resource for the indication,
the third information is indicated via $\lceil \log_2(K+1) \rceil$ bits, wherein K corresponds to a number of PUCCH resources in the fifth set of PUCCH resource,
the code-point with zero corresponds to that the indication is not to be transmitted via one PUCCH resource in the fifth set of PUCCH resources, an ascending order of code-point of the third information corresponds to a PUCCH resource for the indication with ascending order of resource ID or index, and/or a resource ID or index for the indication corresponds to a PUCCH resource ID or index associated with the indication.

16. A User Equipment (UE), comprising:

a memory; and a processor operatively coupled with the memory, wherein the processor is configured to execute a program code to:

determine an overlap among a first set of Physical Uplink Control Channel (PUCCH) resources for a Scheduling Request (SR), a second set of PUCCH resources for an indication notifying or requesting transmission of a UE-Initiated (UEI) beam report and a third PUCCH resource for a Hybrid Automatic Repeat Request (HARQ);

transmit the HARQ and information to a network node, wherein the information indicates one code-point associated with a PUCCH resource among the first set of PUCCH resources for SR and the second set of PUCCH resources for the indication;

determine a second overlap between a fourth PUCCH resource and a PUSCH resource; and multiplex a second information into the PUSCH resource if the fourth PUCCH resource corresponds to the indication or is used to transmit the indication, wherein the indication is associated with one CSI Report configuration associated with an event.

17. The UE of claim 16, wherein:

the overlap corresponds to overlap in one slot and in one serving cell, the overlap corresponds to overlap in one slot, the overlap corresponds to overlap in at least one symbol, and/or the first set of PUCCH resources, the second set of PUCCH resources, and the third PUCCH resource are on a Primary Cell (PCell) or a PUCCH-Secondary Cell (SCell).

18. The UE of claim 16, wherein:

size of the information is determined based on a number of PUCCH resources in the first set of PUCCH resources and a number of PUCCH resources in the second set of PUCCH resources;

the information is indicated via $\lceil \log_2(K1+K2+1) \rceil$ bits, wherein K1 corresponds to a number of PUCCH resources in the first set of PUCCH resources and K2 corresponds to a number of PUCCH resources in the second set of PUCCH resources, the code-point with zero corresponds to that the SR is not to be transmitted via a PUCCH resource in the first set of PUCCH resources and the indication is not to be transmitted via a PUCCH resource in the second set of PUCCH resources, an ascending order of the code-point indicated by the information corresponds to a PUCCH resource for SR with ascending order of resource Identification (ID) or index followed by a PUCCH resource for the indication with ascending order of resource ID or index, a resource ID or index for SR corresponds to schedulingRequestResourceId, and/or a resource ID or index for the indication corresponds to a PUCCH resource ID or index associated with the indication.

19. A method of a User Equipment (UE), comprising:

determining an overlap among a first set of Physical Uplink Control Channel (PUCCH) resources for Scheduling Request (SR), a second set of PUCCH resources for an indication notifying or requesting transmission of a UE-Initiated (UEI) beam report and a third PUCCH resource for a Hybrid Automatic Repeat Request (HARQ);

transmitting the HARQ and information to a network node, wherein the information indicates a code-point among the first set of PUCCH resources for SR and the second set of PUCCH resources for the indication;

determining a third overlap between a fifth set of PUCCH resources for the indication and a sixth PUCCH resources for a second HARQ; and transmitting the second HARQ and a third information to the network node, wherein the third information indicates one code-point associated with a PUCCH resource among the fifth set of PUCCH resources for the indication.

20. The method of claim 19, wherein:

the third overlap corresponds to overlap in a third slot and in one serving cell, the third overlap corresponds to overlap in a third slot, the third overlap corresponds to overlap in at least one symbol, the fifth set of PUCCH resources and the sixth PUCCH resources are on a Primary Cell (PCell) or a PUCCH-Secondary Cell (SCell), the third information is indicated via $\lceil \log_2(K+1) \rceil$ bits, wherein K corresponds to a number of PUCCH resources in the fifth set of PUCCH resources, the code-point with zero corresponds to that the indication is not to be transmitted via one PUCCH resource in the fifth set of PUCCH resources, an ascending order of code-point of the third information corresponds to a PUCCH resource for the indication with ascending order of resource Identification (ID) or index, and/or a resource ID or index for the indication corresponds to a PUCCH resource ID or index associated with the indication.

* * * * *